(12) United States Patent
Hori et al.

(10) Patent No.: US 11,754,818 B2
(45) Date of Patent: Sep. 12, 2023

(54) ZOOM LENS AND IMAGE PICKUP APPARATUS

(71) Applicant: CANON KABUSHIKI KAISHA, Tokyo (JP)

(72) Inventors: Masao Hori, Utsunomiya (JP); Kazuya Shimomura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 17/065,109

(22) Filed: Oct. 7, 2020

(65) Prior Publication Data
US 2021/0109330 A1    Apr. 15, 2021

(30) Foreign Application Priority Data

Oct. 11, 2019  (JP) .................................. 2019-187554
Oct. 23, 2019  (JP) .................................. 2019-192836

(51) Int. Cl.
*G02B 15/14*     (2006.01)
*G02B 15/20*     (2006.01)
*G02B 15/173*    (2006.01)

(52) U.S. Cl.
CPC .. *G02B 15/144113* (2019.08); *G02B 15/1461* (2019.08); *G02B 15/145129* (2019.08); *G02B 15/173* (2013.01); *G02B 15/20* (2013.01)

(58) Field of Classification Search
CPC ............................................ G02B 15/145129
See application file for complete search history.

(56) References Cited

U.S. PATENT DOCUMENTS

| 10,359,604 B2 | 7/2019 | Hori |
| 2013/0113980 A1* | 5/2013 | Nakamura ........... G02B 15/173 359/683 |

(Continued)

FOREIGN PATENT DOCUMENTS

| JP | 2005249974 A | 9/2005 |
| JP | 2009-036844 A | 2/2009 |

(Continued)

OTHER PUBLICATIONS

Notice of Reasons for Refusal issued by the Japanese Patent Office dated Jun. 13, 2023 in corresponding JP Patent Application No. 2019-192836, with English translation.

(Continued)

*Primary Examiner* — Christopher Stanford
(74) *Attorney, Agent, or Firm* — Carter, DeLuca & Farrell LLP

(57) ABSTRACT

A zoom lens consists of in order from an object side to an image side: a first lens unit having a positive refractive power and configured not to move for zooming; three or four moving lens units configured to move in zooming; an aperture stop; and one or two rear lens units including a rear lens unit closest to the object side and configured not to move for zooming. An interval between each pair of adjacent lens units is changed in zooming. The three or four moving lens units include a moving lens unit having a negative refractive power. The three or four moving lens units include a rear positive lens unit closest to the image side and having a positive refractive power. The first lens unit includes three positive lenses. Conditional expressions are satisfied by the zoom lens.

8 Claims, 28 Drawing Sheets

(56) References Cited

U.S. PATENT DOCUMENTS

| | | | |
|---|---|---|---|
| 2014/0204252 A1* | 7/2014 | Yoshimi | G02B 15/1461 |
| | | | 359/683 |
| 2019/0265447 A1 | 8/2019 | Hori et al. | |
| 2019/0265448 A1 | 8/2019 | Ogawa et al. | |
| 2019/0265451 A1 | 8/2019 | Shimomura et al. | |
| 2020/0158997 A1 | 5/2020 | Hori et al. | |

FOREIGN PATENT DOCUMENTS

| | | |
|---|---|---|
| JP | 2012-225989 A | 11/2012 |
| JP | 2013-092557 A | 5/2013 |
| JP | 2014-038238 A | 2/2014 |
| JP | 2014-142451 A | 8/2014 |
| JP | 2016-136174 A | 7/2016 |
| JP | 2017173650 A | 9/2017 |
| JP | 2017181720 A | 10/2017 |
| JP | 2017215406 A | 12/2017 |
| JP | 2018-194730 A | 12/2018 |
| JP | 2019-008087 A | 1/2019 |
| JP | 2019-148758 A | 9/2019 |
| WO | 2017/170047 A1 | 10/2017 |

OTHER PUBLICATIONS

Notice of Reasons for Refusal issued by the Japanese Patent Office dated Jul. 11, 2023 in corresponding JP Patent Application No. 2019-187554, with English translation.

* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

For image pickup apparatus, such as a television camera, a silver-halide film camera, a digital camera, and a video camera, a zoom lens having a high magnification and a wide angle of view at a wide-angle end, as well as high optical performance, is desired. As the zoom lens having a high magnification and a wide angle of view, there is known a positive-lead type zoom lens consisting of four or more lens units as a whole, in which a lens unit having a positive refractive power is arranged closest to an object side. In particular, an image pickup device including a CCD or CMOS device, for example, which is used for a professional-use television camera or cinema camera, has a high resolution that is highly uniform over the entire image pickup range. Therefore, it is required for a zoom lens for such an image pickup device to have a high resolution that is highly uniform from the center to the periphery of the image pickup range.

In Japanese Patent Application Laid-Open No. 2017-215406, for example, there are disclosed four-unit and five-unit zoom lenses each including a first lens unit having a positive refractive power, a second lens unit having a negative refractive power, a third lens unit, a stop, and a lens unit having a positive refractive power, which has an angle of view at a wide-angle end of from 61.2° to 64.6° and a zoom magnification of from about 86× to about 115×.

Similarly, in Japanese Patent Application Laid-Open No. 2017-173650, there is disclosed a zoom lens consisting of a first lens unit having a positive refractive power, a second lens unit having a negative refractive power, a third lens unit having a positive refractive power, a stop, and a fourth lens unit having a positive refractive power, the zoom lens having an angle of view at a wide-angle end of about 40 and a zoom magnification of about 58×.

In the positive-lead type zoom lenses having the above-mentioned configurations, in order to achieve a wide angle of view, a high magnification, and high performance at the same time, the following zoom configuration is effective: a lens unit having a negative refractive power and a lens unit having a positive refractive power, which are included in a zooming lens unit, both earn the magnification while being brought closer to each other from the wide-angle end to a telephoto end. However, with the zoom lenses of the above-mentioned type, when a marginal beam is not restricted until the beam is restricted by a front lens diameter, there is a tendency in a lens unit having a positive refractive power and being arranged on the object side of the stop to be increased in diameter under an intermediate zoom state. When the diameter of the positive lens unit is increased, also for the purpose of imparting a power required as the zooming lens unit, a thickness of the positive lens unit is increased. Therefore, the above-mentioned case may lead to a disadvantage in downsizing and reducing the weight of the zoom lens, increased driving torque, or variation in optical performance during zooming.

In the zoom lens of Japanese Patent Application Laid-Open No. 2017-215406, a diameter of the third lens unit is very large in comparison to a full open aperture diameter of the stop.

Further, in the zoom lens of Japanese Patent Application Laid-Open No. 2017-173650, an f-number is gradually increased from the wide-angle end toward the telephoto end to reduce a diameter of the third lens unit. However, in order to achieve a zoom lens having a wider angle of view, a higher magnification, and higher performance, the configuration imposes limitations.

As a zoom lens having a wide angle of view and a high zoom ratio, there is known a positive-lead type zoom lens including, in order from an object side, a first lens unit having a positive refractive power, and a second lens unit having a negative refractive power, which is used for zooming. In Japanese Patent Application Laid-Open No. 2005-249974, there is disclosed a zoom lens having an angle of view at a wide-angle end of about 800 and a zooming ratio of about 26, the zoom lens consisting of, in order from an object side, a first lens unit having a positive refractive power, a second lens unit having a negative refractive power, a third lens unit having a positive refractive power, and a fourth lens unit having a positive refractive power. Further, the first lens unit consists of, in order from the object side, a first lens sub-unit having a negative refractive power, a second lens sub-unit having a positive refractive power, which is configured to move for focusing, and a third lens sub-unit having a positive refractive power. Similarly, in Embodiment 5 of Japanese Patent Application Laid-Open No. 2017-181720, there is disclosed a zoom lens having an angle of view at a wide-angle end of about 80° and a zooming ratio of about 30. The zoom lens of Embodiment 5 consists of, in order from an object side, a first lens unit having a positive refractive power, a second lens unit having a negative refractive power, a third lens unit having a positive refractive power, a fourth lens unit having a positive refractive power, and a fifth lens unit having a positive refractive power. Further, the first lens unit consists of, in order from the object side, a first lens sub-unit having a negative refractive power, a second lens sub-unit having a positive refractive power, which is configured to move for focusing, and a third lens sub-unit having a positive refractive power.

In the positive-lead type zoom lenses having the above-mentioned configurations disclosed in Japanese Patent Application Laid-Open No. 2005-249974 or Japanese Patent Application Laid-Open No. 2017-181720, in order to achieve a wide angle of view, high performance and small-ness in size at the same time, it is important to appropriately configure the refractive powers of the lens units and the configuration of the first lens unit. In particular, to achieve a further wider angle of view, if the refractive powers of the lens units are not appropriately set, the diameter of the first lens unit is enlarged, which is disadvantageous in downsizing of the zoom lens.

SUMMARY OF THE INVENTION

An aspect of embodiments provides, for example, a zoom lens beneficial in small size and weight, high magnification, wide angle of view, and high optical performance over an entire zoom range.

According to the present invention, a zoom lens consists of in order from an object side to an image side: a first lens unit having a positive refractive power and configured not to move for zooming; three or four moving lens units configured to move in zooming; an aperture stop; and one or two rear lens units including a rear lens unit closest to the object side and configured not to move in zooming, in which an interval between each pair of adjacent lens units is changed for zooming, in which the three or four moving lens units include a moving lens unit having a negative refractive power, in which the three or four moving lens units include a rear positive lens unit closest to the image side and having a positive refractive power, in which the first lens unit includes three positive lenses, and in which following conditional expressions are satisfied:

$1.0 < Ea/Ep < 2.5$; and $0.4 < \beta < 1.5$, where β represents a lateral magnification of the one or two rear lens units at a wide-angle end in a case where an axial beam enters from infinity under a state in which the zoom lens is in focus at infinity, Ea represents a smallest effective diameter of effective diameters of lenses included in the rear positive lens unit, and Ep represents a full open aperture diameter of the aperture stop.

According to the present invention, a zoom lens includes in order from an object side to an image side: a first lens unit having a positive refractive power and configured not to move for zooming; two to four moving lens units configured to move in zooming; and one or two rear lens units including one lens unit closest to the object side and configured not to move, in which an interval between each pair of adjacent lens units is changed in zooming, in which the zoom lens further includes an aperture stop on the object side of the one or two rear lens units or within the one or two rear lens units, in which the two to four moving lens units include a lens unit having a negative refractive power, and a rear positive lens unit having a positive refractive power and arranged closest to the image side, in which the first lens unit includes in order from the object side to the image side: a first lens sub-unit having a negative refractive power; a second lens sub-unit having a positive refractive power; and a positive lens sub-unit, the second lens sub-unit being configured to move toward the image side for focusing from an object at infinity to an object at a close distance, and wherein following conditional expressions are satisfied:

$2.4 < ft/f1 < 5.0$; and $-6.0 < f1/fn < -2.0$, where f1 represents a focal length of the first lens unit, "fn" represents a focal length of a lens unit closest to the object side of lens units having negative refractive powers included in the two to four moving lens units, and "ft" represents a focal length of the zoom lens at a telephoto end.

Further features of the present invention will become apparent from the following description of exemplary embodiments with reference to the attached drawings.

DESCRIPTION OF THE EMBODIMENTS

Figure 1:
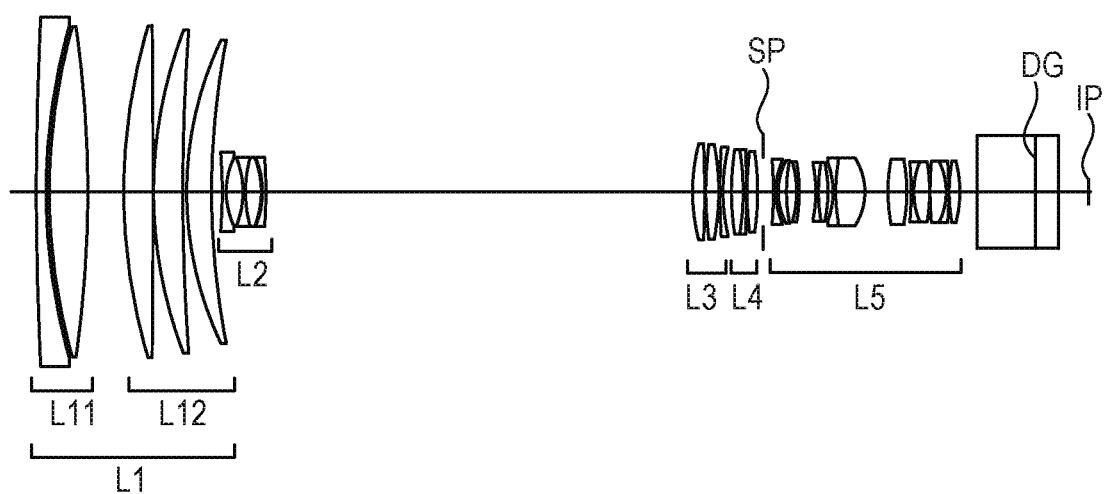
FIG. 1 is a lens cross-sectional view of a zoom lens according to Numerical Embodiment 1 at a wide-angle end (focal length: 8.90 mm) when the zoom lens is focused at infinity.

Now, exemplary embodiments of the present invention are described in detail with reference to the accompanying drawings. First, features of a zoom lens according to the present invention are described in terms of conditional expressions. In the zoom lens according to the present invention, in order to achieve a zoom lens that achieves a wide angle of view, a high zoom ratio, a small size, a light weight, and high optical performance over the entire zoom range, configurations and power arrangements of lens units are appropriately defined.

The zoom lens according to the present invention includes in order from an object side to an image side: a first lens unit having a positive refractive power and configured not to move for zooming; three or four moving lens units configured to move in zooming; an aperture stop; and one or two rear lens units arranged closest to the object side and configured not to move for zooming. An interval between each pair of adjacent lens units is changed in zooming. The three or four moving lens units include a moving lens unit having a negative refractive power, the three or four moving lens units include a rear positive lens unit closest to the image side, which has a positive refractive power, and the first lens unit includes three positive lenses. Further, following conditional expressions are satisfied:

$$1.0 < Ea/Ep < 2.5 \quad (1): \text{and}$$

$$0.4 < \beta < 1.5 \quad (2),$$

where $\beta$ represents a lateral magnification of the one or two rear lens units at a wide-angle end in a case where an axial beam enters from infinity under a state in which the zoom lens is in focus at infinity, Ea represents a smallest effective diameter of effective diameters of lenses included in the rear positive lens unit, and Ep represents a full open aperture diameter of the aperture stop.

Next, technical meanings of the above-mentioned conditional expressions are described.

The conditional expressions (1) and (2) are intended to achieve a wide angle and a high magnification of the zoom lens having a high magnification with high performance, as well as downsizing and a reduction in weight of the entire lens system. The ratio of the smallest effective diameter Ea of the lenses forming the rear positive lens unit to the full open aperture diameter Ep of the aperture stop, and an appropriate range of the lateral magnification R of the lens units on the image side of the rear positive lens unit are defined.

In the conditional expression (1), the ratio of the smallest effective diameter Ea of the lenses forming the rear positive lens unit forming a first aspect of the zoom lens according to the present invention to the full open aperture diameter Ep of the aperture stop is defined. When the conditional expression (1) is satisfied, a diameter of the lens unit on the object side that is closest to the aperture stop can be appropriately set with respect to an f-number. When the ratio exceeds the upper limit of the conditional expression (1), the diameter of the rear positive lens unit is increased, and it becomes difficult to downsize and reduce the weight of the zoom lens. When the ratio falls below the lower limit of the conditional expression (1), the diameter of the rear positive lens unit becomes smaller with respect to the full open aperture diameter of the aperture stop, and it becomes difficult to ensure sufficient brightness at the wide-angle end.

It is preferred to set the conditional expression (1) as follows.

$$1.0 < Ea/Ep < 1.8 \quad (1a)$$

It is more preferred to set the conditional expression (1a) as follows.

$$1.0 < Ea/Ep < 1.6 \quad (1b)$$

It is more preferred to set the conditional expression (1b) as follows.

$$1.0 < Ea/Ep < 1.2 \quad (1c)$$

In the conditional expression (2), the lateral magnification $\beta$ of the lens units on the image side of the rear positive lens unit is defined. When the conditional expression (2) is satisfied, sufficient power can be imparted to the rear positive lens unit as a zooming lens unit so that a zoom type optimal for achieving a high magnification can be formed. When the value exceeds the upper limit of the conditional expression (2), zoom fluctuation components of aberrations generated in the zooming lens unit are excessively increased in the rear positive lens unit and subsequent lens units, and it becomes difficult to achieve high performance. When the value falls below the lower limit of the conditional expression (2), it is hard to impart sufficient zooming action to the rear positive lens unit, and it becomes difficult to achieve a high magnification.

It is preferred to set the conditional expression (2) as follows.

$$0.6 < \beta < 1.4 \quad (2a)$$

It is more preferred to set the conditional expression (2a) as follows.

$$0.8 < \beta < 1.3 \quad (2b)$$

It is more preferred to set the conditional expression (2b) as follows.

$$0.9 < \beta < 1.2 \quad (2c)$$

Further, in the first aspect of the present invention, it is preferred to satisfy one or more of the following conditions.

In an aspect of the present invention, it is preferred to satisfy the following conditional expression:

$$0.040 < fw/f1 < 0.080 \quad (3),$$

where "fw" represents a focal length of the zoom lens at the wide-angle end, and f1 represents a focal length of the above-mentioned first lens unit L1.

In the conditional expression (3), a ratio of the focal length "fw" of the entire system of the zoom lens according to the present invention at the wide-angle end to the focal length f of the first lens unit L1 is defined. When the conditional expression (3) is satisfied, a range of the focal length of the first lens unit in which both of a high magnification and a wide angle can be achieved can be defined. When the ratio exceeds the upper limit of the conditional expression (3), the focal length of the first lens unit becomes relatively and excessively shorter, and an enlargement magnification of the first lens unit and subsequent lens units at a telephoto end becomes excessively larger, with the result that it becomes difficult to achieve high performance as well. When the ratio falls below the lower limit of the conditional expression (3), the focal length of the first lens unit becomes relatively and excessively longer, and it becomes difficult to downsize and reduce the weight of the zoom lens.

It is preferred to set the conditional expression (3) as follows.

$$0.040<fw/f1<0.061 \quad (3a)$$

It is more preferred to set the conditional expression (3a) as follows.

$$0.041<fw/f1<0.061 \quad (3b)$$

It is more preferred to set the conditional expression (3b) as follows.

$$0.042 \leq fw/f1 \leq 0.053 \quad (3c)$$

It is more preferred to set the conditional expression (3c) as follows.

$$0.043 \geq fw/f1 \leq 0.050 \quad (3d)$$

Further, in an aspect of the present invention, it is preferred to satisfy the following conditional expression:

$$2.5<ft/f1<5.2 \quad (4),$$

where "ft" represents a focal length of the entire system at the telephoto end.

In the conditional expression (4), a ratio of the focal length "ft" of the entire system of the zoom lens according to the present invention at the telephoto end to the focal length f1 of the first lens unit L1 is defined. When the conditional expression (4) is satisfied, a range of the focal length of the first lens unit that is appropriate for achieving a sufficiently long focal length at the telephoto end can be defined. When the ratio exceeds the upper limit of the conditional expression (4), the focal length of the first lens unit becomes relatively and excessively shorter, and an enlargement magnification of the first lens unit and subsequent lens units at a telephoto end becomes excessively larger, with the result that it becomes difficult to achieve high performance as well. When the ratio falls below the lower limit of the conditional expression (4), the focal length of the first lens unit becomes relatively and excessively longer, and it becomes difficult to downsize and reduce the weight of the zoom lens.

It is preferred to set the conditional expression (4) as follows.

$$3.5<ft/f1<5.0 \quad (4a)$$

It is more preferred to set the conditional expression (4a) as follows.

$$3.6<ft/f1<4.8 \quad (4b)$$

It is more preferred to set the conditional expression (4b) as follows.

$$3.8<ft/f1<4.6 \quad (4c)$$

Further, in an aspect of the present invention, it is preferred to satisfy the following conditional expression:

$$0.29<fp/f1<1.50 \quad (5),$$

where "fp" represents a focal length of the rear positive lens unit.

In the conditional expression (5), a ratio of the focal length "fp" of the rear positive lens unit in the present invention to the focal length f1 of the first lens unit L1 is defined. When the conditional expression (5) is satisfied, a range of the focal length of the rear positive lens unit that is optimal for achieving high specifications as well as downsizing and the reduction in weight of the zoom lens can be defined. When the ratio exceeds the upper limit of the conditional expression (5), the focal length of the rear positive lens unit becomes excessively longer, and it becomes difficult to earn the zooming ratio, with the result that it becomes difficult to achieve a high magnification. When the ratio falls below the lower limit of the conditional expression (5), the focal length of the rear positive lens unit becomes excessively shorter, and it becomes difficult to suppress performance variation during zooming.

It is preferred to set the conditional expression (5) as follows.

$$0.32<fp/f1<1.40 \quad (5a)$$

It is more preferred to set the conditional expression (5a) as follows.

$$0.35<fp/f1<1<35 \quad (5b)$$

It is more preferred to set the conditional expression (5b) as follows.

$$0.38<fp/f1<1.25 \quad (5c)$$

Further, in an aspect of the present invention, the second lens unit has the negative refractive power.

Further, in an aspect of the present invention, the first lens unit consists of a first lens sub-unit configured not to move for focusing, and a second lens sub-unit having a positive refractive power, which is configured to move for focusing.

Further, in an aspect of the present invention, the first lens unit corresponds to the 1st surface to the 18th surface. The first lens unit consists of a first lens sub-unit having a negative refractive power, which is configured not to move for focusing, a second lens sub-unit having a positive refractive power, which is configured to move for focusing, and a third lens unit having a positive refractive power, which is configured not to move for focusing.

Further, in an aspect of the present invention, it is preferred to satisfy the following conditional expressions:

$$-0.3<f1/f11<0.3 \quad (6); \text{ and}$$

$$0.8<f1/f12<1.2 \quad (7),$$

where f11 represents a focal length of the first lens sub-unit, and f12 represents a focal length of the second lens sub-unit.

In the conditional expressions (6) and (7), when the first lens unit in the present invention consists of the first lens sub-unit L11 configured not to move for focusing and the second lens sub-unit L12 configured to move for focusing, ratios with respect to the focal length f1 of the first lens unit L are defined. In particular, the first lens sub-unit has substantially no power, and may be positive or negative. When the conditional expressions (6) and (7) are satisfied, a configuration of the first lens unit that is optimal for achieving a long focal length of the zoom lens can be defined. When the ratio exceeds the upper limit of the conditional expression (6), the power of the first lens sub-unit becomes relatively weaker, and an extension amount during focusing is disadvantageously increased, with the result that it becomes difficult to downsize and reduce the weight of the zoom lens.

It is preferred to set the conditional expression (6) as follows.

$$-0.2 < f1/f11 < 0.2 \quad (6a)$$

It is more preferred to set the conditional expression (6a) as follows.

$$-0.15 < f1/f11 < 0.15 \quad (6b)$$

It is more preferred to set the conditional expression (6b) as follows.

$$-0.13 < f1/f11 < 0.13 \quad (6c)$$

Further, when the ratio exceeds the upper limit of the conditional expression (7), the first lens unit has a retrofocus type power arrangement, and it becomes difficult to increase the focal length of the first lens unit. Then, when a long focal point is to be achieved at the telephoto end, an enlargement magnification of a zooming portion becomes excessively larger, and hence it becomes difficult to maintain high optical performance. When the ratio falls below the lower limit of the conditional expression (7), the power of the second lens sub-unit becomes excessively weaker, and the extension amount during focusing is disadvantageously increased, with the result that it becomes difficult to downsize and reduce the weight of the zoom lens.

It is preferred to set the conditional expression (7) as follows.

$$0.83 < f1/f12 < 1.15 \quad (7a)$$

It is more preferred to set the conditional expression (7a) as follows.

$$0.88 < f1/f12 < 1.12 \quad (7b)$$

It is more preferred to set the conditional expression (7b) as follows.

$$0.95 < f1/f12 < 1.08 \quad (7c)$$

Further, an image pickup apparatus according to the present invention includes the zoom lens of each Embodiment and a solid image pickup element having a predetermined effective image pickup range, which is configured to receive an image formed by the zoom lens.

A zoom lens according a second aspect of the present invention includes in order from an object side to an image side: a first lens unit having a positive refractive power and configured not to move for zooming; two to four moving lens units configured to move in zooming; and one or two rear lens units including one lens unit closest to the object side and configured not to move, and an interval between each pair of adjacent lens units is changed in zooming. The zoom lens further includes an aperture stop on the object side of the one or two rear lens units or within the one or two rear lens units, and the two to four moving lens units include a lens unit having a negative refractive power, and a rear positive lens unit having a positive refractive power and arranged closest to the image side. The first lens unit includes, in order from the object side to the image side: a first lens sub-unit having a negative refractive power; a second lens sub-unit having a positive refractive power: and a positive lens unit, and the second lens sub-unit is configured to move toward the image side for focusing from an object at infinity to an object at a close distance. Further, following conditional expressions are satisfied:

$$2.4 < ft/f1 < 5.0 \quad (8); \text{ and}$$

$$-6.0 < f1/fn < -2.0 \quad (9),$$

where f1 represents a focal length of the first lens unit, "fn" represents a focal length of a lens unit closest to the object side of lens units having negative refractive powers included in the two to four moving lens units, and "ft" represents a focal length of the zoom lens at a telephoto end.

Figure 27A:
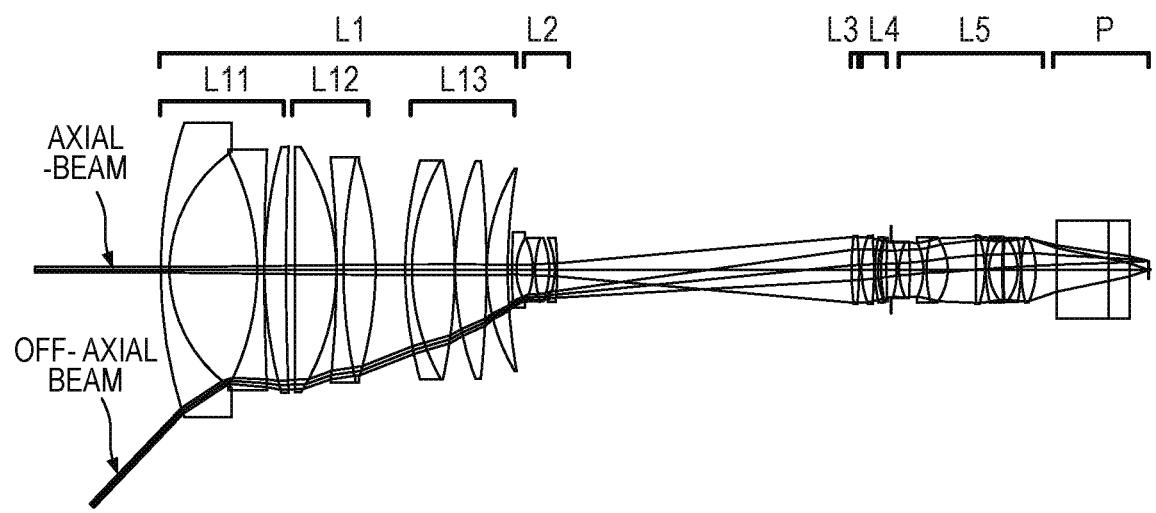
FIG. 27A is an optical path diagram of the zoom lens according to Numerical Embodiment 7 at the wide-angle end when the zoom lens is focused at infinity.
Figure 27B:
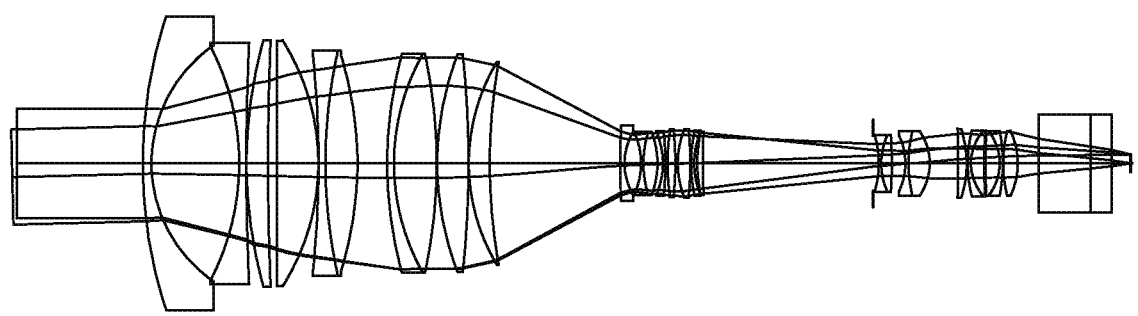
FIG. 27B is an optical path diagram of the zoom lens according to Numerical Embodiment 7 at the telephoto end when the zoom lens is focused at infinity.

Next, optical actions exerted by adopting the above-mentioned lens configuration for the zoom lens according to the present invention are described. FIG. 27A and FIG. 27B are optical path diagrams of Numerical Embodiment 7 at the wide-angle end and the telephoto end, respectively, when the zoom lens is focused at infinity. Further, a first lens unit L1 to a fifth lens unit L5, and a first lens sub-unit L11 to a third lens sub-unit L13 are illustrated. The first lens unit in Numerical Embodiment 7 consists of the first lens sub-unit having a negative refractive power, the second lens sub-unit having a positive refractive power, which is configured to move during focusing, and the third lens sub-unit having a positive refractive power. As can be seen from FIG. 27A, in a zoom lens in which an angle of view at the wide-angle end exceeds 80° a lens diameter of the lens unit closest to the object side is determined by an off-axial beam at the wide-angle end. Therefore, by arranging the first lens sub-unit having the negative refractive power closest to the object side as in the above-mentioned configuration to push an entrance pupil of the zoom lens toward the object side, an increase in lens diameter of the first lens sub-unit accompanying achievement of a wide angle of view is suppressed.

Further, lens units configured to move for zooming consist of the second lens unit having a negative refractive power, the third lens unit having a positive refractive power, and the fourth lens unit having a positive refractive power, in which, during zooming from the wide-angle end to the telephoto end, the second lens unit is moved toward the image side, and the third lens unit and the fourth lens unit are moved toward the object side. With this lens configuration, the zooming is shared between the third lens unit and the fourth lens unit in addition to the second lens unit to achieve an arrangement that is advantageous in achieving a high magnification.

Further, when the above-mentioned conditional expressions (8) and (9) are satisfied, it is possible to achieve the zoom lens with which a wide angle of view, a high zoom ratio, a small size, a light weight, and high optical performance over the entire zoom range are achieved. In the conditional expression (8), a ratio between the focal length of the first lens unit and the focal length of the zoom lens at the telephoto end is defined. When the conditional expression (8) is satisfied, high optical performance as well as the wide angle and the small size are achieved. When the upper limit of the conditional expression (8) is not satisfied, the refractive power of the first lens unit becomes larger, and in particular, the refractive power of the third lens sub-unit forming the first lens unit becomes larger, with the result that it becomes difficult to satisfactorily correct spherical aberration and axial chromatic aberration at the telephoto end. Further, a lateral magnification of the first lens unit and subsequent lens units becomes larger at the telephoto end to become more susceptible to the effects of manufacturing errors in thicknesses of lenses and lens intervals, for example. In contrast, when the lower limit of the conditional expression (8) is not satisfied, the refractive power of the first lens unit becomes smaller, and it becomes difficult to achieve both of the wide angle and the small size of the zoom lens.

It is more preferred to set the conditional expression (8) as follows.

$$2.5 < ft/f1 < 4.5 \tag{8a}$$

In the conditional expression (9), a ratio of a focal length of a front negative lens unit having a negative refractive power, which is arranged closest to the object side of lens units configured to move for zooming, with respect to the focal length of the first lens unit is defined. When the conditional expression (9) is satisfied, high optical performance over the entire zoom range is achieved. When the upper limit of the conditional expression (9) is not satisfied, the refractive power of the front negative lens unit, which makes a significant contribution to zooming, becomes larger, and it becomes difficult to correct spherical aberration and curvature of field at an intermediate zoom position and the telephoto end. In contrast, when the lower limit of the conditional expression (9) is not satisfied, the refractive power of the first lens unit becomes relatively larger with respect to the front negative lens unit, and hence it becomes difficult to satisfactorily correct spherical aberration and axial chromatic aberration at the telephoto end. It is more preferred to set the conditional expression (9) as follows.

$$-5.5 < f1/fn < -2.5 \tag{9a}$$

As a further aspect of the zoom lens of the present invention, the following conditional expression is satisfied:

$$0.4 < \beta < 1.8 \tag{10},$$

where β represents a lateral magnification of a rear lens unit at the wide-angle end when an axial beam enters from infinity under a state in which the zoom lens is focused at infinity.

When the upper limit of the conditional expression (10) is not satisfied, the lateral magnification of the rear lens unit becomes larger, and hence the effects of manufacturing errors in thicknesses of lenses forming the rear lens unit and lens intervals, for example, on optical performance become larger, with the result that a difficulty in terms of manufacturing is increased. In contrast, when the lower limit of the conditional expression (10) is not satisfied, a lateral magnification of lens units on the object side of the rear lens unit is not sufficiently small, and hence it becomes difficult to suppress a lens diameter of the first lens unit, in particular, with the result that the zoom lens is increased in size. When the rear lens unit consists of a plurality of lens units, the lateral magnification β of the rear lens unit at the wide-angle end is expressed as a composite lateral magnification of the rear lens unit. It is more preferred to set the conditional expression (10) as follows.

$$0.5 < \beta < 1.5 \tag{10a}$$

As a further aspect of the zoom lens according to the present invention, a ratio between the focal length of the first lens unit and a focal length of the zoom lens at the wide-angle end is defined. The following expression is satisfied:

$$0.05 < fw/f1 < 0.20 \tag{11},$$

where "fw" represents the focal length of the zoom lens at the wide-angle end.

The conditional expression (11) is satisfied to achieve high optical performance as well as the wide angle and downsizing. When the upper limit of the conditional expression (11) is not satisfied, the refractive power of the first lens unit becomes larger, and in particular, the refractive power of the third lens sub-unit forming the first lens unit becomes larger, with the result that it becomes difficult to satisfactorily correct spherical aberration and axial chromatic aberration at the telephoto end. In contrast, when the lower limit of the conditional expression (11) is not satisfied, the refractive power of the first lens unit becomes smaller, and it becomes difficult to achieve both the wide angle and downsizing of the zoom lens. It is more preferred to set the conditional expression (11) as follows.

$$0.06 < fw/f1 < 0.18 \tag{11a}$$

As a further mode of the zoom lens according to the present invention, the second lens unit has the negative refractive power. Through arrangement of the second lens unit having the negative refractive power on the image side of the first lens unit having the positive refractive power, the contribution of the second lens unit to the zooming is increased, and movement amounts of lens units configured to move for zooming are suppressed.

As a further aspect of the zoom lens according to the present invention, a lens unit closest to the object side of moving lens units is the third lens unit having the positive refractive power. With the third lens unit having the positive refractive power, and being configured to move toward the object side for zooming from the wide-angle end to the telephoto end, the third lens unit can share a part of zooming, and a movement amount of the second lens unit in zooming is suppressed.

As a further aspect of the zoom lens according to the present invention, a ratio of the focal length of the first lens unit to a focal length of the lens unit closest to the object side of the moving lens units, which are configured to move toward the object side for zooming from the wide-angle end to the telephoto end, is defined. The following conditional expression is satisfied:

$$0.2 < f1/f3 < 2.0 \tag{12},$$

where f3 represents the focal length of the lens unit closest to the object side of the moving lens units, which are configured to move toward the object side for zooming from the wide-angle end to the telephoto end.

The conditional expression (12) is satisfied to achieve high optical performance over the entire zoom range and downsizing of the zoom lens. When the upper limit of the conditional expression (12) is not satisfied, the refractive power of the lens unit closest to the object side of the moving lens units, which are configured to move toward the object side for zooming from the wide-angle end to the telephoto end, becomes larger, and hence it becomes difficult to correct spherical aberration at the intermediate zoom position. In contrast, when the lower limit of the conditional expression (12) is not satisfied, the refractive power of the lens unit closest to the object side of the moving lens units, which are configured to move toward the object side for zooming from the wide-angle end to the telephoto end, becomes smaller, and hence a movement amount of the lens unit during zooming becomes larger, with the result that it becomes difficult to downsize the zoom lens. It is more preferred to set the conditional expression (12) as follows.

$$0.3 < f1/f3 < 1.5 \tag{12a}$$

As a further aspect of the zoom lens according to the present invention, the first lens unit consists of a first lens sub-unit having a negative refractive power, which is configured not to move for focusing, a second lens sub-unit having a positive refractive power, which is configured to move for focusing, and a third lens sub-unit having a positive refractive power. Through arrangement of the first lens sub-unit having the negative refractive power, a change in object point of the second lens sub-unit with respect to a change in object distance becomes smaller, and a movement amount of the second lens sub-unit during focusing can be reduced.

As a further mode of the zoom lens according to the present invention, a ratio of focal lengths of lens units forming the first lens unit is defined. The following conditional expressions are satisfied:

$$-2.0 < f11/f1 < -0.7 \quad (13); \text{ and}$$

$$-5.0 < f12/f11 < -1.5 \quad (14),$$

where f11 and f12 represent focal lengths of the first lens sub-unit and the second lens sub-unit, respectively.

The conditional expressions (13) and (14) are satisfied to achieve both of high optical performance and downsizing of the zoom lens. When the upper limit of the conditional expression (13) is not satisfied, the refractive power of the first lens sub-unit becomes larger, and hence it becomes difficult to correct off-axial aberrations such as curvature of field and distortion at the wide-angle end. In contrast, when the lower limit of the conditional expression (13) is not satisfied, the refractive power of the first lens sub-unit becomes smaller, and hence the lens diameter of the first lens sub-unit becomes larger, with the result that it becomes difficult to achieve the wide angle of the zoom lens. When the upper limit of the conditional expression (14) is not satisfied, the refractive power of the second lens sub-unit becomes relatively larger as compared to the refractive power of the first lens sub-unit, and hence aberration variation with respect to a change in object distance becomes larger, with the result that it becomes difficult to achieve high optical performance. In contrast, when the lower limit of the conditional expression (14) is not satisfied, the refractive power of the second lens sub-unit becomes relatively smaller as compared to the refractive power of the first lens sub-unit, and hence the movement amount of the second lens sub-unit during focusing becomes larger, with the result that it becomes difficult to downsize the zoom lens. It is more preferred to set the conditional expressions (13) and (14) as follows.

$$-1.8 < f11/f1 < -0.9 \quad (13a)$$

$$-4.5 < f12/f11 < -2.0 \quad (14a)$$

As a further aspect of the zoom lens according to the present invention, a ratio of a lens diameter of the rear positive lens unit to a full open aperture diameter of the aperture stop is defined. The following conditional expression is satisfied:

$$1.0 < Ea/Ep < 2.5 \quad (15),$$

where Ea represents an effective diameter of a lens having the smallest diameter of lenses forming the rear positive lens unit, and Ep represents the full open aperture diameter of the aperture stop.

When the upper limit of the conditional expression (15) is not satisfied, the lens diameter of the rear positive lens unit becomes larger, and it becomes difficult to satisfactorily correct optical performance at the intermediate zoom position. Further, the number of lenses forming the rear positive lens unit becomes larger, and the rear positive lens unit is increased in size. In contrast, when the lower limit of the conditional expression (15) is not satisfied, an axial beam emitted from the rear positive lens unit becomes divergent, and the positive refractive power of the rear positive lens unit becomes smaller, with the result that a movement amount of the rear positive lens unit during zooming becomes larger. It is more preferred to set the conditional expression (15) as follows.

$$1.03 < Ea/Ep < 2.0 \quad (15a)$$

As a further aspect of the zoom lens according to the present invention, the rear lens unit is configured not to move for zooming.

As a further aspect of the zoom lens according to the present invention, a lens sub-unit Lrr, which is a lens unit forming a part of the rear lens unit, is configured to move for zooming, and the following conditional expression is satisfied:

$$|mrr/drr| < 0.1 \quad (16),$$

where "mrr" and "drr" represent the maximum movement amount of the lens sub-unit Lrr over the entire zoom range, and a distance from a surface closest to the object side to a surface closest to the image side of the lens sub-unit Lrr, respectively.

The lens sub-unit Lrr may be moved during zooming in a range that satisfies the conditional expression (16) to correct off-axial aberrations. Further, the lens sub-unit Lrr may be moved along with a zooming operation to correct a shift in focus that occurs in zooming. It is more preferred to set the conditional expression (16) as follows.

$$|mrr/drr| < 0.02 \quad (16a)$$

Further, an image pickup apparatus according to the present invention includes the zoom lens of each of Embodiments and a solid image pickup element having a predetermined effective image pickup range, which is configured to receive an image formed by the zoom lens.

Now, specific configurations of the zoom lens according to the present invention are described in terms of features of lens configurations in Numerical Embodiments 1 to 13 corresponding to Embodiments 1 to 13.

Embodiment 1

FIG. 1 is a lens cross-sectional view of a zoom lens according to Embodiment 1 (Numerical Embodiment 1) of the present invention at the wide-angle end (focal length: 8.90 mm) when the zoom lens is focused at infinity. In lens cross-sectional views, the left side is the object side (front side), and the right side is the image side (rear side).

In FIG. 1, the zoom lens according to Embodiment 1 includes, in order from the object side, a first lens unit L1 having a positive refractive power, in which the entire lens unit or a part of the lens unit is moved in an optical axis direction to exert a focusing action. The zoom lens further includes a second lens unit L2 having a negative refractive power for zooming, which is configured to move from the object side to the image side for zooming from the wide-angle end to the telephoto end. The zoom lens further includes a third lens unit L3 having a positive refractive power and a fourth lens unit L4 having a positive refractive power for zooming, which are configured to move from the image side to the object side for zooming from the wide-angle end to the telephoto end. In Embodiment 1, the second lens unit L2, the third lens unit L3 and the fourth lens unit L4 form a zooming system. The zoom lens further includes a fifth lens unit L5 having a positive refractive power, which has an image forming action. An aperture stop SP is arranged between the fourth lens unit L4 and the fifth lens unit L5. A color separation prism or optical filter DG is illustrated as a glass block in FIG. 1. When the zoom lens is used as an image pickup optical system for a broadcasting television camera, a video camera, or a digital still camera, an image plane IP corresponds to an image pickup surface of, for example, a solid image pickup element (photoelectric conversion element) configured to receive and photoelectrically convert an image formed by the zoom lens. When the zoom lens is used as an image pickup optical system for a silver-halide film camera, the image plane IP corresponds to a film surface to be exposed with the image formed by the zoom lens.

Figure 2A:
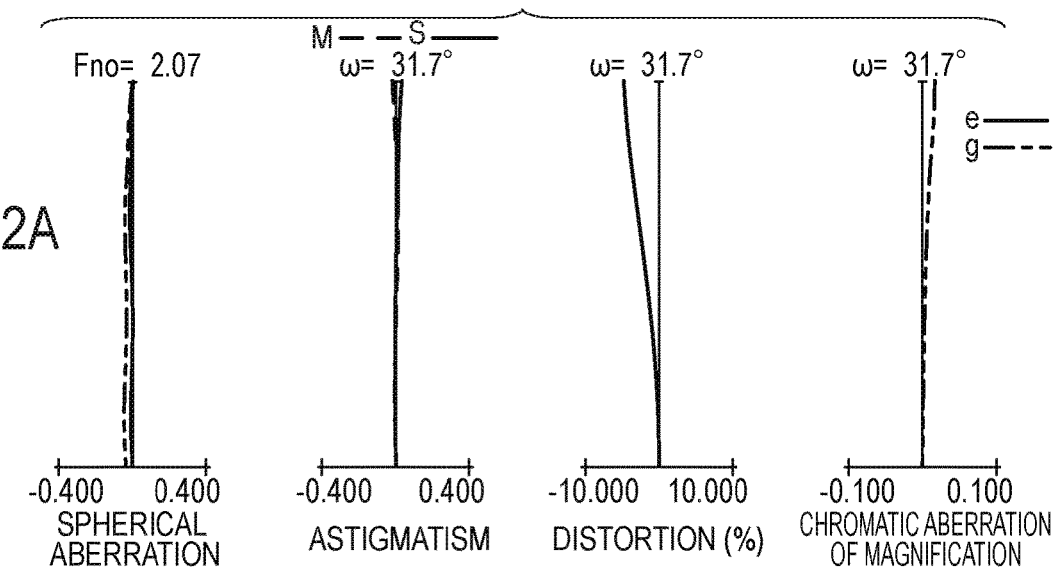
FIG. 2A shows aberration diagrams of the zoom lens according to Numerical Embodiment 1 at the wide-angle end (focal length: 8.90 mm) when the zoom lens is focused at infinity.
Figure 2B:
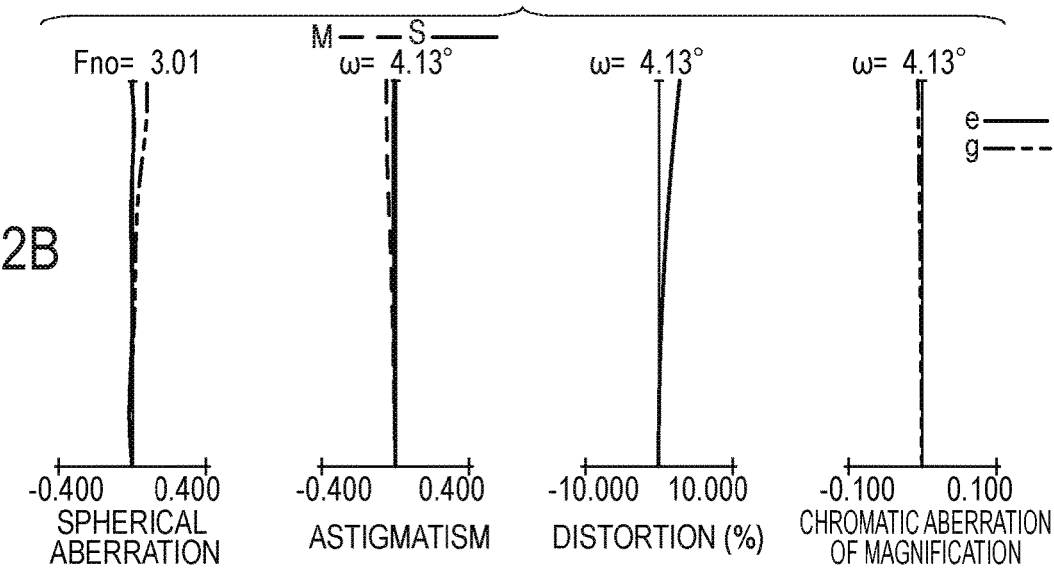
FIG. 2B shows aberration diagrams of the zoom lens according to Numerical Embodiment 1 at an intermediate zoom position (focal length: 76.14 mm) when the zoom lens is focused at infinity.
Figure 2C:
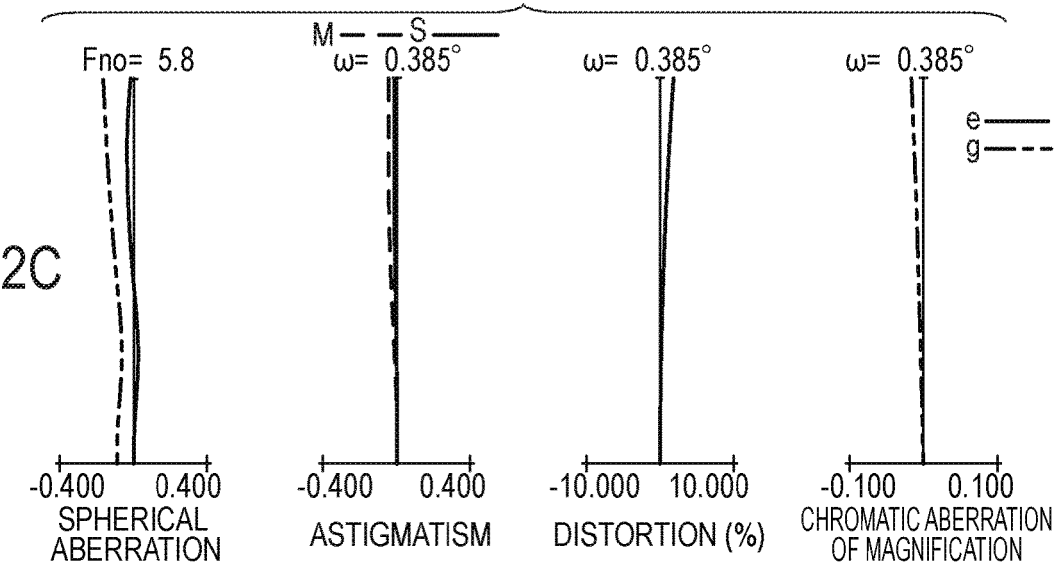
FIG. 2C shows aberration diagrams of the zoom lens according to Numerical Embodiment 1 at a telephoto end (focal length: 818.87 mm) when the zoom lens is focused at infinity.

FIG. 2A, FIG. 2B, and FIG. 2C are longitudinal aberration diagrams of the zoom lens according to Embodiment 1 at the wide-angle end (focal length: 8.90 mm), the intermediate zoom position (focal length: 76.14 mm), and the telephoto end (focal length: 818.87 mm) when the zoom lens is focused at infinity, respectively.

In each of the longitudinal aberration diagrams, spherical aberration is illustrated with respect to an e-line and a g-line by a straight line and a two-dot chain line, respectively. Further, astigmatism is illustrated on a meridional image plane by a dot line and on a sagittal image plane by a solid line. In addition, chromatic aberration of magnification is illustrated with respect to the g-line by a two-dot chain line. A half angle of view is denoted by "ω" and an f-number is denoted by Fno. In each of the longitudinal aberration diagrams, spherical aberration is illustrated in the unit of 0.4 mm, astigmatism in the unit of 0.4 mm, distortion in the unit of 10%, and chromatic aberration of magnification in the unit of 0.1 mm. In each Embodiment described below, each of the wide-angle end and the telephoto end refers to a zooming position obtained when the second lens unit L2 for zooming is positioned at each of the ends of a range in which the lens unit may mechanically move along the optical axis. All the lens cross-sectional views and aberration diagrams show a state in which the zoom lens is focused on an object at infinity. Further, values of focal lengths are values obtained by expressing Numerical Embodiments to be described below in units of mm. The same applies also to Numerical Embodiments below.

Numerical Embodiment 1 corresponding to Embodiment 1 is described. In all Numerical Embodiments without limiting to Numerical Embodiment 1, "i" represents the order from the object side of a surface (optical surface), "ri" represents a curvature radius of the i-th surface from the object side, and "di" represents an interval (on the optical axis) between the i-th surface and the (i+1)th surface from the object side. Further, "ndi" and "vdi" each represent a refractive index and an Abbe number of a medium (optical member) between the i-th surface and the (i+1)th surface, respectively. An Abbe number "v" is expressed by the following expression:

$v=(Nd-1)/(NF-NC)$, where NF, Nd, and NC represent refractive indices with respect to an F-line (486.1 nm), a d-line (587.6 nm), and a C-line (656.3 nm) of the Fraunhofer lines, respectively. When an X axis is defined in the optical axis direction, an H axis is defined in a direction perpendicular to an optical axis, a direction in which light travels is defined as positive, a paraxial curvature radius is represented by R, a conic constant is represented by "k", and aspherical coefficients are represented by A3 to A16, an aspherical shape is expressed by the following expression. Further. "e-Z" means "×10$^{-Z}$."

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16} + A3H^3 + A5H^5 + A7H^7 + A9H^9 + A11H^{11} + A13H^{13} + A15H^{15}$$

Correspondence with surface data of Numerical Embodiment 1 is described. The first lens unit L1 corresponds to the 1st surface to the 10th surface. The 1st surface to the 4th surface correspond to a first lens sub-unit L1 having a negative refractive power, which is configured not to move for focusing, and the 5th surface to the 10th surface correspond to a second lens sub-unit L2 having a positive refractive power, which is configured to move from an image pickup surface side to the object side for focusing from an infinity side to a proximity side. The second lens sub-unit L12 may adopt so-called "floating focus" system in which a part thereof is driven for focusing along a different locus so that aberration variation while being driven for focusing can be reduced. The second lens unit L2 corresponds to the 11th surface to the 17th surface. The third lens unit L3 corresponds to the 18th surface to the 23rd surface. The fourth lens unit L4 corresponds to the 24th surface to the 28th surface. The aperture stop corresponds to the 29th surface. The fifth lens unit L5 corresponds to the 30th surface to the 51st surface. The 52nd surface to the 54th surface correspond to a dummy glass DG, which corresponds to a color separation optical system, for example.

In Embodiment 1, a plurality of moving lens units configured to move for zooming correspond to the second lens unit L2, the third lens unit L3, and the fourth lens unit L4, and the second lens unit L2 has a negative refractive power. Further, the rear positive lens unit corresponds to the fourth lens unit L4. Still further, the first lens unit L1 includes four lenses having positive refractive powers (positive lenses). Still further, the rear lens unit corresponds to the fifth lens unit L5.

Values corresponding to the conditional expressions of Embodiment 1 are shown in Table 1. Embodiment 1 satisfies the expressions (1) to (7) so that lens effective diameters of the third lens unit L3 and the fourth lens unit L4, which tend to be increased in size in a related-art zoom lens, are suppressed to lower values as compared to a related-art product, and a strong power arrangement is easily achieved in the zooming lens unit, which is an advantageous structure in compacting power of the entire zoom lens to downsize and reduce the weight of the zoom lens. With the third lens unit L3 and the fourth lens unit L4 being reduced in size, aberration variation at the intermediate zoom position is easily suppressed, to thereby achieve the zoom lens having a wide angle of view, a high zoom ratio, a small size, a light weight, and high optical performance over the entire zoom range.

It is required for the zoom lens according to the present invention to satisfy the conditional expressions (1) and (2), but it is not necessarily required to satisfy the conditional expressions (3) to (7). It should be noted, however, that when at least one of the conditional expressions (3) to (7) is satisfied, more satisfactory effects can be provided. The same is true for Embodiments 1 to 6.

Figure 28:
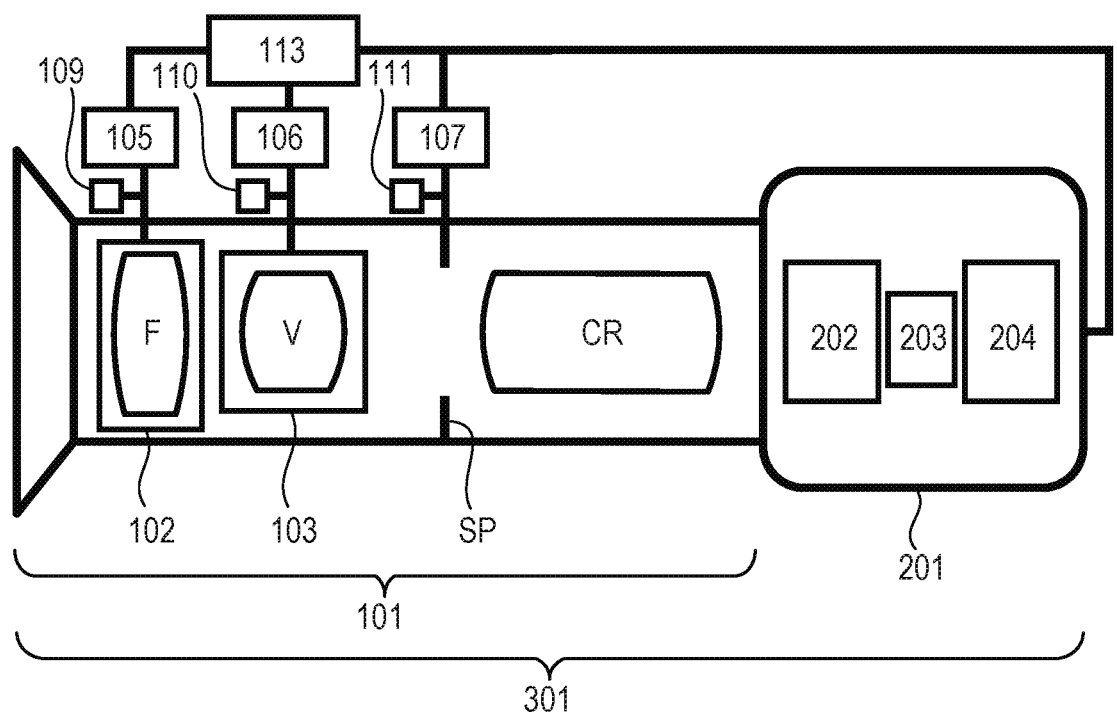
FIG. 28 is a schematic diagram of a main part of an image pickup apparatus according to the present invention.

FIG. 28 is a schematic diagram of an image pickup apparatus (television camera system) using the zoom lens of each of Embodiments as a photographing optical system. In FIG. 28, the zoom lens of any one of Embodiments 1 to 13 is denoted by 101. The zoom lens 101 is removable from a camera 201. The zoom lens 101 is attached to the camera 201 to form an image pickup apparatus 301. The zoom lens 101 includes a first lens unit F, a zooming portion V, and an imaging lens unit CR. The first lens unit F includes a focusing lens unit. The zooming portion V includes a plurality of moving lens units (such as second lens unit and third lens unit) configured to move on the optical axis for zooming. Drive mechanisms 102 and 103, such as helicoids or cams, are configured to drive the first lens unit F and the zooming portion V in the optical axis direction, respectively. Motors (drive units) 105 to 107 are configured to electrically drive the drive mechanisms 102 and 103 and an aperture stop SP. Detectors 109 to 111, such as encoders, potentiometers, or photosensors, are configured to detect positions on the optical axis of the first lens unit F and the zooming portion V, and an aperture diameter of the aperture stop SP, respectively. The camera 201 includes a glass block 202, which corresponds to an optical filter or a color separation optical system in the camera 201, and a solid image pickup element (photoelectric conversion element) 203, such as a CCD sensor or a CMOS sensor, which is configured to receive an object image formed by the zoom lens 101. Further, CPUs 204 and 113 are configured to control various kinds of driving of the camera 201 and the zoom lens 101, respectively.

As described above, the zoom lens according to the present invention is applied to a television camera to achieve an image pickup apparatus having high optical performance.

Embodiment 2

Figure 3:
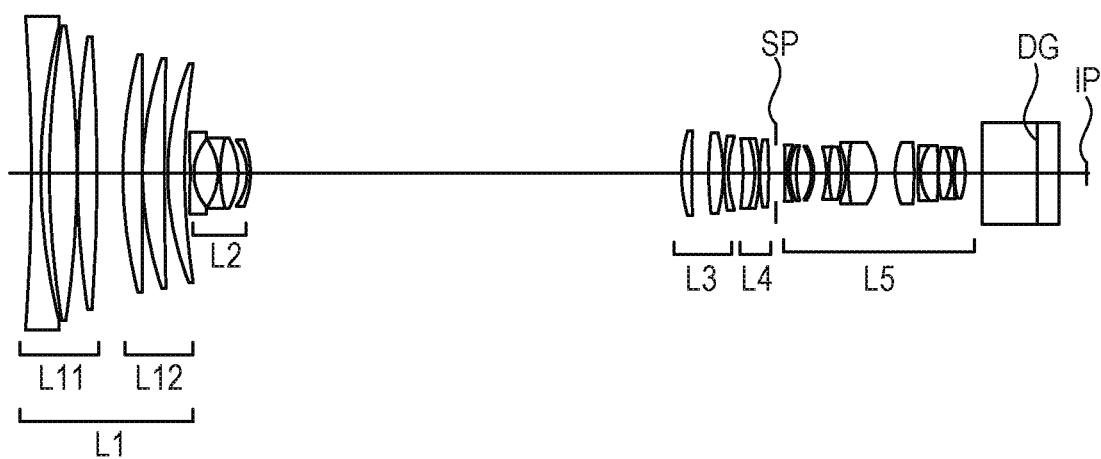
FIG. 3 is a lens cross-sectional view of a zoom lens according to Numerical Embodiment 2 at a wide-angle end (focal length: 7.25 mm) when the zoom lens is focused at infinity.

FIG. 3 is a lens cross-sectional view of a zoom lens according to Embodiment 2 (Numerical Embodiment 2) of the present invention at the wide-angle end (focal length: 7.25 mm) when the zoom lens is focused at infinity.

In FIG. 3, the zoom lens according to Embodiment 2 includes, in order from the object side, a first lens unit L1 having a positive refractive power, in which the entire lens unit or a part of the lens unit is moved in an optical axis direction to exert a focusing action. The zoom lens further includes a second lens unit L2 having a negative refractive power for zooming, which is configured to move from the object side to the image side for zooming from the wide-angle end to the telephoto end. The zoom lens further includes a third lens unit L3 having a positive refractive power and a fourth lens unit L4 having a positive refractive power for zooming, which are configured to move from the image side to the object side for zooming from the wide-angle end to the telephoto end. In Embodiment 2, the second lens unit L2, the third lens unit L3, and the fourth lens unit L4 form a zooming system. The zoom lens further includes a fifth lens unit L5 having a positive refractive power, which has an image forming action. An aperture stop SP is arranged between the fourth lens unit L4 and the fifth lens unit L5.

Figure 4A:
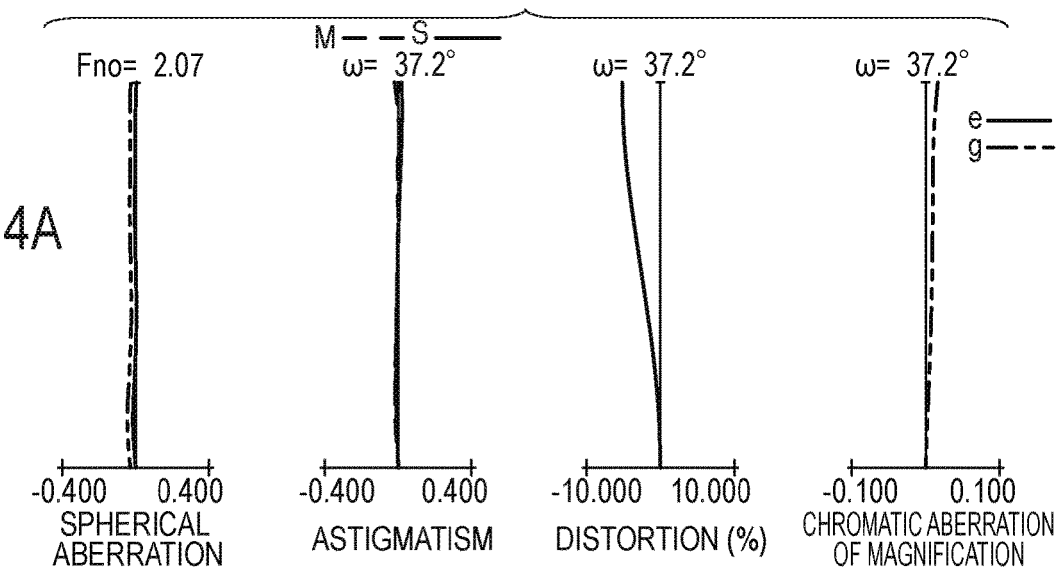
FIG. 4A shows aberration diagrams of the zoom lens according to Numerical Embodiment 2 at the wide-angle end (focal length: 7.25 mm) when the zoom lens is focused at infinity.
Figure 4B:
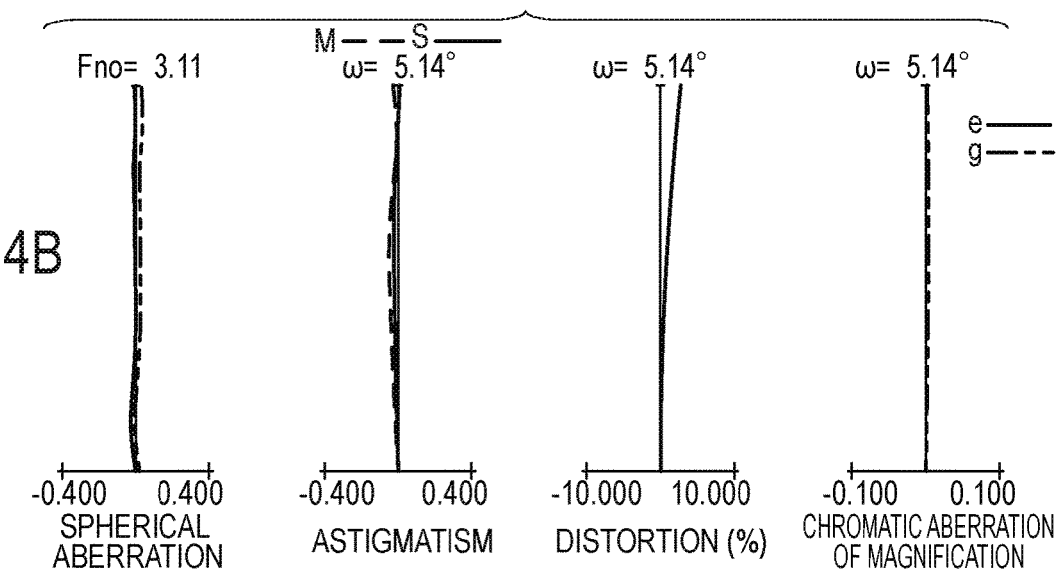
FIG. 4B shows aberration diagrams of the zoom lens according to Numerical Embodiment 2 at an intermediate zoom position (focal length: 61.20 mm) when the zoom lens is focused at infinity.
Figure 4C:
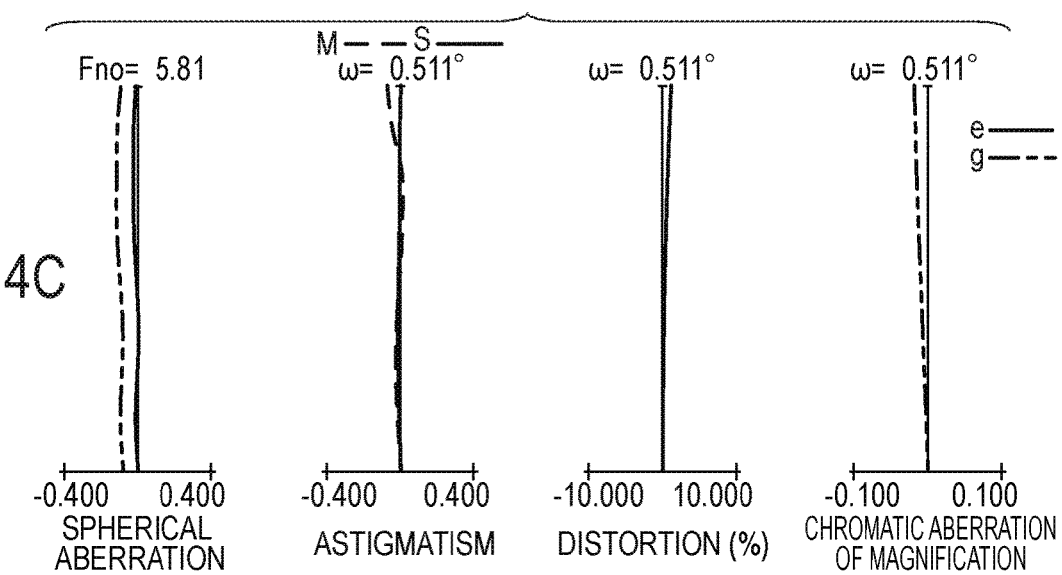
FIG. 4C shows aberration diagrams of the zoom lens according to Numerical Embodiment 2 at a telephoto end (focal length: 616.25 mm) when the zoom lens is focused at infinity.

FIG. 4A, FIG. 4B, and FIG. 4C are longitudinal aberration diagrams of the zoom lens according to Embodiment 2 at the wide-angle end (focal length: 7.25 mm), the intermediate zoom position (focal length: 61.20 mm), and the telephoto end (focal length: 616.25 mm) when the zoom lens is focused at infinity, respectively.

Correspondence with surface data of Numerical Embodiment 2 is described. The first lens unit L1 corresponds to the 1st surface to the 12th surface. The 1st surface to the 6th surface correspond to a first lens sub-unit L11 having a negative refractive power, which is configured not to move for focusing, and the 7th surface to the 12th surface corresponds to a second lens sub-unit L12 having a positive refractive power, which is configured to move from an image pickup surface side to the object side for focusing from an infinity side to a proximity side. The second lens sub-unit L12 may adopt what is called "floating focus" system in which a part thereof is driven for focusing along a different locus so that aberration variation while being driven for focusing can be reduced. The second lens unit L2 corresponds to the 13th surface to the 19th surface. The third lens unit L3 corresponds to the 20th surface to the 25th surface. The fourth lens unit L4 corresponds to the 26th surface to the 30th surface. The aperture stop corresponds to the 31st surface. The fifth lens unit L5 corresponds to the 32nd surface to the 53rd surface. The 54th surface to the 56th surface correspond to a dummy glass DG, which corresponds to a color separation optical system, for example.

In Embodiment 2, a plurality of moving lens units configured to move for zooming correspond to the second lens unit L2, the third lens unit L3, and the fourth lens unit L4, and the second lens unit L2 has a negative refractive power. Further, the rear positive lens unit corresponds to the fourth lens unit L4. Still further, the first lens unit L1 includes five lenses having positive refractive powers (positive lenses). Still further, the rear lens unit corresponds to the fifth lens unit L5.

Values corresponding to the conditional expressions of Embodiment 2 are shown in Table 1. Embodiment 2 satisfies the conditional expressions (1) to (7) so that, as with the other Embodiments, the zoom lens having a wide angle of view, a high zoom ratio, a small size, a light weight, and high optical performance over the entire zoom range is achieved.

Embodiment 3

Figure 5:
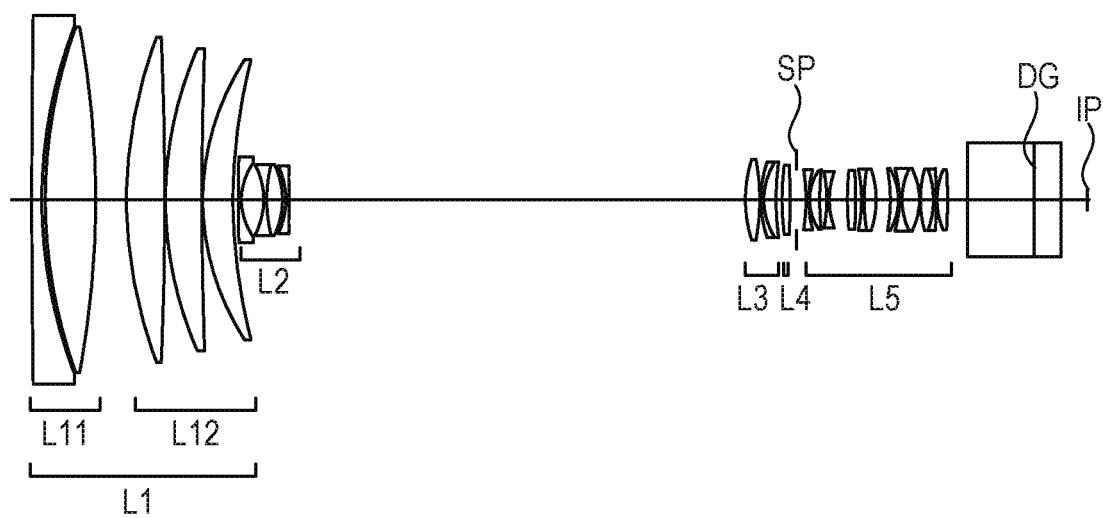
FIG. 5 is a lens cross-sectional view of a zoom lens according to Numerical Embodiment 3 at a wide-angle end (focal length: 8.00 mm) when the zoom lens is focused at infinity.

FIG. 5 is a lens cross-sectional view of a zoom lens according to Embodiment 3 (Numerical Embodiment 3) of the present invention at the wide-angle end (focal length: 8.00 mm) when the zoom lens is focused at infinity.

In FIG. 5, the zoom lens according to Embodiment 3 includes, in order from the object side, a first lens unit L having a positive refractive power, in which the entire lens unit or a part of the lens unit is moved in an optical axis direction to exert a focusing action. The zoom lens further includes a second lens unit L2 having a negative refractive power for zooming, which is configured to move from the object side to the image side for zooming from the wide-angle end to the telephoto end. The zoom lens further includes a third lens unit L3 having a positive refractive power and a fourth lens unit L4 having a positive refractive power for zooming, which are configured to move from the image side to the object side for zooming from the wide-angle end to the telephoto end. In Embodiment 3, the second lens unit L2, the third lens unit L3, and the fourth lens unit L4 form a zooming system. The zoom lens further includes a fifth lens unit L5 having a positive refractive power, which has an image forming action. An aperture stop SP is arranged between the fourth lens unit L4 and the fifth lens unit L5.

Figure 6A:
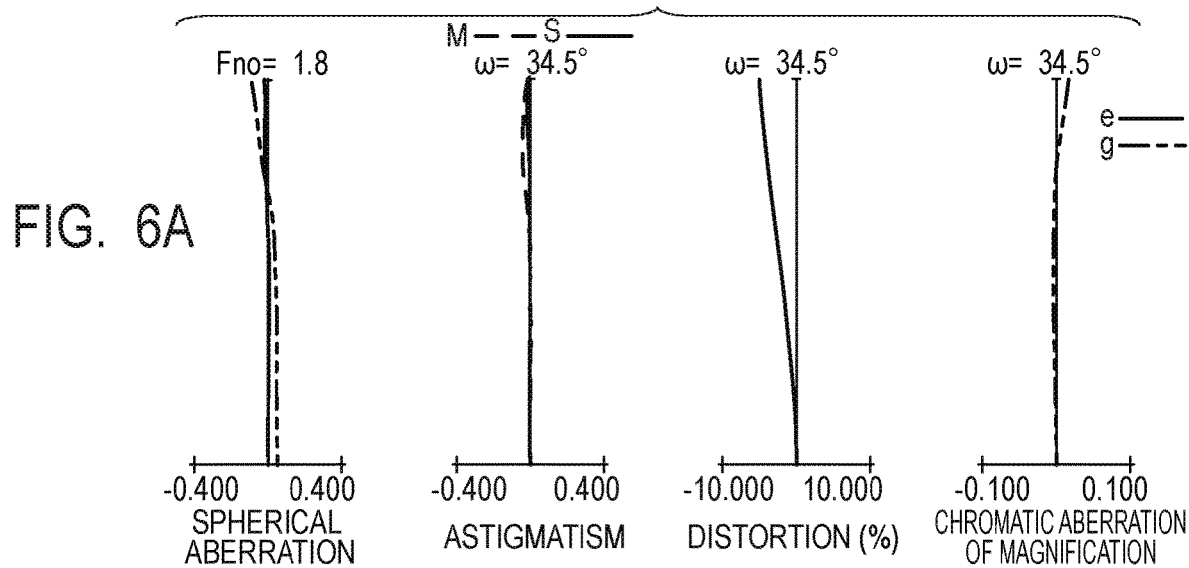
FIG. 6A shows aberration diagrams of the zoom lens according to Numerical Embodiment 3 at the wide-angle end (focal length: 8.00 mm) when the zoom lens is focused at infinity.
Figure 6B:
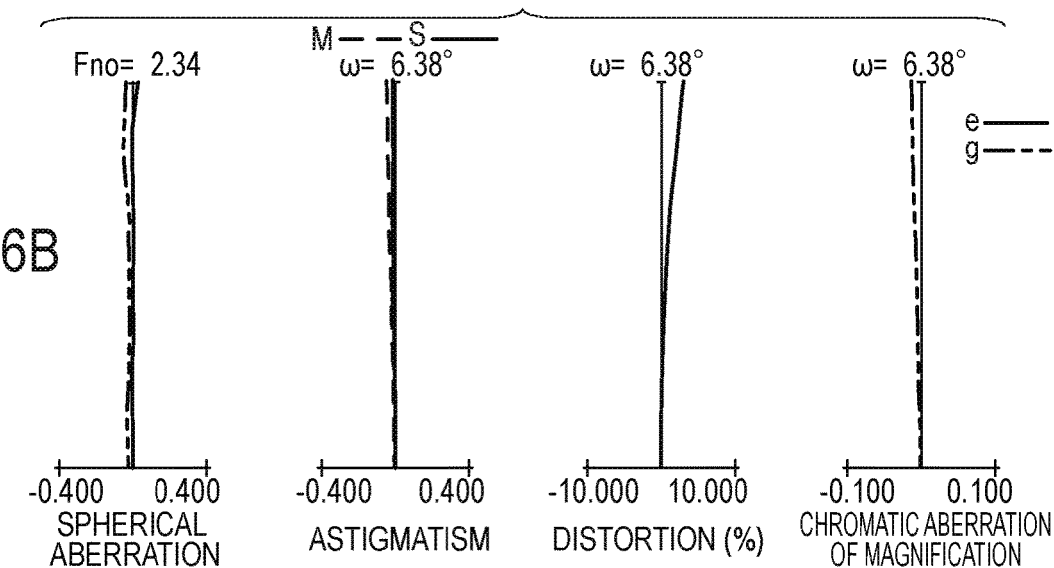
FIG. 6B shows aberrations diagram of the zoom lens according to Numerical Embodiment 3 at an intermediate zoom position (focal length: 49.17 mm) when the zoom lens is focused at infinity.
Figure 6C:
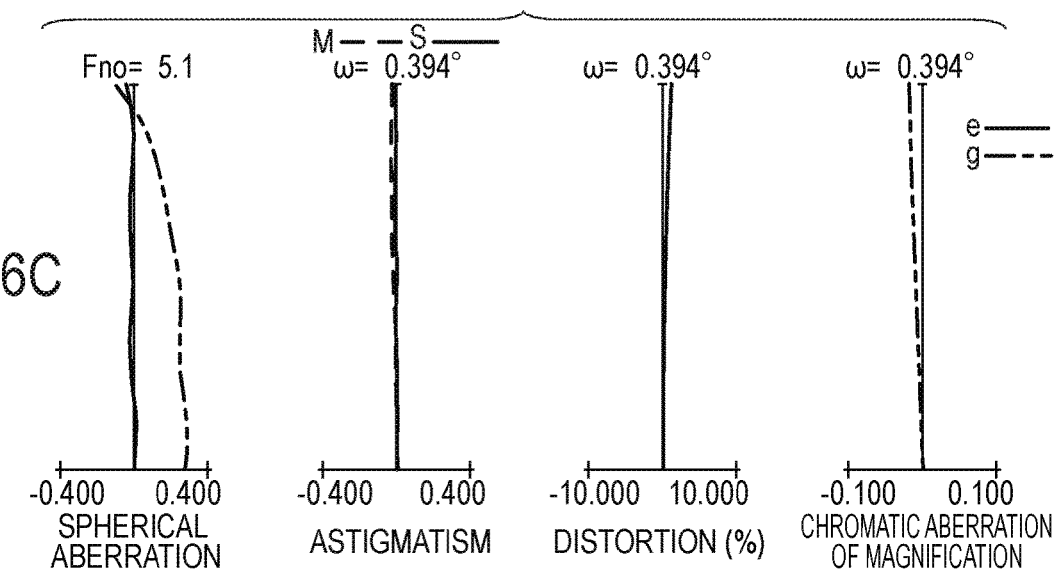
FIG. 6C shows aberration diagrams of the zoom lens according to Numerical Embodiment 3 at a telephoto end (focal length: 800.00 mm) when the zoom lens is focused at infinity.

FIG. 6A, FIG. 6B, and FIG. 6C are longitudinal aberration diagrams of the zoom lens according to Embodiment 3 at the wide-angle end (focal length: 8.00 mm), the intermediate zoom position (focal length: 49.17 mm), and the telephoto end (focal length: 800.00 mm) when the zoom lens is focused at infinity, respectively.

Next, correspondence with surface data of Numerical Embodiment 3 is described. The first lens unit L1 corresponds to the 1st surface to the 10th surface. The 1st surface to the 4th surface correspond to a first lens sub-unit L11 having a negative refractive power, which is configured not to move for focusing, and the 5th surface to the 10th surface corresponds to a second lens sub-unit L12 having a positive refractive power, which is configured to move from an image pickup surface side to the object side for focusing from an infinity side to a proximity side. The second lens sub-unit L12 may adopt what is called "floating focus" system in which a part thereof is driven for focusing along a different locus so that aberration variation while being driven for focusing can be reduced. The second lens unit L2 corresponds to the 11th surface to the 17th surface. The third lens unit L3 corresponds to the 18th surface to the 22nd surface. The fourth lens unit L4 corresponds to the 23rd surface to the 24th surface. The aperture stop corresponds to the 25th surface. The fifth lens unit L5 corresponds to the 26th surface to the 46th surface. The 47th surface to the 49th surface correspond to a dummy glass DG, which corresponds to a color separation optical system, for example.

In Embodiment 3, a plurality of moving lens units configured to move for zooming correspond to the second lens unit L2, the third lens unit L3, and the fourth lens unit L4, and the second lens unit L2 has a negative refractive power. Further, the rear positive lens unit corresponds to the fourth lens unit L4. Still further, the first lens unit L1 includes four lenses having positive refractive powers (positive lenses). Still further, the rear lens unit corresponds to the fifth lens unit L5.

Values corresponding to the conditional expressions of Embodiment 3 are shown in Table 1. Embodiment 3 appropriately satisfies the conditional expressions (1) to (7) so that, as with the other Embodiments, the zoom lens having a wide angle of view, a high zoom ratio, a small size, a light weight, and high optical performance over the entire zoom range is achieved.

Embodiment 4

Figure 7:
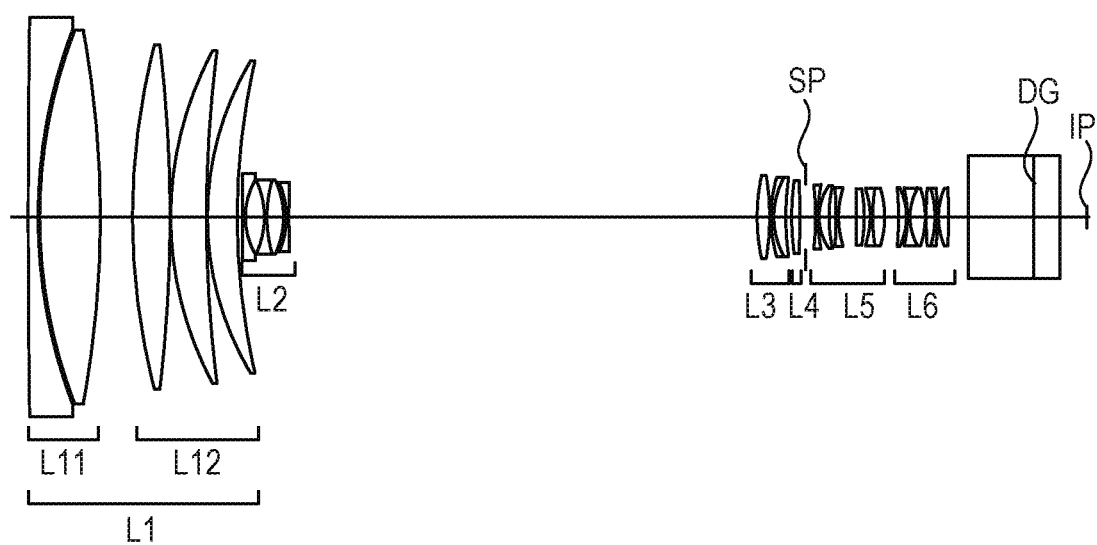
FIG. 7 is a lens cross-sectional view of a zoom lens according to Numerical Embodiment 4 at a wide-angle end (focal length: 8.00 mm) when the zoom lens is focused at infinity.

FIG. 7 is a lens cross-sectional view of a zoom lens according to Embodiment 4 (Numerical Embodiment 4) of the present invention at the wide-angle end (focal length: 8.00 mm) when the zoom lens is focused at infinity.

In FIG. 7, the zoom lens according to Embodiment 4 includes, in order from the object side, a first lens unit L1 having a positive refractive power, in which the entire lens unit or a part of the lens unit is moved in an optical axis direction to exert a focusing action. The zoom lens further includes a second lens unit L2 having a negative refractive power for zooming, which is configured to move from the object side to the image side for zooming from the wide-angle end to the telephoto end. The zoom lens further includes a third lens unit L3 having a positive refractive power and a fourth lens unit L4 having a positive refractive power for zooming, which are configured to move from the image side to the object side for zooming from the wide-angle end to the telephoto end. The zoom lens further includes a fifth lens unit L5 having a negative refractive power. An aperture stop SP is arranged between the fourth lens unit L4 and the fifth lens unit L5. The zoom lens further includes a sixth lens unit L6 having a positive refractive power for zooming, which is configured to move on the optical axis along with zooming. In Embodiment 4, the second lens unit L2, the third lens unit L3, the fourth lens unit L4, and the sixth lens unit L6 form a zooming system.

Figure 8A:
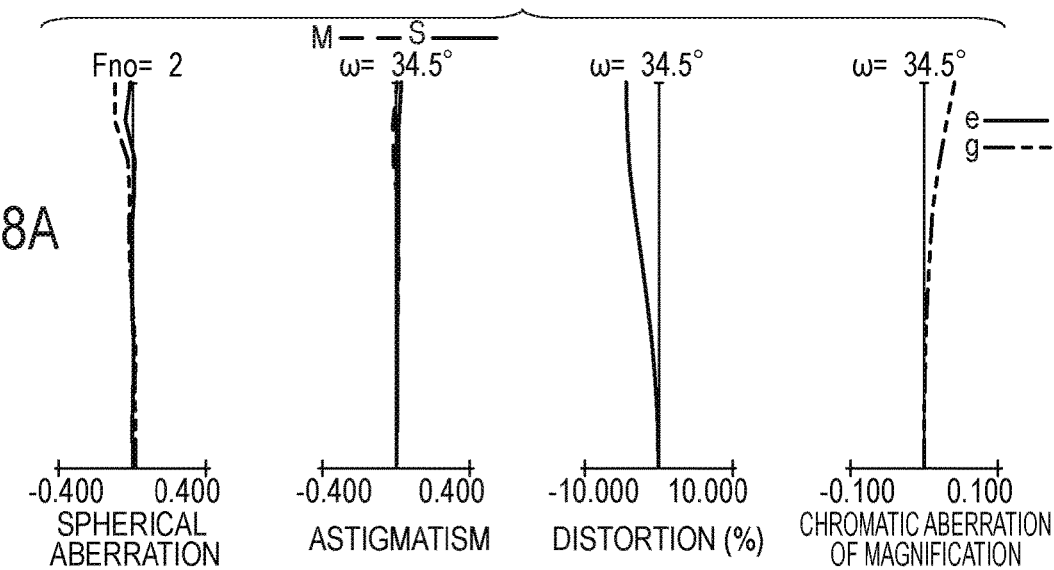
FIG. 8A shows aberration diagrams of the zoom lens according to Numerical Embodiment 4 at the wide-angle end (focal length: 8.00 mm) when the zoom lens is focused at infinity.
Figure 8B:
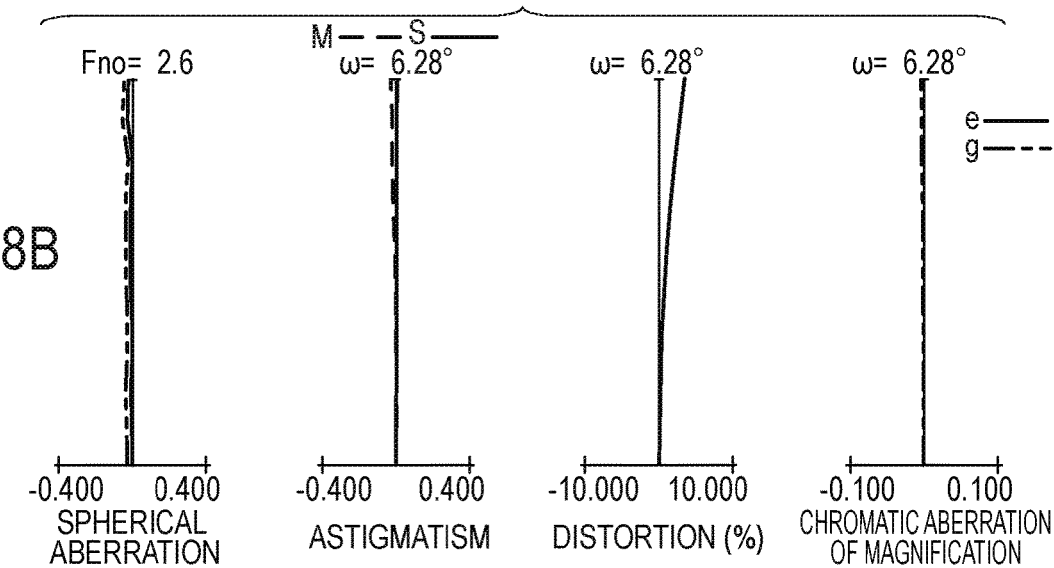
FIG. 8B shows aberration diagrams of the zoom lens according to Numerical Embodiment 4 at an intermediate zoom position (focal length: 50.00 mm) when the zoom lens is focused at infinity.
Figure 8C:
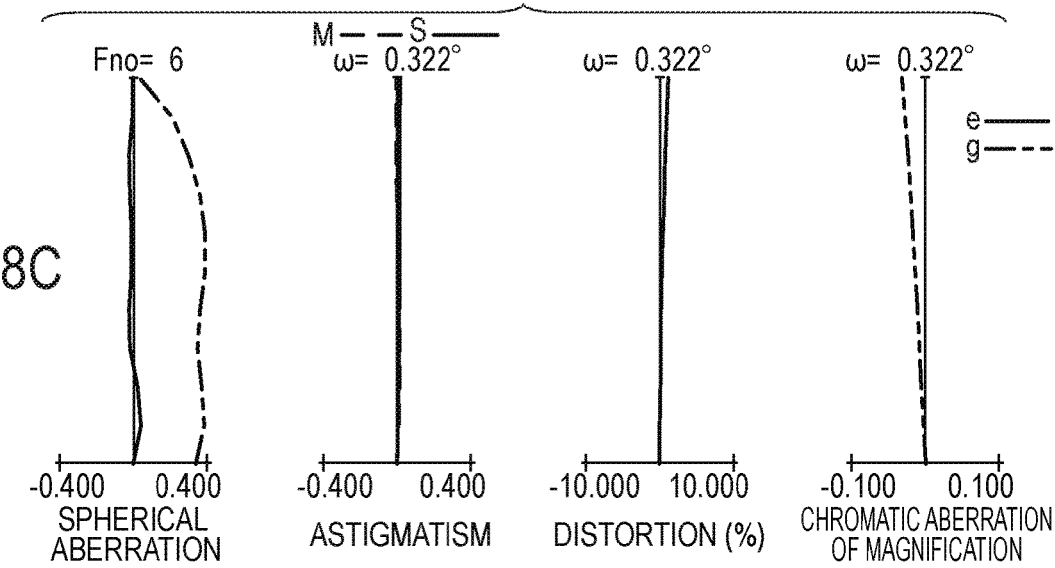
FIG. 8C shows aberration diagrams of the zoom lens according to Numerical Embodiment 4 at a telephoto end (focal length: 980.00 mm) when the zoom lens is focused at infinity.

FIG. 8A, FIG. 8B, and FIG. 8C are longitudinal aberration diagrams of the zoom lens according to Embodiment 4 at the wide-angle end (focal length: 8.00 mm), the intermediate zoom position (focal length: 50.00 mm), and the telephoto end (focal length: 980.00 mm) when the zoom lens is focused at infinity, respectively.

Next, correspondence with surface data of Numerical Embodiment 4 is described. The first lens unit L1 corresponds to the 1st surface to the 10th surface. The 1st surface to the 4th surface correspond to a first lens sub-unit L11 having a negative refractive power, which is configured not to move for focusing. The 5th surface to the 10th surface correspond to a second lens sub-unit L12 having a positive refractive power, which is configured to move from the object side toward an image pickup surface side for focusing from the infinity side to the proximity side. The second lens sub-unit L12 may adopt what is called "floating focus" system in which a part thereof is driven for focusing along a different locus so that aberration variation while being driven for focusing can be reduced. The second lens unit L2 corresponds to the 11th surface to the 17th surface. The third lens unit L3 corresponds to the 18th surface to the 22nd surface. The fourth lens unit L4 corresponds to the 23rd surface to the 24th surface. The aperture stop corresponds to the 25th surface. The fifth lens unit L5 corresponds to the 26th surface to the 36th surface. The sixth lens unit L6 corresponds to the 37th surface to the 46th surface. The 47th surface to the 49th surface correspond to a dummy glass DG, which corresponds to a color separation optical system, for example.

In Embodiment 4, a plurality of moving lens units configured to move for zooming correspond to the second lens unit L2, the third lens unit L3, and the fourth lens unit L4, and the second lens unit L2 has a negative refractive power. Further, the rear positive lens unit corresponds to the fourth lens unit L4. Still further, the first lens unit L1 includes four lenses having positive refractive powers (positive lenses). Still further, the rear lens unit corresponds to the fifth lens unit L5 and the sixth lens unit L6.

Values corresponding to the conditional expressions of Embodiment 4 are shown in Table 1. Embodiment 4 satisfies the conditional expressions (1) to (7) so that, as with the other Embodiments, the zoom lens having a wide angle of view, a high zoom ratio, a small size, a light weight, and high optical performance over the entire zoom range is achieved.

Embodiment 51

Figure 9:
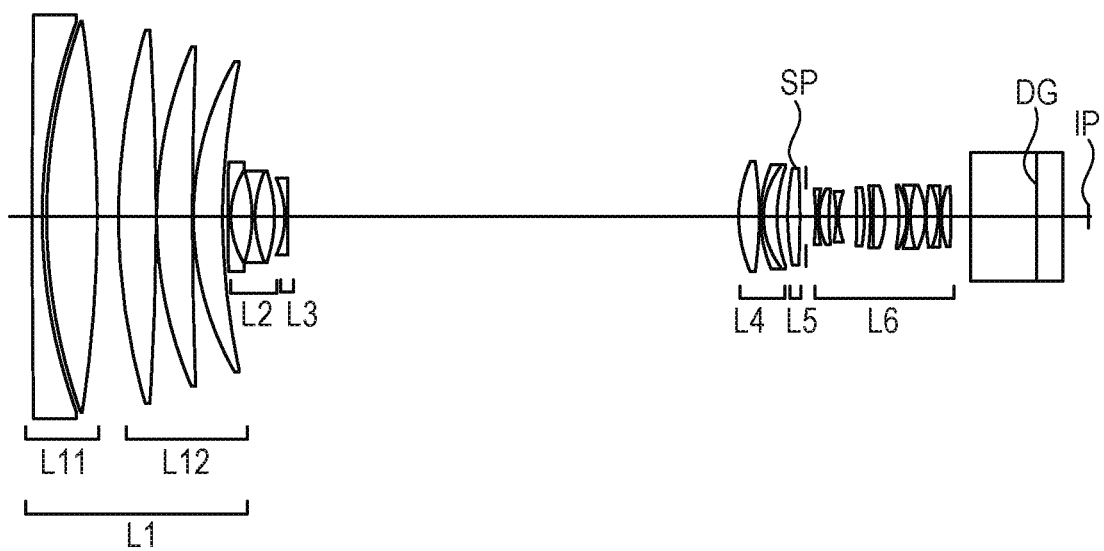
FIG. 9 is a lens cross-sectional view of a zoom lens according to Numerical Embodiment 5 at a wide-angle end (focal length: 8.00 mm) when the zoom lens is focused at infinity.

FIG. 9 is a lens cross-sectional view of a zoom lens according to Embodiment 5 (Numerical Embodiment 5) of the present invention at the wide-angle end (focal length: 8.00 mm) when the zoom lens is focused at infinity.

In FIG. 9, the zoom lens according to Embodiment 5 includes, in order from the object side, a first lens unit L1 having a positive refractive power, in which the entire lens unit or a part of the lens unit is moved in an optical axis direction to exert a focusing action. The zoom lens further includes a second lens unit L2 having a negative refractive power and a third lens unit L3 having a negative refractive power for zooming, which are configured to move from the object side to the image side for zooming from the wide-angle end to the telephoto end. The zoom lens further includes a fourth lens unit L4 having a positive refractive power and a fifth lens unit L5 having a positive refractive power for zooming, which are configured to move from the image side to the object side for zooming from the wide-angle end to the telephoto end. In Embodiment 5, the second lens unit L2, the third lens unit L3, the fourth lens unit L4, and the fifth lens unit L5 form a zooming system. The zoom lens further includes a sixth lens unit L6 having a positive refractive power, which has an image forming action. An aperture stop SP is arranged between the fifth lens unit L5 and the sixth lens unit L6.

Figure 10A:
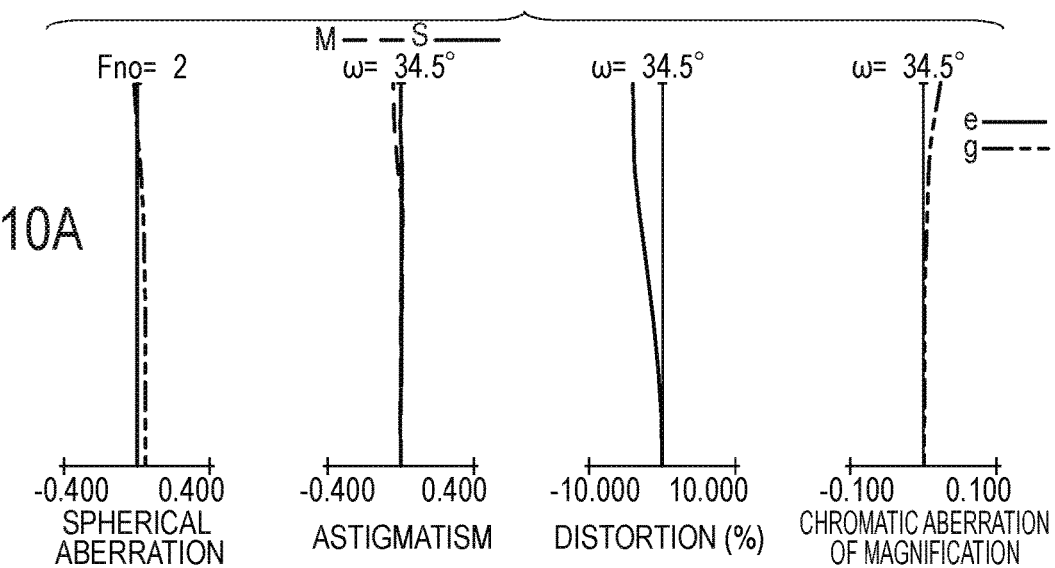
FIG. 10A shows aberration diagrams of the zoom lens according to Numerical Embodiment 5 at the wide-angle end (focal length: 8.00 mm) when the zoom lens is focused at infinity.
Figure 10B:
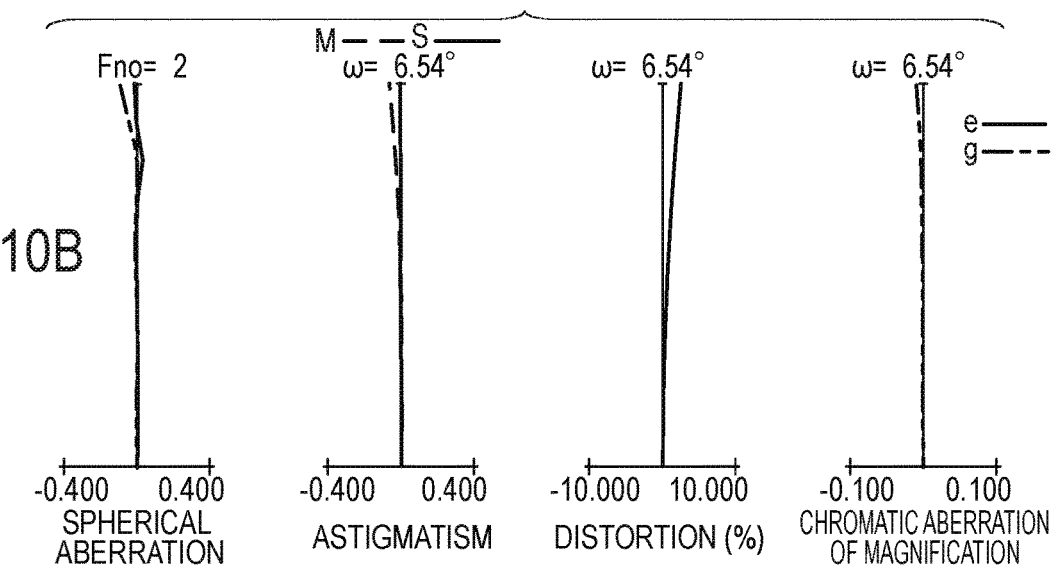
FIG. 10B shows aberration diagrams of the zoom lens according to Numerical Embodiment 5 at an intermediate zoom position (focal length: 48.00 mm) when the zoom lens is focused at infinity.
Figure 10C:
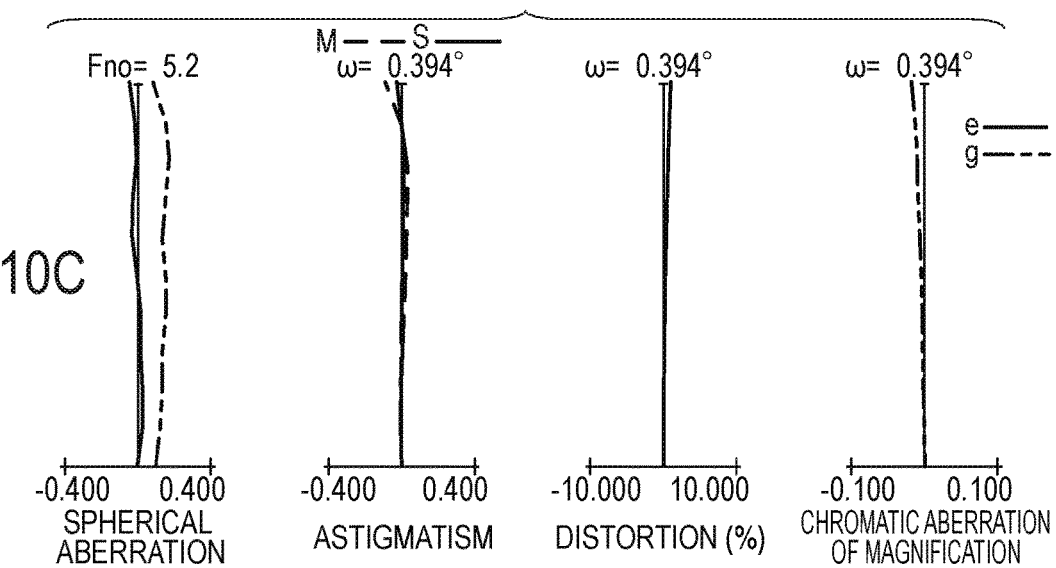
FIG. 10C shows aberration diagrams of the zoom lens according to Numerical Embodiment 5 at a telephoto end (focal length: 800.00 mm) when the zoom lens is focused at infinity.

FIG. 10A, FIG. 10B, and FIG. 10C are longitudinal aberration diagrams of the zoom lens according to Embodiment 5 at the wide-angle end (focal length: 8.00 mm), the intermediate zoom position (focal length: 48.00 mm), and the telephoto end (focal length: 800.00 mm) when the zoom lens is focused at infinity, respectively.

Next, correspondence with surface data of Numerical Embodiment 5 is described. The first lens unit L1 corresponds to the 1st surface to the 10th surface. The 1st surface to the 4th surface correspond to a first lens sub-unit L11 having a negative refractive power, which is configured not to move for focusing. The 5th surface to the 10th surface correspond to a second lens sub-unit L12 having a positive refractive power, which is configured to move from the object side toward an image pickup surface side for focusing from the infinity side to the proximity side. The second lens sub-unit L12 may adopt what is called "floating focus" system in which a part thereof is driven for focusing along a different locus so that aberration variation while being driven for focusing can be reduced. The second lens unit L2 corresponds to the 11th surface to the 15th surface. The third lens unit L3 corresponds to the 16th surface and the 17th surface. The fourth lens unit L4 corresponds to the 18th surface to the 22nd surface. The fifth lens unit L5 corresponds to the 23rd surface and the 24th surface. The aperture stop corresponds to the 25th surface. The sixth lens unit L6 corresponds to the 26th surface to the 46th surface. The 47th surface to the 49th surface correspond to a dummy glass DG, which corresponds to a color separation optical system, for example.

In Embodiment 5, a plurality of moving lens units configured to move for zooming correspond to the second lens unit L2, the third lens unit L3, the fourth lens unit L4, and the fifth lens unit L5, and the second lens unit L2 and the third lens unit L3 have negative refractive powers. Further, the rear positive lens unit corresponds to the fifth lens unit L5. Still further, the first lens unit L1 includes four lenses having positive refractive powers (positive lenses). Still further, the rear lens unit corresponds to the sixth lens unit L6.

Values corresponding to the conditional expressions of Embodiment 5 are shown in Table 1. Embodiment 5 satisfies the conditional expressions (1) to (7) so that, as with the other Embodiments, the zoom lens having a wide angle of view, a high zoom ratio, a small size, a light weight, and high optical performance over the entire zoom range is achieved.

Embodiment 61

Figure 11:
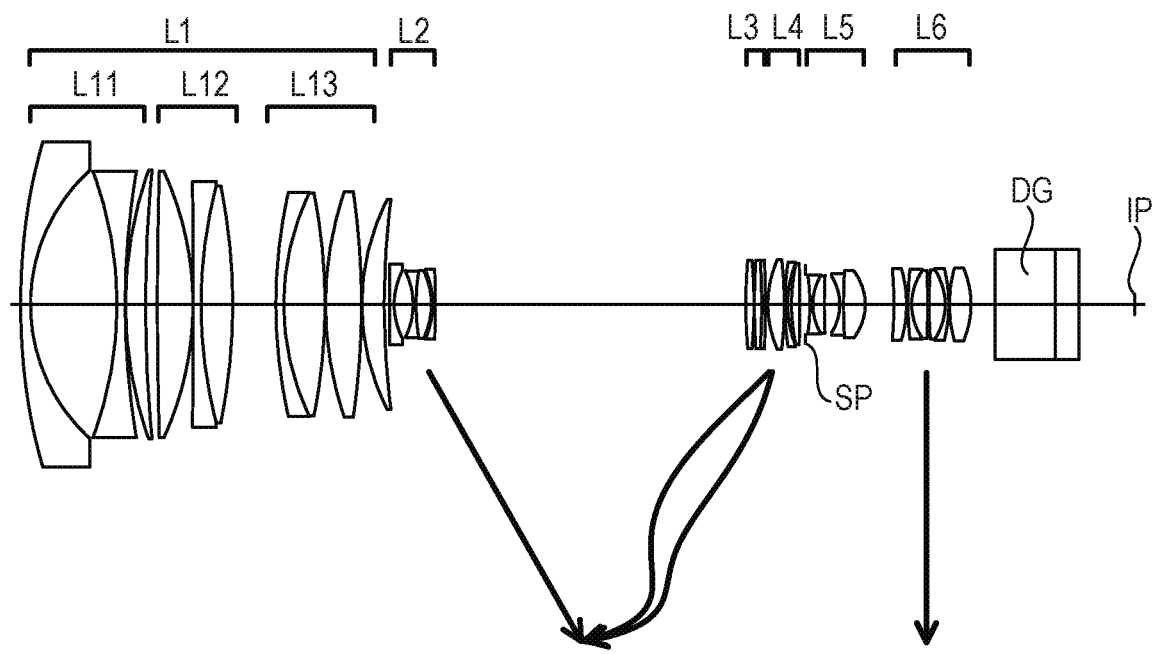
FIG. 11 is a lens cross-sectional view of a zoom lens according to Numerical Embodiment 6 at a wide-angle end (6.00 mm) when the zoom lens is focused at infinity.

FIG. 11 is a lens cross-sectional view of a zoom lens according to Embodiment 6 (Numerical Embodiment 6) of the present invention at the wide-angle end (focal length: 6.00 mm) when the zoom lens is focused at infinity.

In FIG. 11, the zoom lens according to Embodiment 6 includes, in order from the object side, a first lens unit L1 having a positive refractive power, in which the entire lens unit or a part of the lens unit is moved in an optical axis direction to exert a focusing action. The zoom lens further includes a second lens unit L2 having a negative refractive power for zooming, which is configured to move from the object side to the image side for zooming from the wide-angle end to the telephoto end. The zoom lens further includes a third lens unit L3 having a positive refractive power and a fourth lens unit L4 having a positive refractive power for zooming, which are configured to move from the image side to the object side for zooming from the wide-angle end to the telephoto end. The zoom lens further includes a fifth lens unit L5 having a negative refractive power. The zoom lens further includes a sixth lens unit L6 having a positive refractive power for magnification varying, which is configured to move on the optical axis along with zooming. In Embodiment 6, the second lens unit L2, the third lens unit L3, the fourth lens unit L4, and the sixth lens unit L6 form a zooming system. An aperture stop SP is arranged between the fourth lens unit L4 and the fifth lens unit L5. In Embodiment 6, the moving lens units correspond to the third lens unit L3 and the fourth lens unit L4, the rear lens unit corresponds to the fifth lens unit L5 and the sixth lens unit L6, the rear positive lens unit corresponds to the fourth lens unit L4, and the front negative lens unit corresponds to the second lens unit.

In Embodiment 6, the second lens unit L2, the third lens unit L3, and the fourth lens unit L4 form a zooming system. The aperture stop SP is arranged between the fourth lens unit L4 and the fifth lens unit L5. Further, the aperture stop is configured not to move in the optical axis direction for zooming.

Figure 12A:
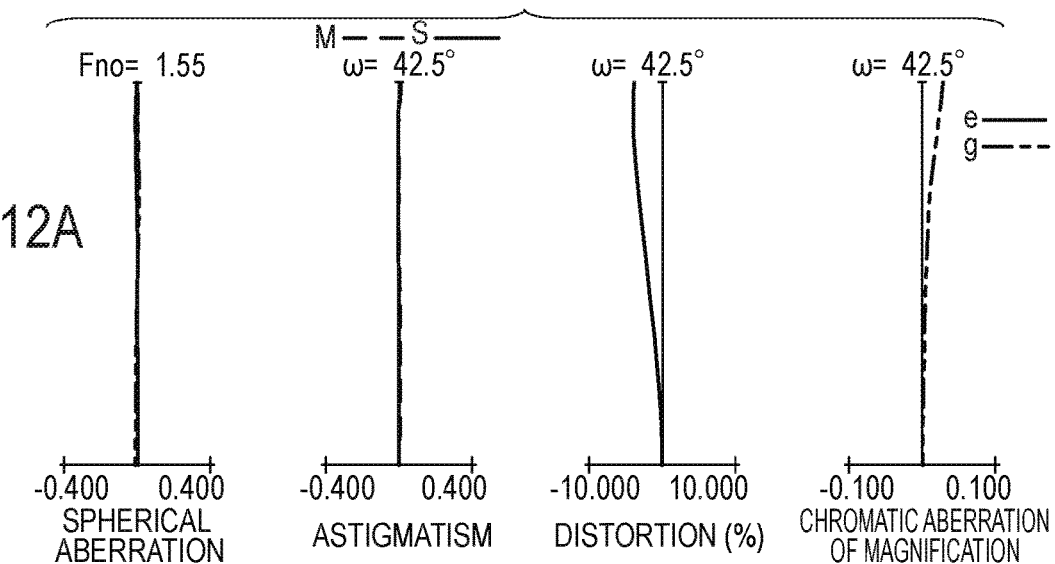
FIG. 12A shows aberration diagrams of the zoom lens according to Numerical Embodiment 6 at the wide-angle end (6.00 mm) when the zoom lens is focused at infinity.
Figure 12B:
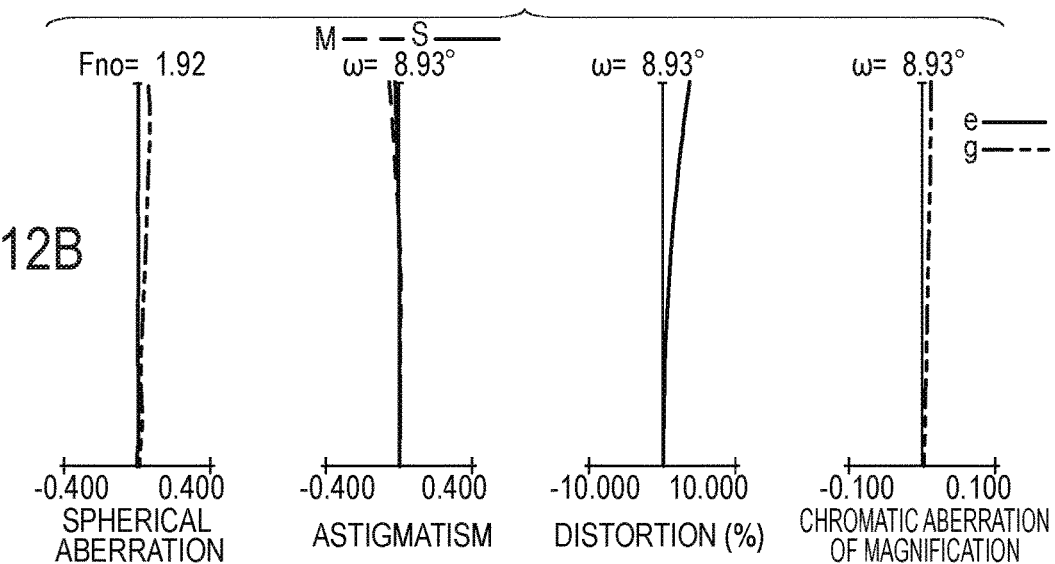
FIG. 12B shows aberration diagrams of the zoom lens according to Numerical Embodiment 6 at an intermediate zoom position (focal length: 35.00 mm) when the zoom lens is focused at infinity.
Figure 12C:
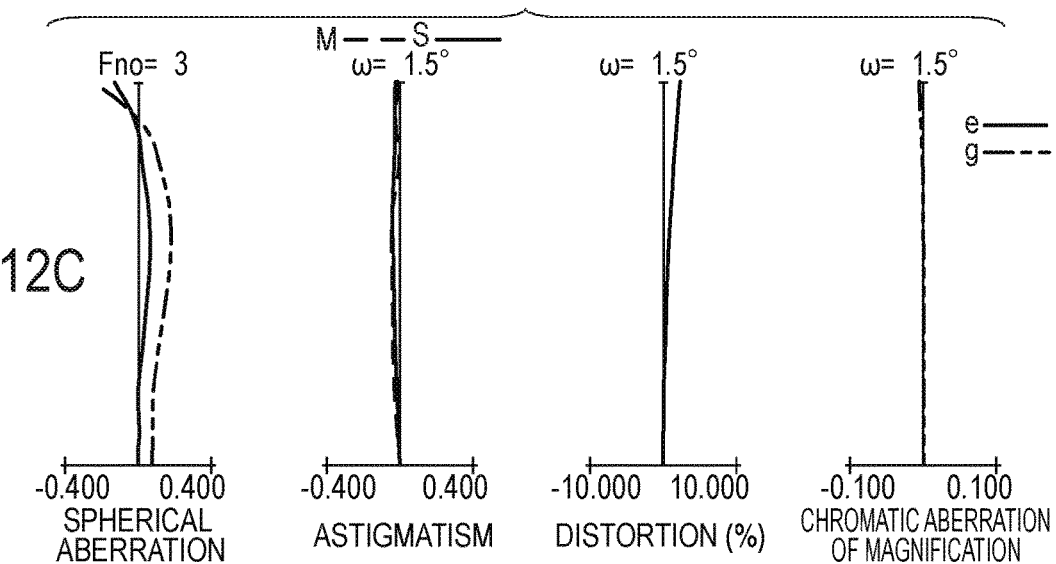
FIG. 12C shows aberration diagrams of the zoom lens according to Numerical Embodiment 6 at a telephoto end (209.98 mm) when the zoom lens is focused at infinity.

FIG. 12A, FIG. 12B, and FIG. 12C are longitudinal aberration diagrams of the zoom lens according to Embodiment 6 at the wide-angle end (focal length: 6.00 mm), the intermediate zoom position (focal length: 35.00 mm), and the telephoto end (focal length: 209.98 mm) when the zoom lens is focused at infinity, respectively.

Next, correspondence with surface data of Numerical Embodiment 6 is described. The first lens unit L1 corresponds to the 1st surface to the 18th surface. The 1st surface to the 6th surface correspond to a first lens sub-unit L11 having a negative refractive power, which is configured not to move for focusing. The 7th surface to the 11th surface corresponds to a second lens sub-unit L12 having a positive refractive power, which is configured to move from the object side to an image pickup surface side for focusing from an infinity side to a proximity side. The 12th surface to the 18th surface correspond to a third lens sub-unit L13 having a positive refractive power, which is configured not to move for focusing. The second lens unit L2 corresponds to the 19th surface to the 25th surface. The third lens unit L3 corresponds to the 26th surface to the 30th surface. The fourth lens unit L4 corresponds to the 31st surface to the 36th surface. The aperture stop corresponds to the 37th surface. The fifth lens unit L5 corresponds to the 38th surface to the 43rd surface. The sixth lens unit L6 corresponds to the 44th surface to the 53rd surface. The 54th surface to the 56th surface correspond to a dummy glass DG, which corresponds to a color separation optical system, for example.

In Embodiment 6, a plurality of moving lens units configured to move for zooming correspond to the second lens unit L2, the third lens unit L3, and the fourth lens unit L4, and the second lens unit L2 has a negative refractive power. Further, the rear positive lens unit corresponds to the fourth lens unit L4. Still further, the first lens unit L1 includes six lenses having positive refractive powers (positive lenses). Still further, the rear lens unit corresponds to the fifth lens unit L5 and the sixth lens unit L6.

Values corresponding to the conditional expressions of Embodiment 6 are shown in Table 1. Embodiment 6 satisfies the conditional expressions (1), (2), (4), (5), and (8) to (16) so that, as with the other Embodiments, the zoom lens having a wide angle of view, a high zoom ratio, a small size, a light weight, and high optical performance over the entire zoom range is achieved.

Embodiment 7

Figure 13:
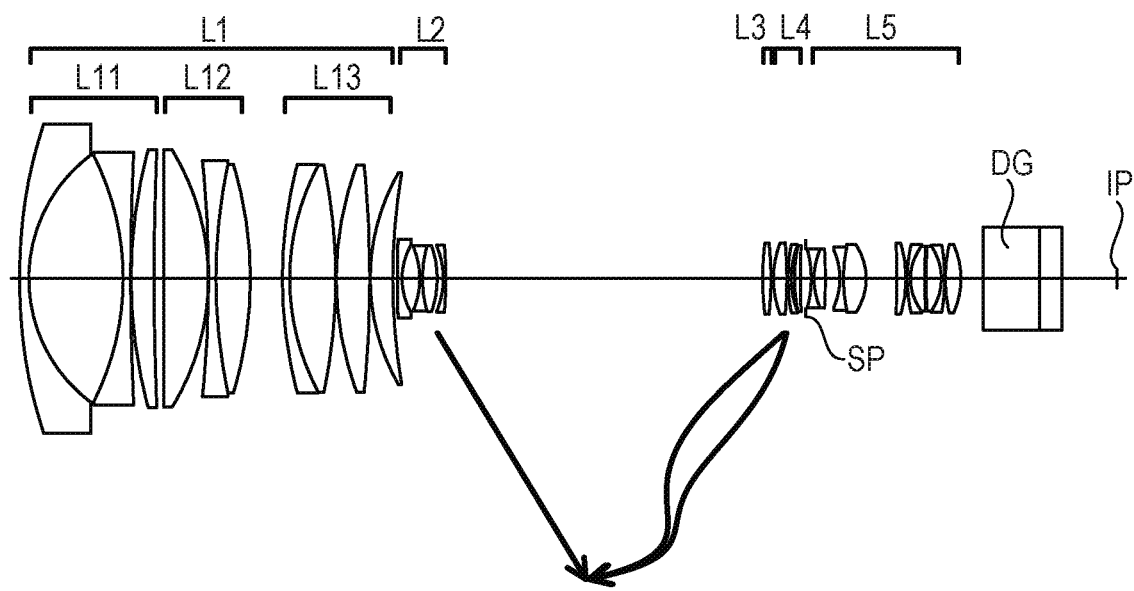
FIG. 13 is a lens cross-sectional view of a zoom lens according to Numerical Embodiment 7 at a wide-angle end (focal length: 5.50 mm) when the zoom lens is focused at infinity.
Figure 14A:
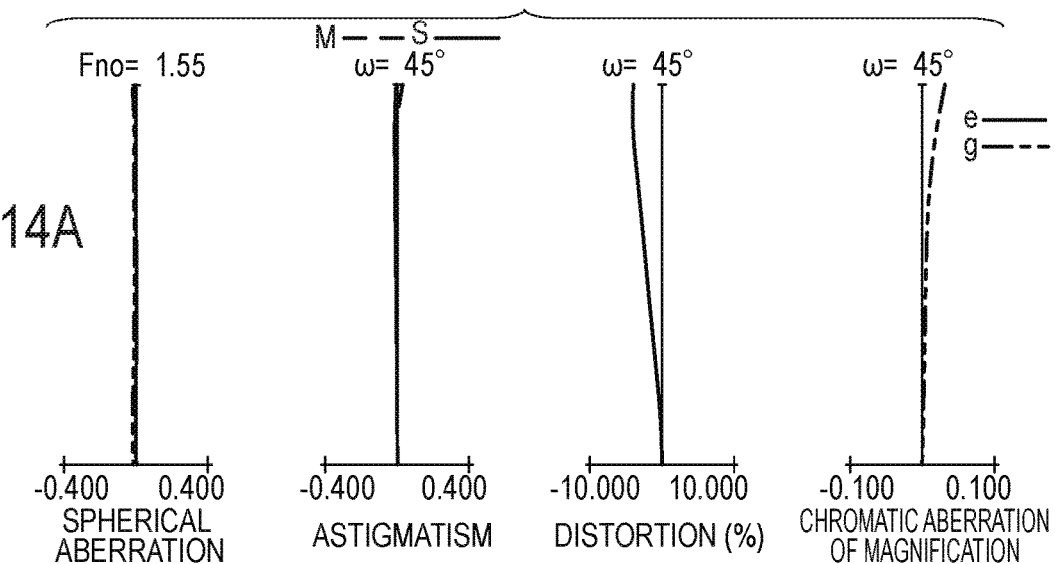
FIG. 14A shows aberration diagrams of the zoom lens according to Numerical Embodiment 7 at the wide-angle end (focal length: 5.50 mm) when the zoom lens is focused at infinity.
Figure 14B:
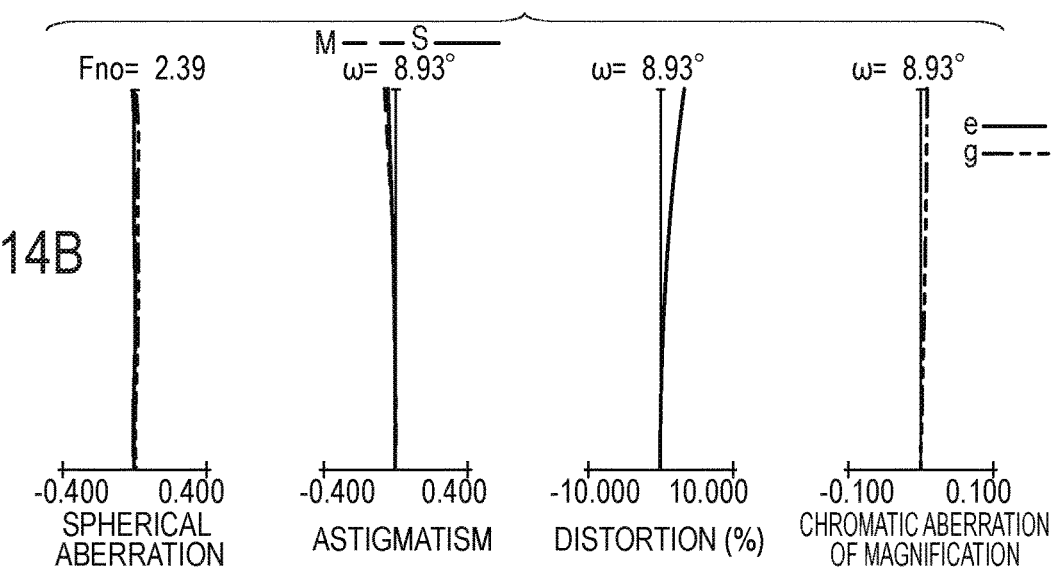
FIG. 14B shows aberration diagrams of the zoom lens according to Numerical Embodiment 7 at an intermediate zoom position (focal length: 35.00 mm) when the zoom lens is focused at infinity.
Figure 14C:
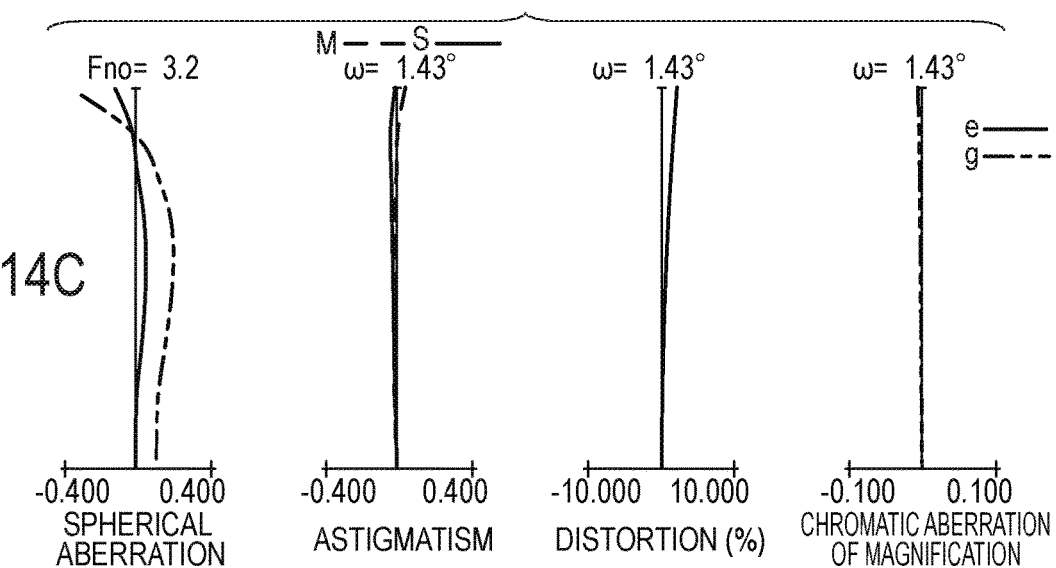
FIG. 14C shows aberration diagrams of the zoom lens according to Numerical Embodiment 7 at a telephoto end (focal length: 219.97 mm) when the zoom lens is focused at infinity.

FIG. 13 is a lens cross-sectional view of a zoom lens according to Embodiment 7 (Numerical Embodiment 7) of the present invention at the wide-angle end when the zoom lens is focused at infinity. FIG. 14A, FIG. 14B, and FIG. 14C are longitudinal aberration diagrams of Numerical Embodiment 7 at the wide-angle end, the focal length of 35 mm, and the telephoto end, respectively. All the aberration diagrams are longitudinal aberration diagrams at a time when the zoom lens is focused at infinity. Further, values of focal length are values obtained by expressing Numerical Embodiments to be described below in units of mm. The same applies also to Numerical Embodiments below.

In FIG. 13, the zoom lens includes, in order from the object side, a first lens unit L1 having a positive refractive power for focusing. The zoom lens also includes a second lens unit L2 having a negative refractive power for zooming, which is configured to move toward the image side for zooming from the wide-angle end to the telephoto end, and a third lens unit L3 having a positive refractive power, which is configured to move toward the object side for zooming. The zoom lens further includes a fourth lens unit L4 having a positive refractive power, which is configured to move non-linearly on the optical axis along with the movements of the second lens unit L2 and the third lens unit L3 to correct image plane variation accompanying zooming. The zoom lens further includes a fifth lens unit L5, which is configured not to move for zooming and is configured to exert an image forming action. In Embodiment 7, the moving lens units correspond to the third lens unit L3 and the fourth lens unit L4, the rear lens unit corresponds to the fifth lens unit L5, the rear positive lens unit corresponds to the fourth lens unit L4, and the front negative lens unit corresponds to the second lens unit. The arrows shown in the lower part of each cross-sectional view of the zoom lens schematically show movements of lens units during zooming from the wide-angle end to the telephoto end.

In Embodiment 7, the second lens unit L2, the third lens unit L3, and the fourth lens unit L4 form a zooming system. An aperture stop SP is arranged between the fourth lens unit L4 and the fifth lens unit L5. Further, the aperture stop is configured not to move in the optical axis direction for zooming. A glass block DG is, for example, a color separation prism or an optical filter. When the zoom lens is used as an image pickup optical system for a broadcasting television camera, a video camera, or a digital still camera, an image plane IP corresponds to an image pickup surface of, for example, the solid image pickup element (photoelectric conversion element) configured to receive and photoelectrically convert an image formed by the zoom lens. When the zoom lens is used as an image pickup optical system for a silver-halide film camera, the image plane IP corresponds to a film surface to be exposed with an image formed by the zoom lens.

The first lens unit L1 corresponds to the 1st surface to the 18th surface. The second lens unit L2 corresponds to the 19th surface to the 25th surface, the third lens unit L3 corresponds to the 26th surface and the 27th surface, and the fourth lens unit L4 corresponds to the 28th surface to the 33rd surface. The fifth lens unit L5 corresponds to the 35th surface to the 50th surface. The first lens unit L consists of a first lens sub-unit L11 having a negative refractive power, which is configured not to move for focusing, a second lens sub-unit L12 having a positive refractive power, which is configured to move toward the image side for focusing from the infinity side to the proximity side, and a third lens sub-unit L13 having a positive refractive power, which is configured not to move for focusing. The first lens sub-unit L11 corresponds to the 1st surface to the 6th surface, the second lens sub-unit L12 corresponds to the 7th surface to the 11th surface, and the third lens sub-unit L13 corresponds to the 12th surface to the 18th surface. The 1st surface, the 19th surface, the 27th surface, and the 32nd surface are aspherical surfaces, and of the aspherical surfaces, the 1st surface is configured to mainly correct distortion at the wide-angle end, and the 19th surface, the 27th surface, and the 32nd surface are configured to mainly correct spherical aberration and curvature of field at the intermediate zoom position and the telephoto end.

Values corresponding to the conditional expressions of Embodiment 7 are shown in Table 1. Embodiment 7 satisfies the conditional expressions (8) to (15), and the refractive powers of the lens units and the lens configuration of the first lens unit are appropriately set to achieve the zoom lens having a wide angle of view, a high zoom ratio, a small size, a light weight, and high optical performance over the entire zoom range. However, it is required for the zoom lens according to the present invention to satisfy the conditional expressions (8) and (9), but it is not necessarily required to satisfy the conditional expressions (10) to (16). It should be noted, however, that when at least one of the conditional expressions (10) to (16) is satisfied, more satisfactory effects can be provided. The same is true for Embodiments 6 to 13.

Embodiment 8

Figure 15:
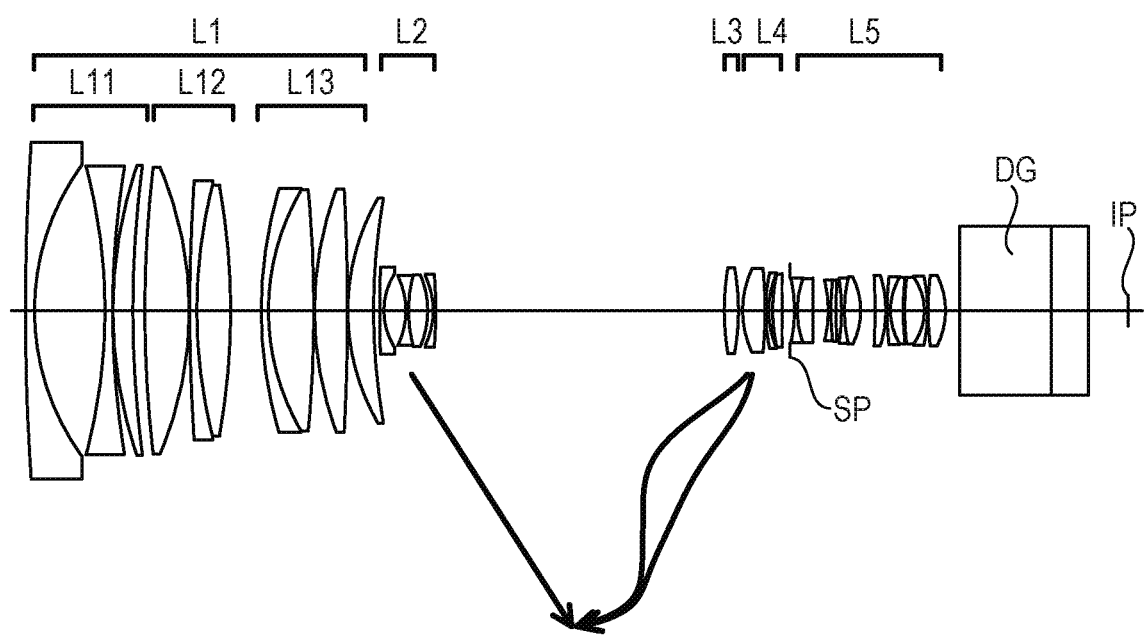
FIG. 15 is a lens cross-sectional view of a zoom lens according to Numerical Embodiment 8 at a wide-angle end (focal length: 6.40 mm) when the zoom lens is focused at infinity.
Figure 16A:
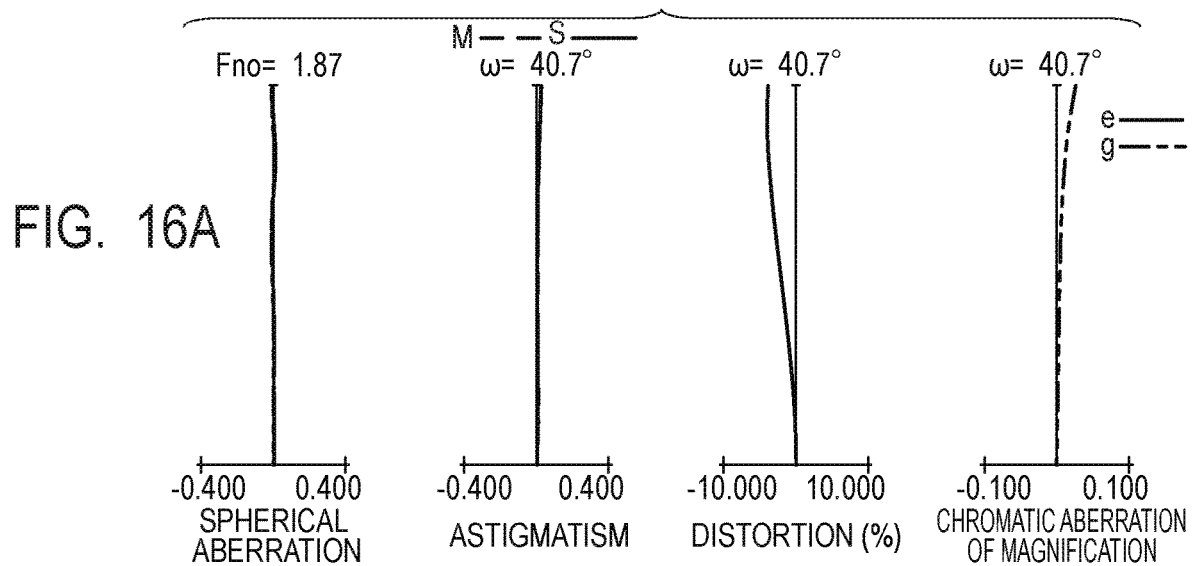
FIG. 16A shows aberration diagrams of the zoom lens according to Numerical Embodiment 8 at the wide-angle end (focal length: 6.40 mm) when the zoom lens is focused at infinity.
Figure 16B:
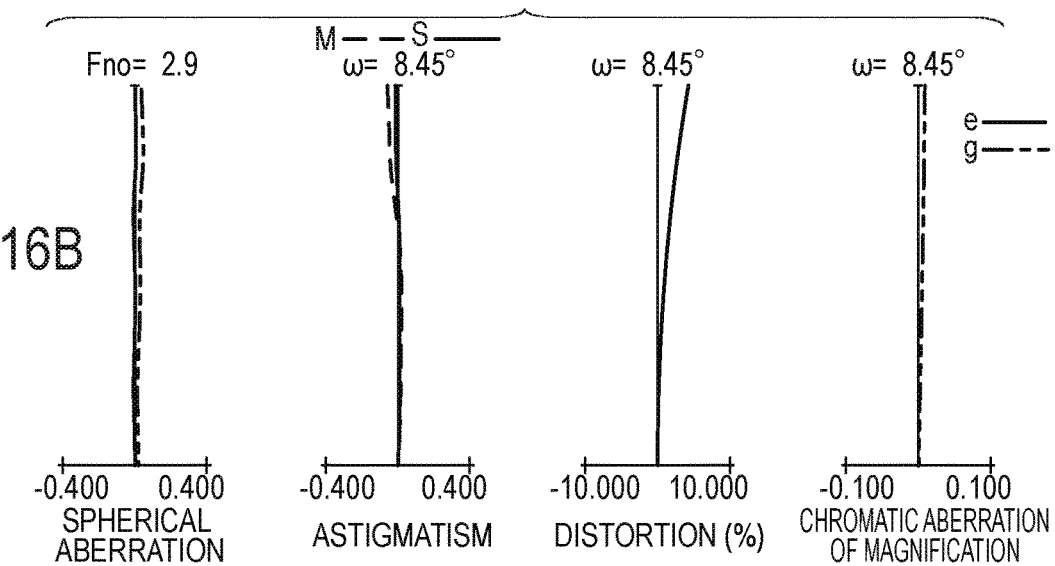
FIG. 16B shows aberration diagrams of the zoom lens according to Numerical Embodiment 8 at an intermediate zoom position (focal length: 37.00 mm) when the zoom lens is focused at infinity.
Figure 16C:
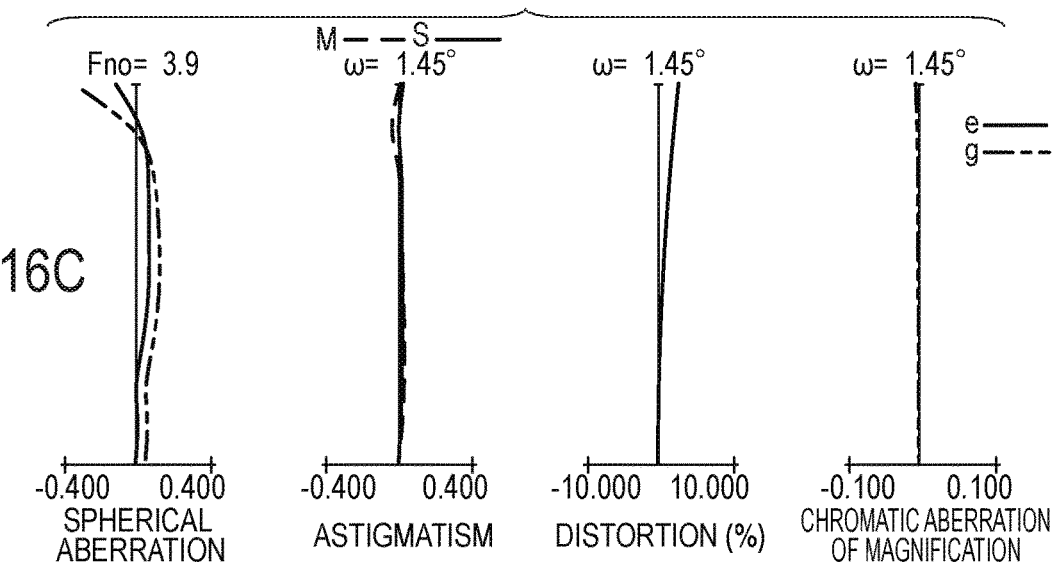
FIG. 16C shows aberration diagrams of the zoom lens according to Numerical Embodiment 8 at a telephoto end (focal length: 216.98 mm) when the zoom lens is focused at infinity.

FIG. 15 is a lens cross-sectional view of a zoom lens according to Embodiment 8 (Numerical Embodiment 8) of the present invention at the wide-angle end when the zoom lens is focused at infinity. FIG. 16A, FIG. 16B, and FIG. 16C are longitudinal aberration diagrams of Numerical Embodiment 8 at the wide-angle end, the focal length of 37 mm, and the telephoto end, respectively. All the aberration diagrams are longitudinal aberration diagrams at a time when the zoom lens is focused at infinity.

In FIG. 15, the zoom lens includes, in order from the object side, a first lens unit L1 having a positive refractive power for focusing. The zoom lens also includes a second lens unit L2 having a negative refractive power for zooming, which is configured to move toward the image side for zooming from the wide-angle end to the telephoto end, and a third lens unit L3 having a positive refractive power, which is configured to move toward the object side for zooming. The zoom lens further includes a fourth lens unit L4 having a positive refractive power, which is configured to move non-linearly on the optical axis along with the movements of the second lens unit L2 and the third lens unit L3 to correct image plane variation accompanying zooming. The zoom lens further includes a fifth lens unit L5, which is configured not to move for zooming and is configured to exert an image forming action. In Embodiment 8, the moving lens units correspond to the third lens unit L3 and the fourth lens unit L4, the rear lens unit corresponds to the fifth lens unit L5, the rear positive lens unit corresponds to the fourth lens unit L4, and the front negative lens unit corresponds to the second lens unit.

In Embodiment 8, the second lens unit L2, the third lens unit L3, and the fourth lens unit L4 form a zooming system. An aperture stop SP is arranged between the fourth lens unit L4 and the fifth lens unit L5. Further, the aperture stop is configured not to move in the optical axis direction for zooming.

The first lens unit L1 corresponds to the 1st surface to the 18th surface. The second lens unit L2 corresponds to the 19th surface to the 25th surface, the third lens unit L3 corresponds to the 26th surface and the 27th surface, and the fourth lens unit L4 corresponds to the 28th surface to the 33rd surface. The fifth lens unit L5 corresponds to the 35th surface to the 53rd surface. The first lens unit L1 consists of a first lens sub-unit L11 having a negative refractive power, which is configured not to move for focusing, a second lens sub-unit L12 having a positive refractive power, which is configured to move toward the image side for focusing from the infinity side to the proximity side, and a third lens sub-unit L13 having a positive refractive power, which is configured not to move for focusing. The first lens sub-unit L11 corresponds to the 1st surface to the 6th surface, the second lens sub-unit L12 corresponds to the 7th surface to the 11th surface, and the third lens sub-unit L13 corresponds to the 12th surface to the 18th surface. The 1st surface, the 19th surface, the 27th surface, and the 32nd surface are aspherical surfaces, and of the aspherical surfaces, the 1st surface is configured to mainly correct distortion at the wide-angle end, and the 19th surface, the 27th surface, and the 32nd surface are configured to mainly correct spherical aberration and curvature of field at the intermediate zoom position and the telephoto end.

Values corresponding to the conditional expressions of Embodiment 8 are shown in Table 1. Embodiment 8 satisfies the conditional expressions (8) to (15), and the refractive powers of the lens units and the lens configuration of the first lens unit are appropriately set to achieve the zoom lens having a wide angle of view, a high zoom ratio, a small size, a light weight, and high optical performance over the entire zoom range.

Embodiment 9

Figure 17:
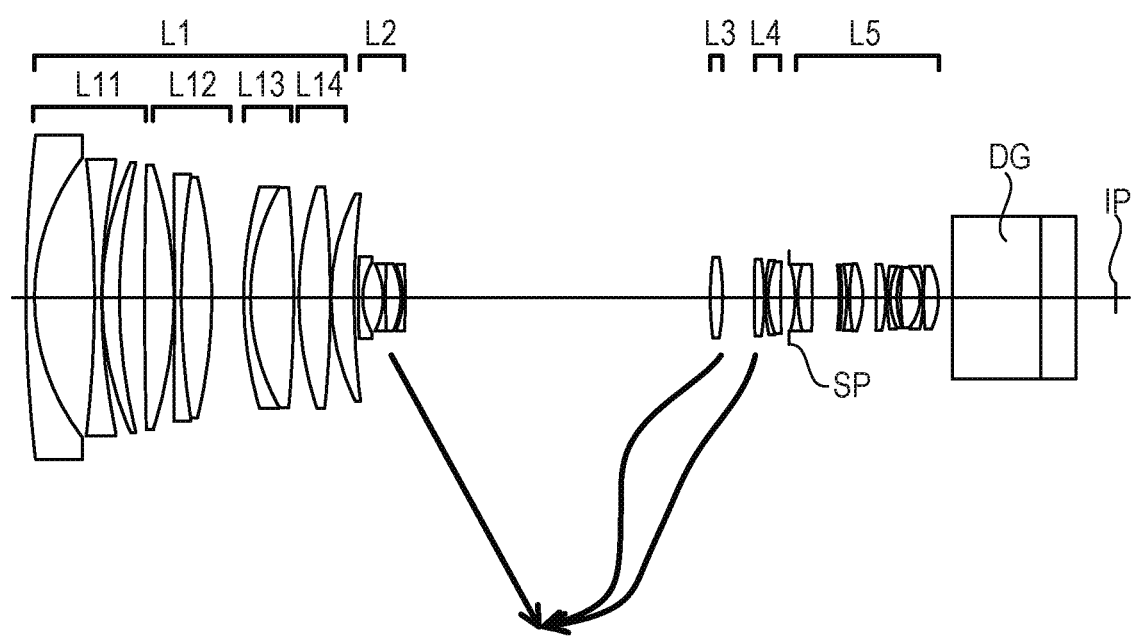
FIG. 17 is a lens cross-sectional view of a zoom lens according to Numerical Embodiment 9 at a wide-angle end (focal length: 6.50 mm) when the zoom lens is focused at infinity.
Figure 18A:
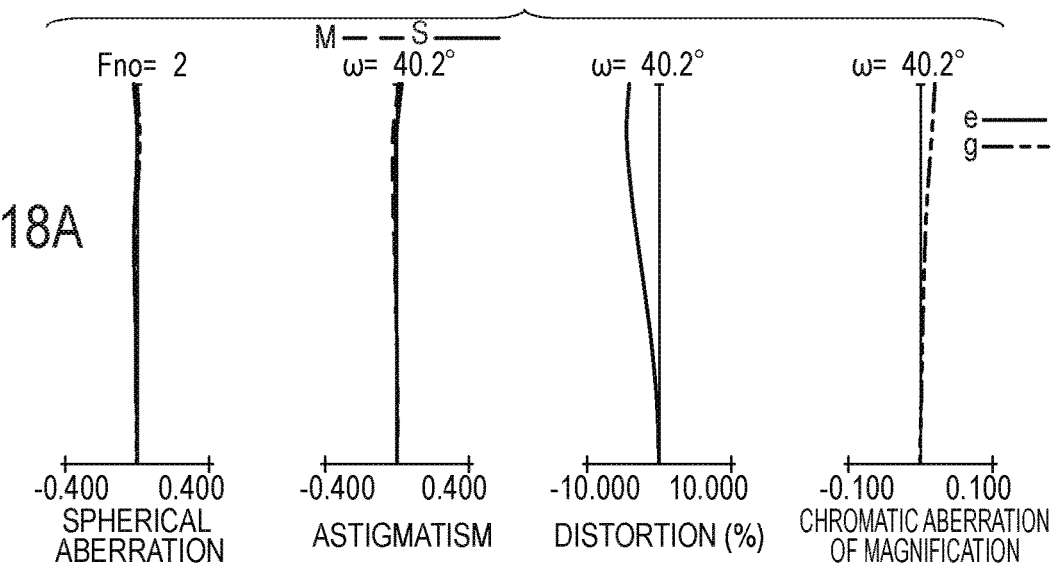
FIG. 18A shows aberration diagrams of the zoom lens according to Numerical Embodiment 9 at the wide-angle end (focal length: 6.50 mm) when the zoom lens is focused at infinity.
Figure 18B:
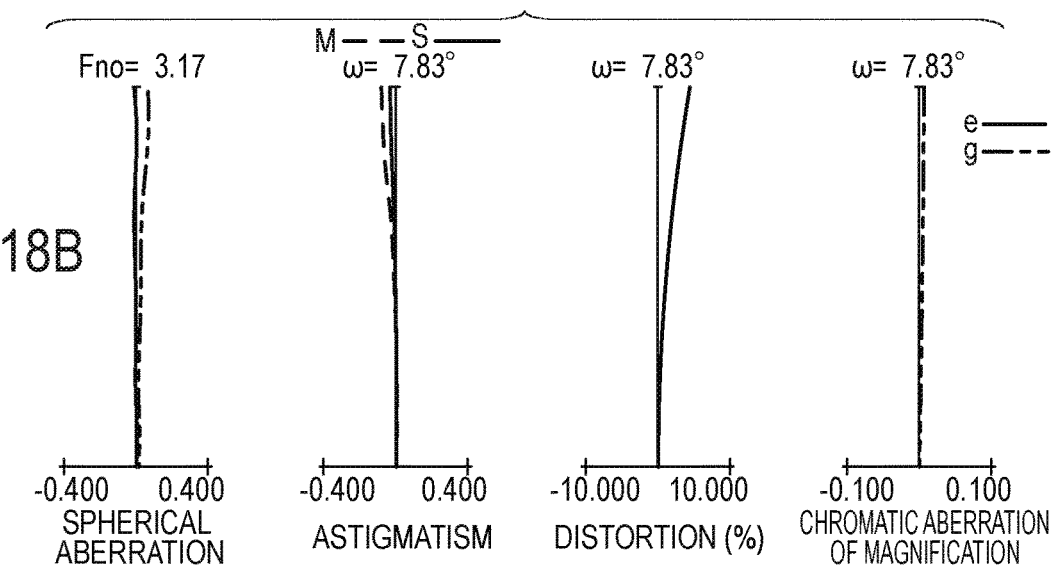
FIG. 18B shows aberration diagrams of the zoom lens according to Numerical Embodiment 9 at an intermediate zoom position (focal length: 40.00 mm) when the zoom lens is focused at infinity.
Figure 18C:
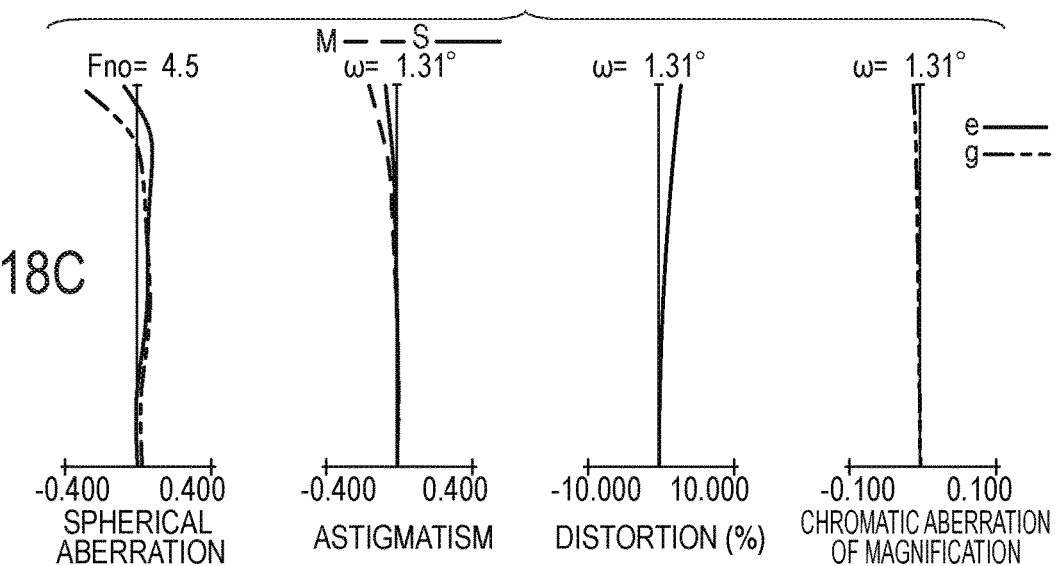
FIG. 18C shows aberration diagrams of the zoom lens according to Numerical Embodiment 9 at a telephoto end (focal length: 239.99 mm) when the zoom lens is focused at infinity.

FIG. 17 is a lens cross-sectional view of a zoom lens according to Embodiment 9 (Numerical Embodiment 9) of the present invention at the wide-angle end when the zoom lens is focused at infinity. FIG. 18A, FIG. 18B, and FIG. 18C are longitudinal aberration diagrams of Numerical Embodiment 9 at the wide-angle end, the focal length of 40 mm, and the telephoto end, respectively. All the aberration diagrams are longitudinal aberration diagrams at a time when the zoom lens is focused at infinity.

In FIG. 17, the zoom lens includes, in order from the object side, a first lens unit L1 having a positive refractive power for focusing. The zoom lens also includes a second lens unit L2 having a negative refractive power for zooming, which is configured to move toward the image side for zooming from the wide-angle end to the telephoto end, and a third lens unit L3 having a positive refractive power, which is configured to move toward the object side for zooming. The zoom lens further includes a fourth lens unit L4 having a positive refractive power, which is configured to move non-linearly on the optical axis along with the movements of the second lens unit L2 and the third lens unit L3 to correct image plane variation accompanying zooming. The zoom lens further includes a fifth lens unit L5, which is configured not to move for zooming and is configured to exert an image forming action. In Embodiment 9, the moving lens units correspond to the third lens unit L3 and the fourth lens unit L4, the rear lens unit corresponds to the fifth lens unit L5, the rear positive lens unit corresponds to the fourth lens unit L4, and the front negative lens unit corresponds to the second lens unit.

In Embodiment 9, the second lens unit L2, the third lens unit L3, and the fourth lens unit L4 form a zooming system. An aperture stop SP is arranged between the fourth lens unit L4 and the fifth lens unit L5. Further, the aperture stop is configured not to move in the optical axis direction for zooming.

The first lens unit L1 corresponds to the 1st surface to the 18th surface. The second lens unit L2 corresponds to the 19th surface to the 25th surface, the third lens unit L3 corresponds to the 26th surface and the 27th surface, and the fourth lens unit L4 corresponds to the 28th surface to the 32nd surface. The fifth lens unit L5 corresponds to the 34th surface to the 51st surface. The first lens unit L1 includes a first lens sub-unit L1 having a negative refractive power, which is configured not to move for focusing, and a second lens sub-unit L12 having a positive refractive power, which is configured to move toward the image side for focusing from the infinity side to the proximity side. The first lens unit L1 further includes a third lens sub-unit L13, which is configured not to move for focusing, and a fourth lens sub-unit L14 having a positive refractive power, which is configured to move toward the object side for focusing. The first lens sub-unit L11 corresponds to the 1st surface to the 6th surface, the second lens sub-unit L12 corresponds to the 7th surface to the 11th surface, the third lens sub-unit L13 corresponds to the 12th surface to the 14th surface, and the fourth lens sub-unit L14 corresponds to the 15th surface to the 18th surface. Further, the fourth lens sub-unit is configured to move at a proportion of 0.1 time a movement amount of the second lens sub-unit for focusing. The 1st surface, the 19th surface, and the 27th surface are aspherical surfaces, and of the aspherical surfaces, the 1st surface is configured to mainly correct distortion at the wide-angle end, and the 19th surface and the 27th surface are configured to mainly correct spherical aberration and curvature of field at the intermediate zoom position and the telephoto end.

Values corresponding to the conditional expressions of Embodiment 9 are shown in Table 1. Embodiment 9 satisfies the conditional expressions (8) to (15), and the refractive powers of the lens units and the lens configuration of the first lens unit are appropriately set to achieve the zoom lens having a wide angle of view, a high zoom ratio, a small size, a light weight, and high optical performance over the entire zoom range.

Embodiment 101

Figure 19:
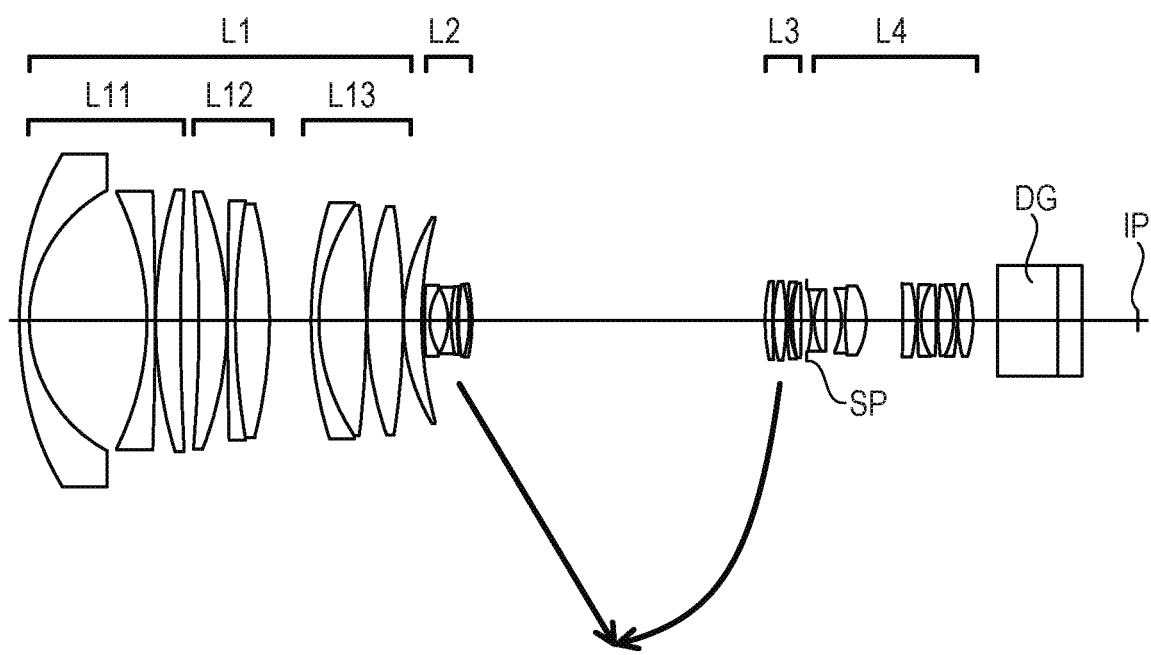
FIG. 19 is a lens cross-sectional view of a zoom lens according to Numerical Embodiment 10 at a wide-angle end (focal length: 6.00 mm) when the zoom lens is focused at infinity.
Figure 20A:
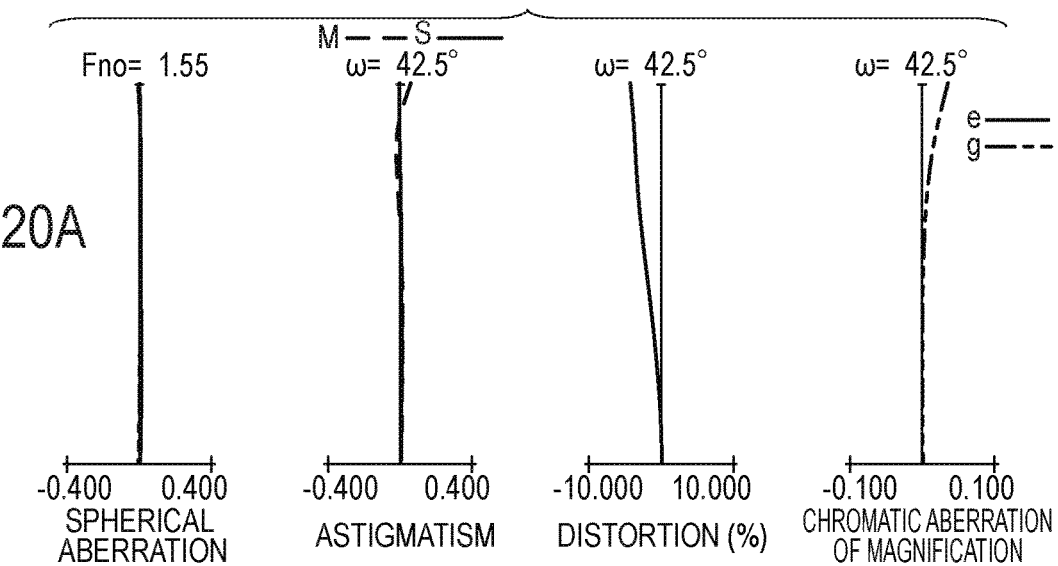
FIG. 20A shows aberration diagrams of the zoom lens according to Numerical Embodiment 10 at the wide-angle end (focal length: 6.00 mm) when the zoom lens is focused at infinity.
Figure 20B:
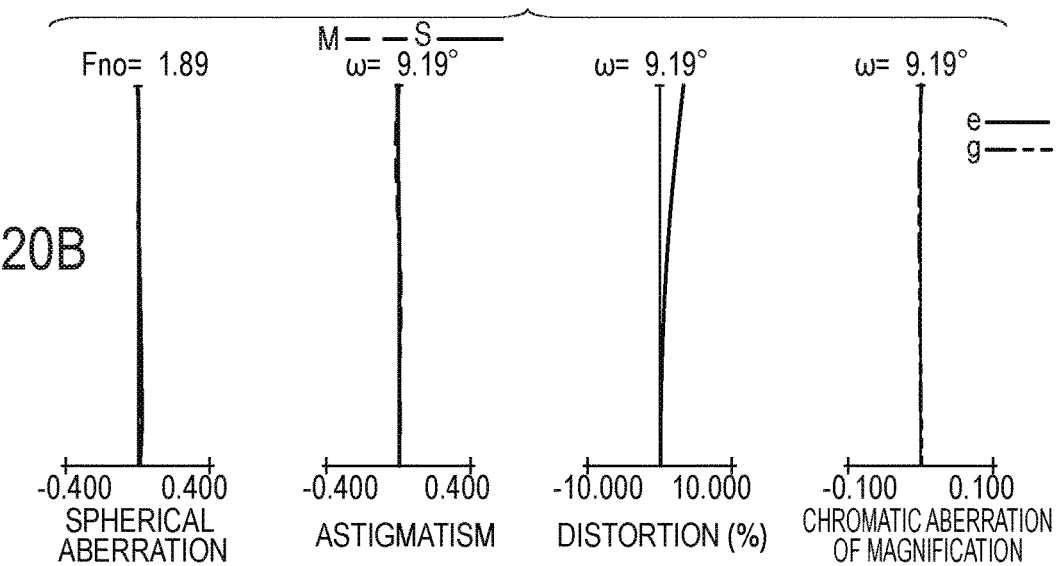
FIG. 20B shows aberration diagrams of the zoom lens according to Numerical Embodiment 10 at an intermediate zoom position (focal length: 34.00 mm) when the zoom lens is focused at infinity.
Figure 20C:
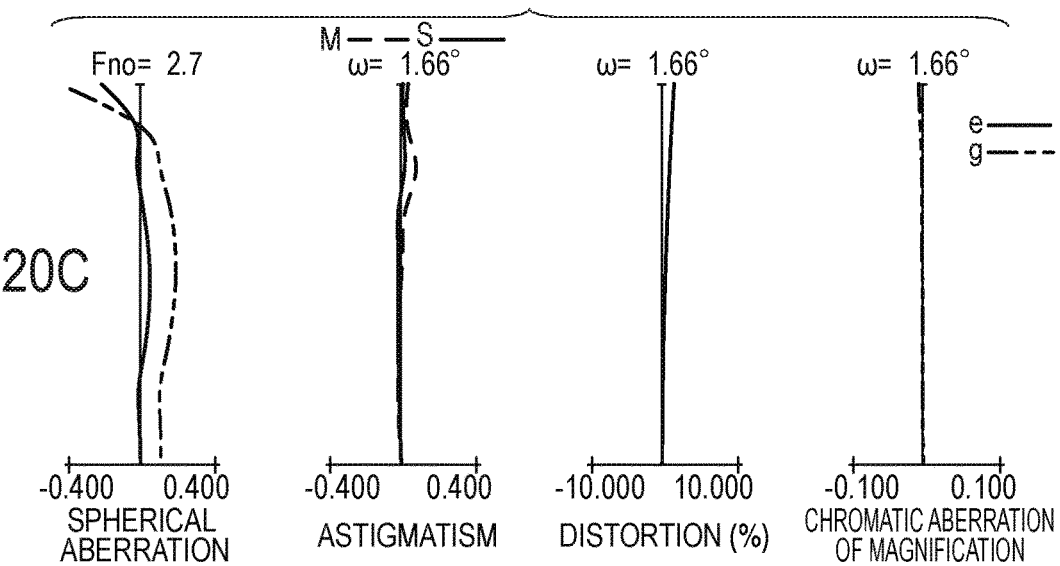
FIG. 20C shows aberration diagrams of the zoom lens according to Numerical Embodiment 10 at a telephoto end (focal length: 189.99 mm) when the zoom lens is focused at infinity.

FIG. 19 is a lens cross-sectional view of a zoom lens according to Embodiment 10 (Numerical Embodiment 10) of the present invention at the wide-angle end when the zoom lens is focused at infinity. FIG. 20A, FIG. 20B, and FIG. 20C are longitudinal aberration diagrams of Numerical Embodiment 10 at the wide-angle end, the focal length of 34 mm, and the telephoto end, respectively. All the aberration diagrams are longitudinal aberration diagrams at a time when the zoom lens is focused at infinity.

In FIG. 19, the zoom lens includes, in order from the object side, a first lens unit L1 having a positive refractive power for focusing. The zoom lens also includes a second lens unit L2 having a negative refractive power for zooming, which is configured to move toward the image side for zooming from the wide-angle end to the telephoto end, and a third lens unit L3 having a positive refractive power, which is configured to move non-linearly on the optical axis along with the movement of the second lens unit L2 to correct image plane variation accompanying zooming. The zoom lens further includes a fourth lens unit L4, which is configured not to move for zooming, and is configured to exert an image forming action. In Embodiment 10, the moving lens units correspond to the third lens unit L3, the rear lens unit corresponds to the fourth lens unit L4, the rear positive lens unit corresponds to the third lens unit L3, and the front negative lens unit corresponds to the second lens unit.

In Embodiment 10, the second lens unit L2 and the third lens unit L3 form a zooming system. An aperture stop SP is arranged between the third lens unit L3 and the fourth lens unit L4. Further, the aperture stop is configured not to move in the optical axis direction for zooming.

The first lens unit L1 corresponds to the 1st surface to the 18th surface. The second lens unit L2 corresponds to the 19th surface to the 26th surface, the third lens unit L3 corresponds to the 27th surface to the 34th surface, and the fourth lens unit L4 corresponds to the 36th surface to the 51st surface. The first lens unit L1 consists of a first lens sub-unit L11 having a negative refractive power, which is configured not to move for focusing, a second lens sub-unit L12 having a positive refractive power, which is configured to move toward the image side for focusing from the infinity side to the proximity side, and a third lens sub-unit L13 having a positive refractive power, which is configured to move toward the object side for focusing. The first lens sub-unit L11 corresponds to the 1st surface to the 6th surface, the second lens sub-unit L12 corresponds to the 7th surface to the 11th surface, and the third lens sub-unit L13 corresponds to the 12th surface to the 18th surface. Further, during focusing, the third lens sub-unit is configured to move at a proportion of 0.06 time a movement amount of the second lens sub-unit. The 1st surface, the 19th surface, the 28th surface, and the 33rd surface are aspherical surfaces, and of the aspherical surfaces, the 1 st surface is configured to mainly correct distortion at the wide-angle end, and the 19th surface, the 28th surface, and the 33rd surface are configured to mainly correct spherical aberration and curvature of field at the intermediate zoom position and the telephoto end.

Values corresponding to the conditional expressions of Embodiment 10 are shown in Table 1. Embodiment 10 satisfies the conditional expressions (8) to (15), and the refractive powers of the lens units and the lens configuration of the first lens unit are appropriately set to achieve the zoom lens having a wide angle of view, a high zoom ratio, a small size, a light weight, and high optical performance over the entire zoom range.

Embodiment 11

Figure 21:
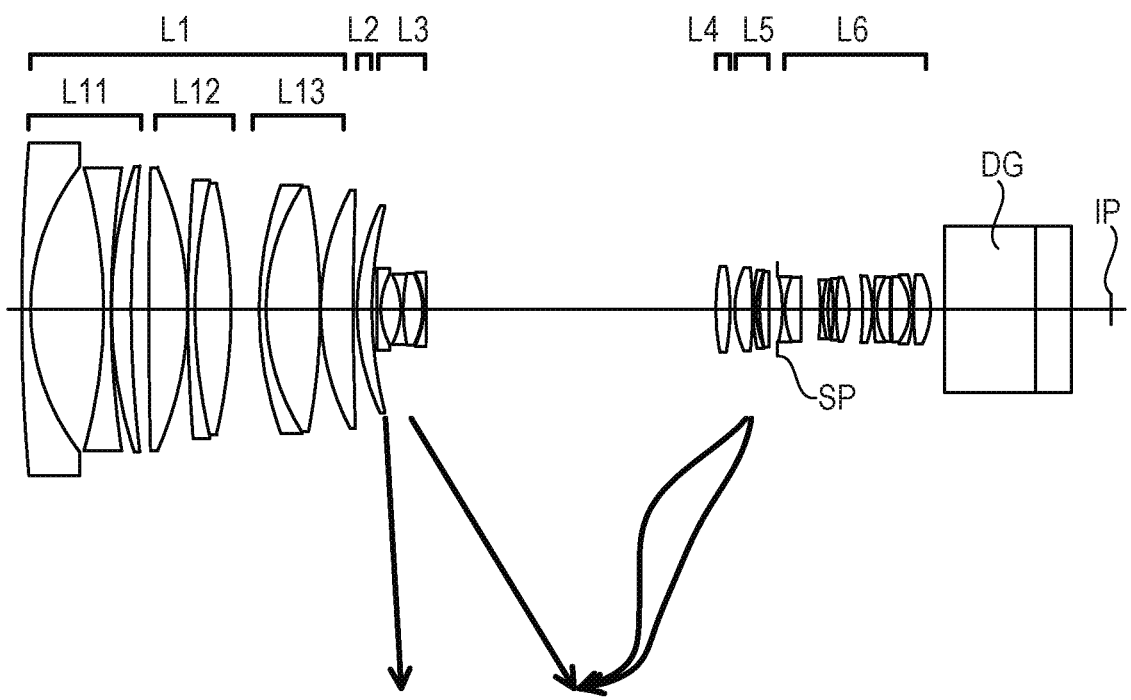
FIG. 21 is a lens cross-sectional view of a zoom lens according to Numerical Embodiment 11 at a wide-angle end (focal length: 6.40 mm) when the zoom lens is focused at infinity.
Figure 22A:
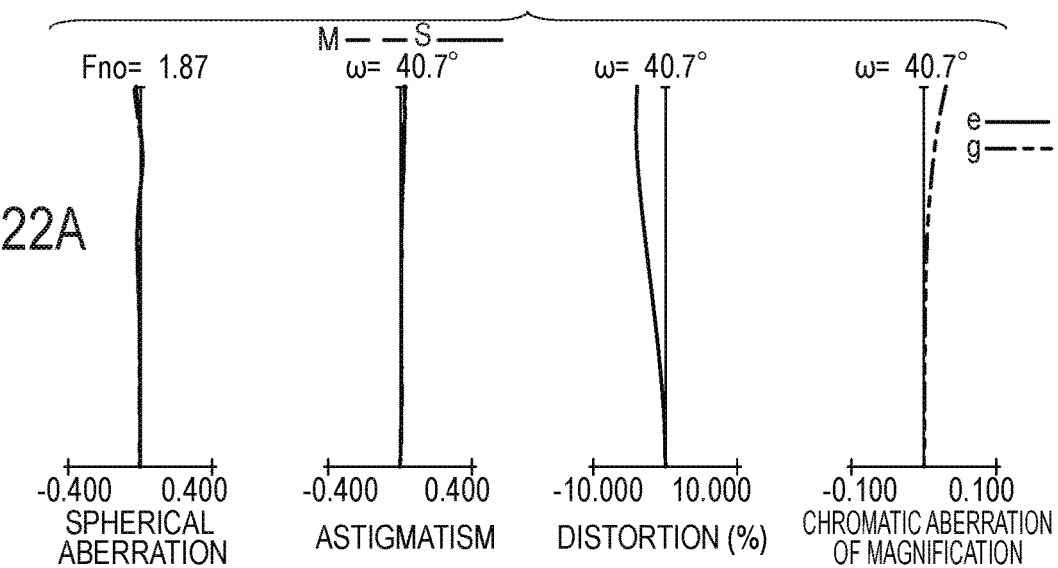
FIG. 22A shows aberration diagrams of the zoom lens according to Numerical Embodiment 11 at the wide-angle end (focal length: 6.40 mm) when the zoom lens is focused at infinity.
Figure 22B:
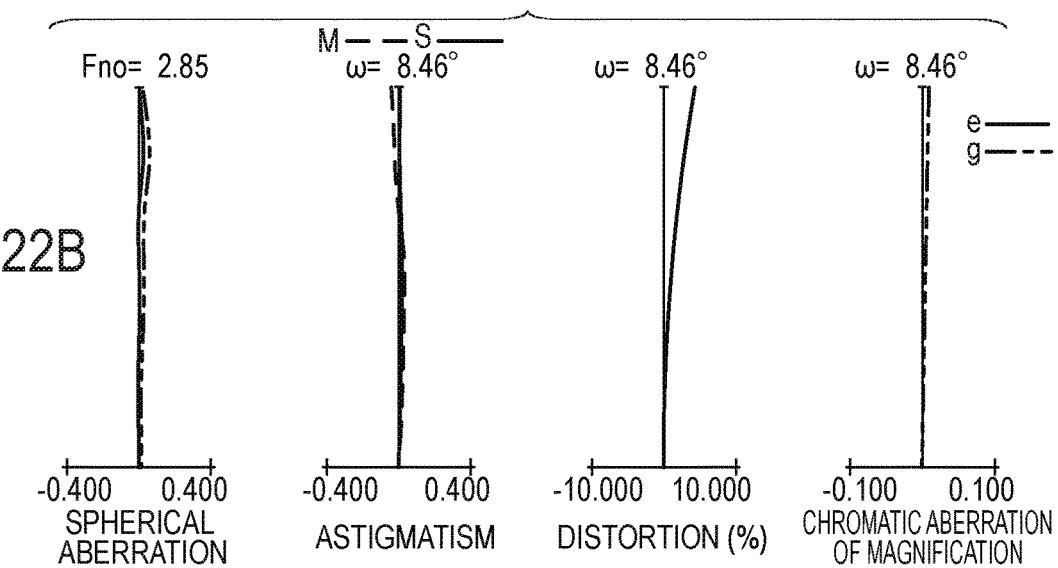
FIG. 22B shows aberration diagrams of the zoom lens according to Numerical Embodiment 11 at an intermediate zoom position (focal length: 36.99 mm) when the zoom lens is focused at infinity.
Figure 22C:
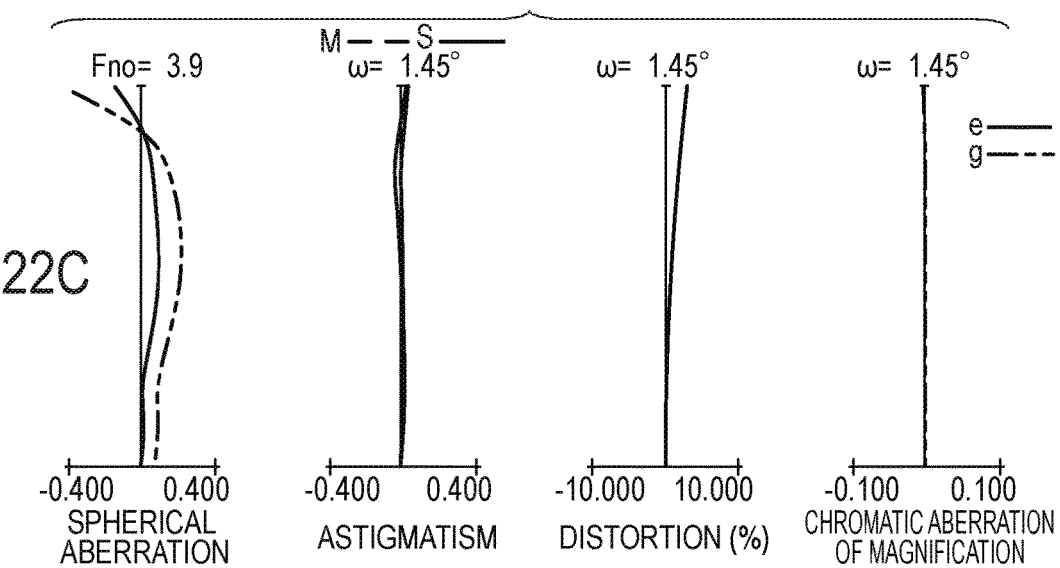
FIG. 22C shows aberration diagrams of the zoom lens according to Numerical Embodiment 11 at a telephoto end (focal length: 216.96 mm) when the zoom lens is focused at infinity.

FIG. 21 is a lens cross-sectional view of a zoom lens according to Embodiment 11 (Numerical Embodiment 11) of the present invention at the wide-angle end when the zoom lens is focused at infinity. FIG. 22A, FIG. 22B, and FIG. 22C are longitudinal aberration diagrams of Numerical Embodiment 11 at the wide-angle end, the focal length of 37 mm, and the telephoto end, respectively. All the aberration diagrams are longitudinal aberration diagrams at a time when the zoom lens is focused at infinity.

In FIG. 21, the zoom lens includes, in order from the object side, a first lens unit L1 having a positive refractive power for focusing. The zoom lens also includes a second lens unit L2 having a positive refractive power, which is configured to move toward the image side for zooming from the wide-angle end to the telephoto end, a third lens unit L3 having a negative refractive power for zooming, which is configured to move toward the image side for zooming, and a fourth lens unit L4 having a positive refractive power, which is configured to move toward the object side for zooming. The zoom lens further includes a fifth lens unit L5 having a positive refractive power, which is configured to move non-linearly on the optical axis along with the movements of the second lens unit L2, the third lens unit L3, and the fourth lens unit L4 to correct image plane variation accompanying zooming. The zoom lens further includes a sixth lens unit L6, which is configured not to move for zooming. In Embodiment 11, the moving lens units correspond to the third lens unit L3, the fourth lens unit L4, and the fifth lens unit L5, the rear lens unit corresponds to the sixth lens unit L6, the rear positive lens unit corresponds to the fifth lens unit L5, and the front negative lens unit corresponds to the third lens unit.

In Embodiment 11, the second lens unit L2, the third lens unit L3, the fourth lens unit L4, and the fifth lens unit L5 form a zooming system. An aperture stop SP is arranged between the fifth lens unit L5 and the sixth lens unit L6. Further, the aperture stop is configured not to move in the optical axis direction for zooming.

The first lens unit L1 corresponds to the 1st surface to the 16th surface. The second lens unit L2 corresponds to the 17th surface and the 18th surface, the third lens unit L3 corresponds to the 19th surface to the 25th surface, and the fourth lens unit L4 corresponds to the 26th surface and the 27th surface. The fifth lens unit L5 corresponds to the 28th surface to the 33rd surface. The sixth lens unit L6 corresponds to the 35th surface to the 53rd surface. The first lens unit L1 consists of a first lens sub-unit L11 having a negative refractive power, which is configured not to move for focusing, a second lens sub-unit L12 having a positive refractive power, which is configured to move toward the image side for focusing from the infinity side to the proximity side, and a third lens sub-unit L13 having a positive refractive power, which is configured not to move for focusing. The first lens sub-unit L11 corresponds to the 1st surface to the 6th surface, the second lens sub-unit L12 corresponds to the 7th surface to the 11th surface, and the third lens sub-unit L13 corresponds to the 12th surface to the 16th surface. The 1st surface, the 19th surface, the 27th surface, and the 32nd surface are aspherical surfaces, and of the aspherical surfaces, the 1st surface is configured to mainly correct distortion at the wide-angle end, and the 19th surface, the 27th surface, and the 32nd surface are configured to mainly correct spherical aberration and curvature of field at the intermediate zoom position and the telephoto end.

Values corresponding to the conditional expressions of Embodiment 11 are shown in Table 1. Embodiment 11 satisfies the conditional expressions (8) to (15), and the refractive powers of the lens units and the lens configuration of the first lens unit are appropriately set to achieve the zoom lens having a wide angle of view, a high zoom ratio, a small size, a light weight, and high optical performance over the entire zoom range.

Embodiment 12

Figure 23:
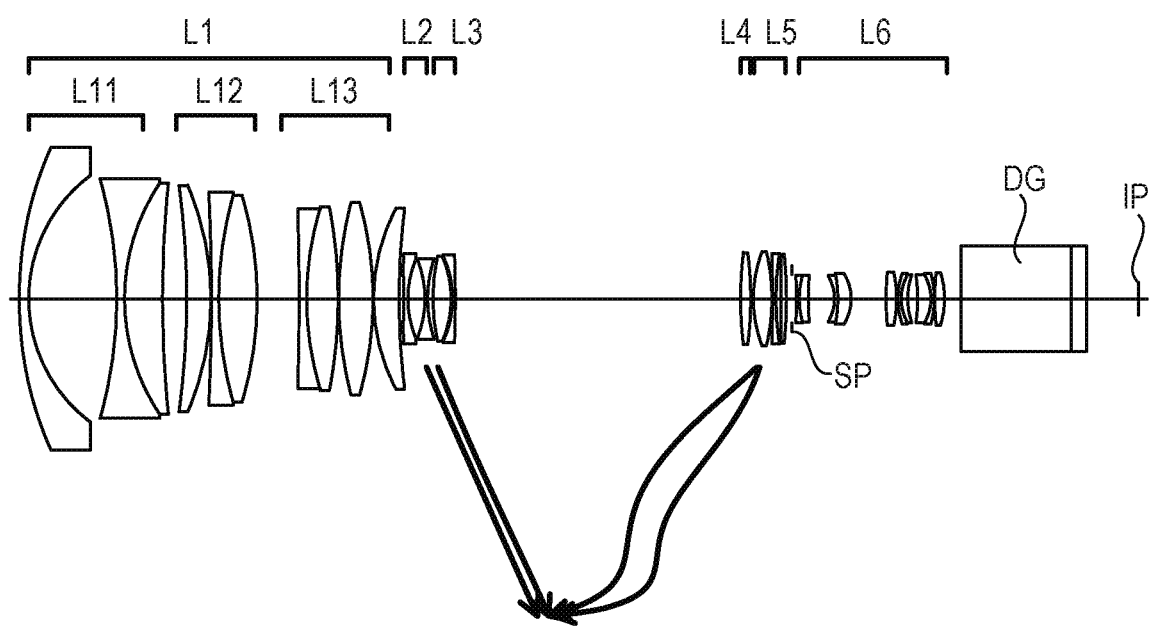
FIG. 23 is a lens cross-sectional view of a zoom lens according to Numerical Embodiment 12 at a wide-angle end (focal length: 10.00 mm) when the zoom lens is focused at infinity.
Figure 24A:
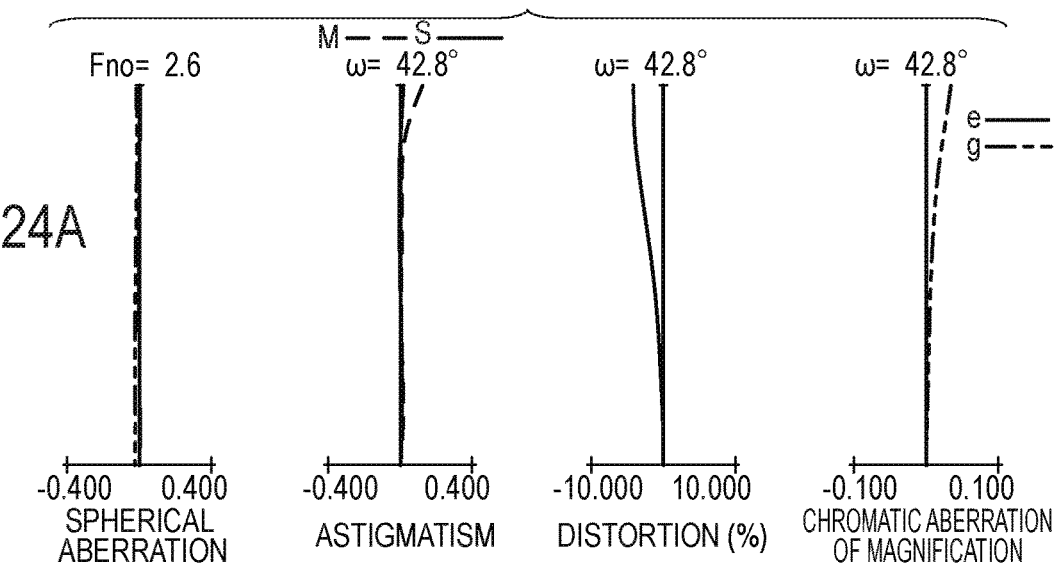
FIG. 24A shows aberration diagrams of the zoom lens according to Numerical Embodiment 12 at the wide-angle end (focal length: 10.00 mm) when the zoom lens is focused at infinity.
Figure 24B:
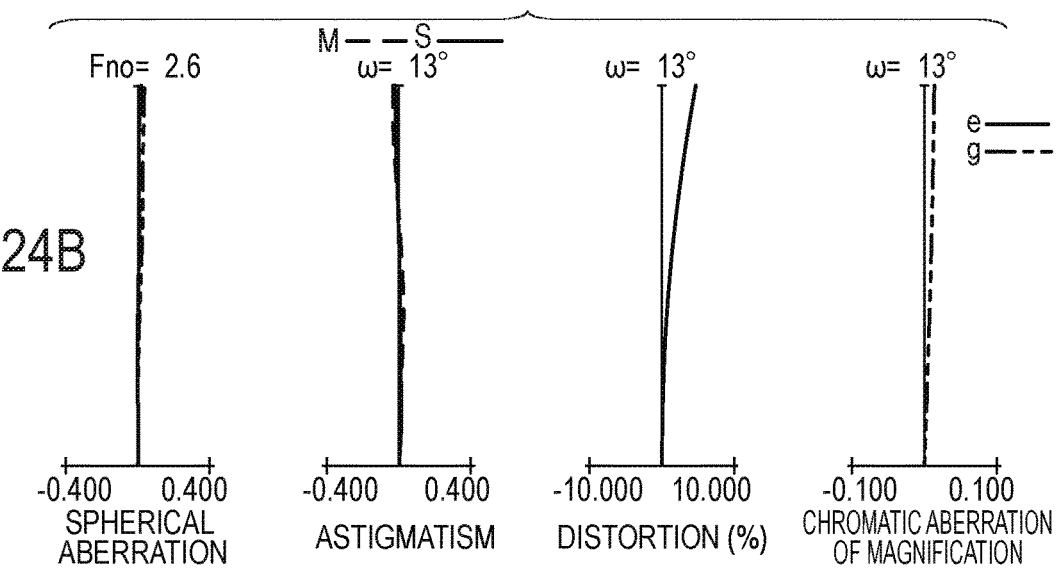
FIG. 24B shows aberration diagrams of the zoom lens according to Numerical Embodiment 12 at an intermediate zoom position (focal length: 40.00 mm) when the zoom lens is focused at infinity.
Figure 24C:
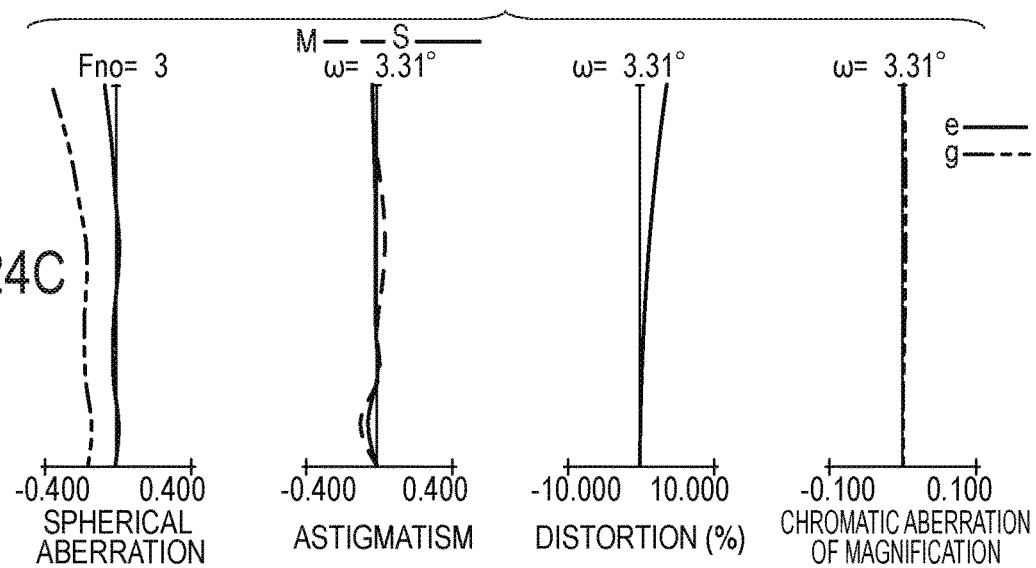
FIG. 24C shows aberration diagrams of the zoom lens according to Numerical Embodiment 12 at a telephoto end (focal length: 159.99 mm) when the zoom lens is focused at infinity.

FIG. 23 is a lens cross-sectional view of a zoom lens according to Embodiment 12 (Numerical Embodiment 12) of the present invention at the wide-angle end when the zoom lens is focused at infinity. FIG. 24A, FIG. 24B, and FIG. 24C are longitudinal aberration diagrams of Numerical Embodiment 12 at the wide-angle end, the focal length of 40 mm, and the telephoto end, respectively. All the aberration diagrams are longitudinal aberration diagrams at a time when the zoom lens is focused at infinity.

In FIG. 23, the zoom lens includes, in order from the object side, a first lens unit L1 having a positive refractive power for focusing. The zoom lens also includes a second lens unit L2 having a negative refractive power for zooming, which is configured to move toward the image side for zooming from the wide-angle end to the telephoto end, a third lens unit L3 having a positive refractive power, which is configured to move toward the image side for zooming, and a fourth lens unit L4 having a positive refractive power, which is configured to move toward the object side for zooming. The zoom lens further includes a fifth lens unit L5 having a positive refractive power, which is configured to move non-linearly on the optical axis along with the movements of the second lens unit L2, the third lens unit L3, and the fourth lens unit L4 to correct image plane variation accompanying zooming. The zoom lens further includes a sixth lens unit L6, which is configured not to move for zooming. In Embodiment 12, the moving lens units correspond to the third lens unit L3, the fourth lens unit L4, and the fifth lens unit L5, the rear lens unit corresponds to the sixth lens unit L6, the rear positive lens unit corresponds to the fifth lens unit L5, and the front negative lens unit corresponds to the second lens unit.

In Embodiment 12, the second lens unit L2, the third lens unit L3, the fourth lens unit L4, and the fifth lens unit L5 form a zooming system. An aperture stop SP is arranged between the fifth lens unit L5 and the sixth lens unit L6. Further, the aperture stop is configured not to move in the optical axis direction during zooming.

The first lens unit L1 corresponds to the 1st surface to the 17th surface. The second lens unit L2 corresponds to the 18th surface to the 21st surface, the third lens unit L3 corresponds to the 22nd surface to the 25th surface, and the fourth lens unit L4 corresponds to the 26th surface and the 27th surface. The fifth lens unit L5 corresponds to the 28th surface to the 33rd surface. The sixth lens unit L6 corresponds to the 35th surface to the 50th surface. The first lens unit L1 consists of a first lens sub-unit L11 having a negative refractive power, which is configured not to move for focusing, a second lens sub-unit L12 having a positive refractive power, which is configured to move toward the image side for focusing from the infinity side to the proximity side, and a third lens sub-unit L13 having a positive refractive power, which is configured not to move for focusing. The first lens sub-unit L11 corresponds to the 1st surface to the 5th surface, the second lens sub-unit L12 corresponds to the 6th surface to the 10th surface, and the third lens sub-unit L13 corresponds to the 11th surface to the 17th surface. The 1st surface, the 18th surface, the 27th surface, and the 32nd surface are aspherical surfaces, and of the aspherical surfaces, the 1st surface is configured to mainly correct distortion at the wide-angle end, and the 18th surface, the 27th surface, and the 32nd surface are configured to mainly correct spherical aberration and curvature of field at the intermediate zoom position and the telephoto end.

Values corresponding to the conditional expressions of Embodiment 12 are shown in Table 1. Embodiment 12 satisfies the conditional expressions (8) to (15), and the refractive powers of the lens units and the lens configuration of the first lens unit are appropriately set to achieve the zoom lens having a wide angle of view, a high zoom ratio, a small size, a light weight, and high optical performance over the entire zoom range.

Embodiment 13

Figure 25:
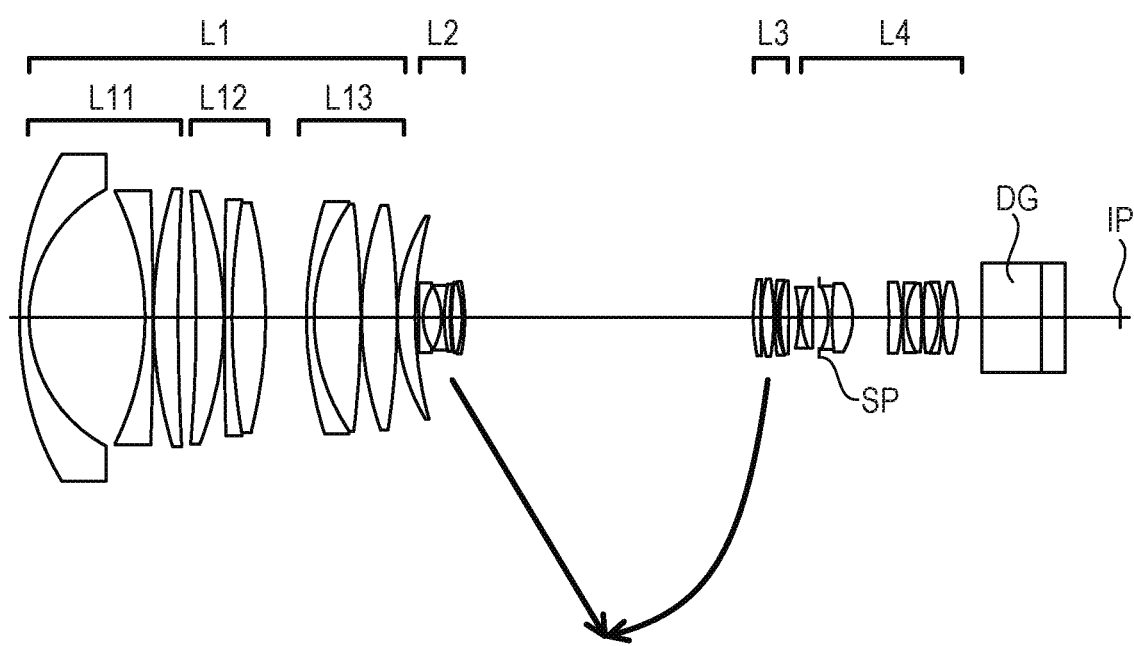
FIG. 25 is a lens cross-sectional view of a zoom lens according to Numerical Embodiment 13 at a wide-angle end (focal length: 6.00 mm) when the zoom lens is focused at infinity.
Figure 26A:
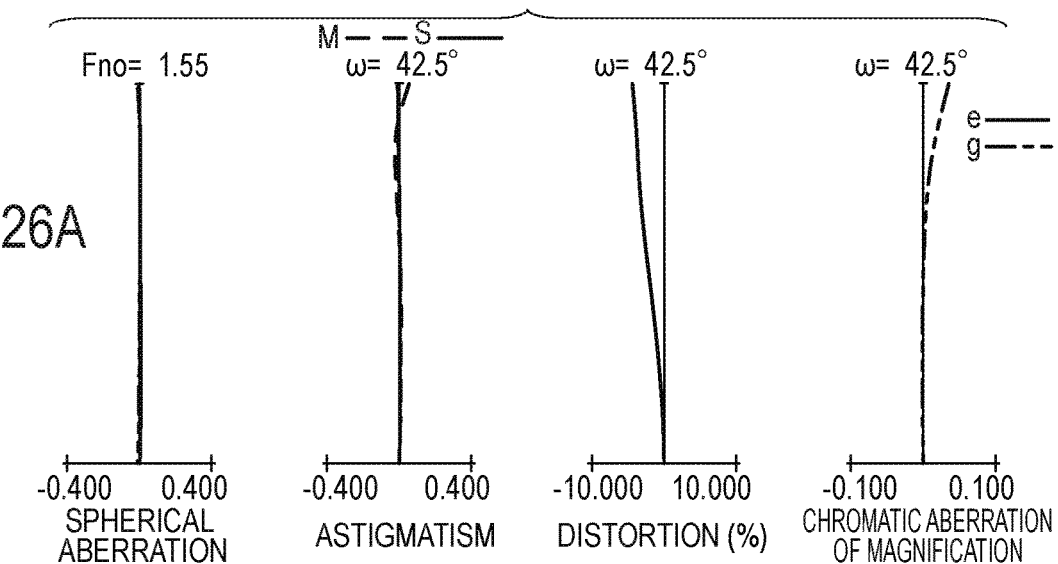
FIG. 26A shows aberration diagrams of the zoom lens according to Numerical Embodiment 13 at the wide-angle end (focal length: 6.00 mm) when the zoom lens is focused at infinity.
Figure 26B:
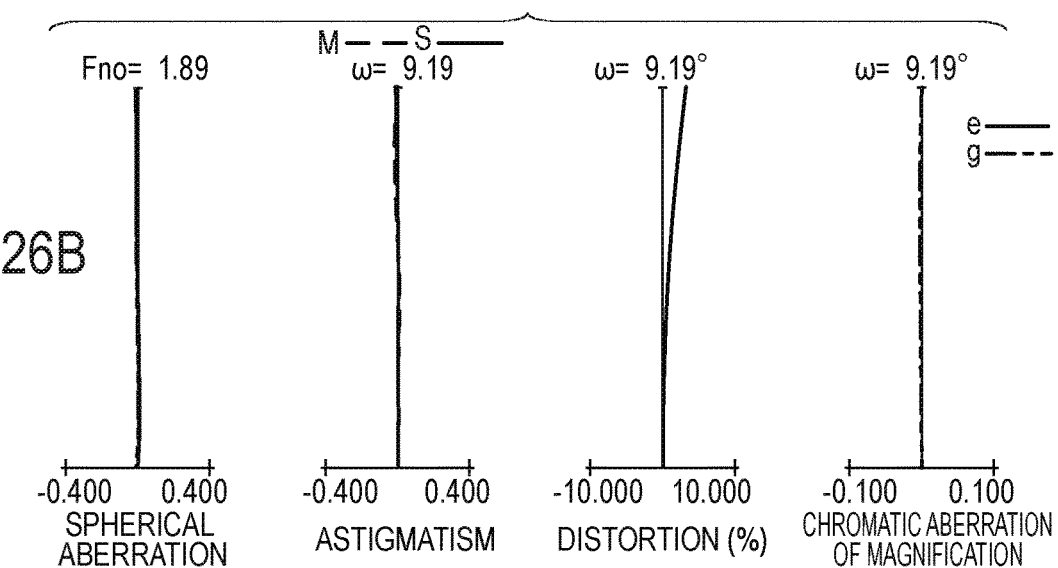
FIG. 26B shows aberration diagrams of the zoom lens according to Numerical Embodiment 13 at an intermediate zoom position (focal length: 34.00 mm) when the zoom lens is focused at infinity.
Figure 26C:
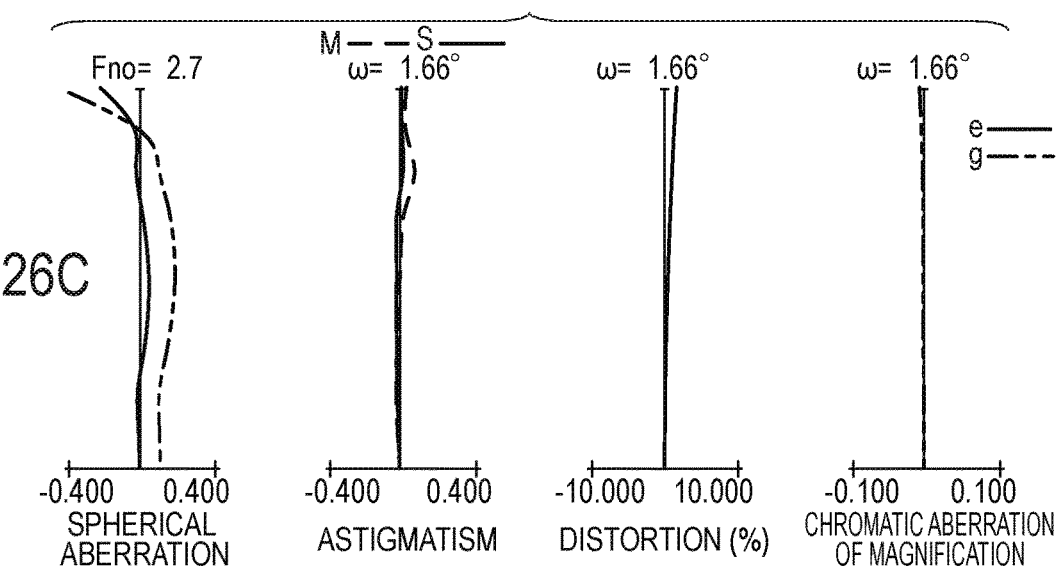
FIG. 26C shows aberration diagrams of the zoom lens according to Numerical Embodiment 13 at a telephoto end (focal length: 189.99 mm) when the zoom lens is focused at infinity.

FIG. 25 is a lens cross-sectional view of a zoom lens according to Embodiment 13 (Numerical Embodiment 13) of the present invention at the wide-angle end when the zoom lens is focused at infinity. FIG. 26A, FIG. 26B, and FIG. 26C are longitudinal aberration diagrams of Numerical Embodiment 13 at the wide-angle end, the focal length of 34 mm, and the telephoto end, respectively. All the aberration diagrams are longitudinal aberration diagrams at a time when the zoom lens is focused at infinity.

In FIG. 25, the zoom lens includes, in order from the object side, a first lens unit L1 having a positive refractive power for focusing. The zoom lens also includes a second lens unit L2 having a negative refractive power for zooming, which is configured to move toward the image side for zooming from the wide-angle end to the telephoto end, and a third lens unit L3 having a positive refractive power, which is configured to move non-linearly on the optical axis along with the movement of the second lens unit L2 to correct image plane variation accompanying zooming. The zoom lens further includes a fourth lens unit L4, which is configured not to move for zooming, and is configured to exert an image forming action. In Embodiment 13, the moving lens units correspond to the third lens unit L3, the rear lens unit corresponds to the fourth lens unit L4, the rear positive lens unit corresponds to the third lens unit L3, and the front negative lens unit corresponds to the second lens unit.

In Embodiment 13, the second lens unit L2 and the third lens unit L3 form a zooming system. An aperture stop SP is arranged within the fourth lens unit L4. Further, the aperture stop is configured not to move in the optical axis direction for zooming.

The first lens unit L1 corresponds to the 1st surface to the 18th surface. The second lens unit L2 corresponds to the 19th surface to the 26th surface, the third lens unit L3 corresponds to the 27th surface to the 34th surface, and the fourth lens unit L4 corresponds to the 35th surface to the 51st surface. The first lens unit L1 consists of a first lens sub-unit L11 having a negative refractive power, which is configured not to move for focusing, a second lens sub-unit L12 having a positive refractive power, which is configured to move toward the image side for focusing from the infinity side to the proximity side, and a third lens sub-unit L13 having a positive refractive power, which is configured to move toward the object side for focusing. The first lens sub-unit L11 corresponds to the 1st surface to the 6th surface, the second lens sub-unit L12 corresponds to the 7th surface to the 11th surface, and the third lens sub-unit L13 corresponds to the 12th surface to the 18th surface. Further, during focusing, the third lens sub-unit is configured to move at a proportion of 0.06 time a movement amount of the second lens sub-unit. The 1st surface, the 19th surface, the 28th surface, and the 33rd surface are aspherical surfaces, and of the aspherical surfaces, the 1st surface is configured to mainly correct distortion at the wide-angle end, and the 19th surface, the 28th surface, and the 33rd surface are configured to mainly correct spherical aberration and curvature of field at the intermediate zoom position and the telephoto end.

Values corresponding to the conditional expressions of Embodiment 13 are shown in Table 1. Embodiment 13 satisfies the conditional expressions (8) to (15), and the refractive powers of the lens units and the lens configuration of the first lens unit are appropriately set to achieve the zoom lens having a wide angle of view, a high zoom ratio, a small size, a light weight, and high optical performance over the entire zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

<Numerical Embodiment 1>
Unit: mm

Surface data

| Surface number | r | d | nd | vd | Effective diameter |
|---|---|---|---|---|---|
| 1 | 1,441.278 | 4.50 | 1.83400 | 37.2 | 150.02 |
| 2 | 252.988 | 1.50 | | | 142.27 |
| 3 | 253.189 | 17.82 | 1.43387 | 95.1 | 141.42 |
| 4 | −488.275 | 16.65 | | | 141.57 |
| 5 | 242.637 | 13.59 | 1.43387 | 95.1 | 142.36 |
| 6 | −6,233.534 | 0.20 | | | 141.95 |
| 7 | 189.192 | 13.54 | 1.43387 | 95.1 | 138.49 |
| 8 | 926.901 | 1.82 | | | 137.29 |
| 9 | 148.533 | 11.49 | 1.43875 | 94.7 | 129.80 |
| 10 | 330.441 | (Variable) | | | 127.95 |
| 11* | −153.004 | 1.78 | 2.00330 | 28.3 | 33.43 |
| 12 | 33.530 | 7.76 | | | 29.18 |
| 13 | −38.476 | 1.17 | 1.83400 | 37.2 | 28.32 |
| 14 | 54.027 | 7.33 | 1.92286 | 18.9 | 28.95 |
| 15 | −38.887 | 0.48 | | | 29.14 |
| 16 | −37.608 | 1.62 | 1.83481 | 42.7 | 28.83 |
| 17 | −197.126 | (Variable) | | | 29.03 |
| 18 | 80.278 | 5.64 | 1.69680 | 55.5 | 41.24 |
| 19* | −332.444 | 0.47 | | | 40.92 |
| 20 | 149.570 | 6.05 | 1.43875 | 94.7 | 40.38 |
| 21 | −103.810 | 0.41 | | | 39.70 |
| 22 | 272.004 | 1.50 | 1.85478 | 24.8 | 38.05 |
| 23 | 79.624 | (Variable) | | | 36.98 |
| 24 | 117.301 | 5.48 | 1.49700 | 81.5 | 36.17 |
| 25 | −104.184 | 1.50 | 1.85478 | 74.8 | 35.47 |
| 26 | −364.502 | 0.16 | | | 35.09 |
| 27* | 121.048 | 4.97 | 1.60311 | 60.6 | 34.44 |
| 28 | −114.697 | (Variable) | | | 33.61 |
| 29 (Stop) | ∞ | 4.69 | | | 30.68 |
| 30 | −169.353 | 1.13 | 1.89190 | 37.1 | 27.55 |
| 31 | 32.689 | 1.08 | | | 26.24 |
| 32 | 27.908 | 3.85 | 1.92286 | 18.9 | 26.61 |
| 33 | 67.589 | 4.69 | | | 25.92 |
| 34 | −44.247 | 1.22 | 1.88300 | 40.8 | 25.26 |
| 35 | −71.845 | 7.66 | | | 25.40 |
| 36 | −58.961 | 1.22 | 1.83481 | 42.7 | 24.02 |
| 37 | 71.681 | 4.40 | 1.84666 | 23.9 | 24.34 |
| 38 | −56.611 | 2.38 | | | 24.52 |
| 39 | −34.840 | 1.22 | 1.89190 | 37.1 | 24.18 |
| 40 | 72.157 | 13.55 | 1.51823 | 58.9 | 25.23 |
| 41 | −26.549 | 10.62 | | | 28.45 |
| 42 | 71.157 | 8.76 | 1.54814 | 45.8 | 27.72 |
| 43 | −69.427 | 2.00 | | | 26.69 |
| 44 | −140.457 | 1.22 | 1.89190 | 37.1 | 25.37 |
| 45 | 33.094 | 7.35 | 1.48749 | 70.2 | 24.63 |
| 46 | −73.882 | 0.16 | | | 25.20 |
| 47 | 136.872 | 7.47 | 1.51633 | 64.1 | 25.29 |
| 48 | −29.105 | 1.22 | 1.88300 | 40.8 | 25.16 |
| 49 | −173.529 | 0.16 | | | 25.74 |
| 50 | 75.016 | 4.96 | 1.53172 | 48.8 | 26.04 |
| 51 | −50.141 | 8.10 | | | 26.01 |
| 52 | ∞ | 26.73 | 1.60859 | 46.4 | 48.60 |
| 53 | ∞ | 10.69 | 1.51633 | 64.2 | 48.60 |
| 54 | ∞ | 14.01 | | | 48.60 |
| Image plane | ∞ | | | | |

Aspherical surface data

Eleventh surface

K = −2.00005e+000   A4 = 2.93558e−006   A6 = 9.51603e−008   A8 = 3.37577e−009
A10 = 9.70785e−012   Al2 = −1.11581e−014   A14 = 2.39804e−017   A16 = 29.86480e−021
A3 = −3.94697e−007   A5 = −1.67917e−007   A7 = −2.45072e−008   A9 = −2.60553e−010
A11 = 321.98606e−015 A13 = 8.73188e−018   A15 = −8.50262e−019

-continued

<Numerical Embodiment 1>
Unit: mm

Nineteenth surface

| | | | |
|---|---|---|---|
| K = −1.00318e+002 | A4 = 8.02630e−007 | A6 = 6.16900e−012 | A8 = 3.53325e−013 |
| A10 = −1.63885e−015 | Al2 = −6.45674e−019 | A14 = −3.70702e−021 | A16 = 1.73608e−023 |
| A3 = −6.69660e−007 | A5 = −2.24799e−009 | A7 = −1.36332e−011 | A9 = 5.52166e−014 |
| A11 = 6.54762e−017 | A13 = −1.08390e−019 | A15 = −2.12075−022 | |

Twenty-seventh surface

| | | | |
|---|---|---|---|
| K = −2.28330e+000 | A4 = 9.31807e−009 | A6 = 3.65783e−008 | A8 = 2.42984e−010 |
| A10 = −6.08475e−014 | Al2 = 2.73615e−017 | A14 = 5.46535e−019 | A16 = 1.19814e−022 |
| A3 = −7.02000e−007 | A5 = −1.83845e−007 | A7 = −4.04185e−009 | A9 = −6.57147e−012 |
| A11 = −7.80406e−015 | A13 = −1.51227e−017 | A15 = −1.04272e−020 | |

Various data

| | | | |
|---|---|---|---|
| Zoom ratio | 92.00 | | |
| Focal length | 8.90 | 76.14 | 818.87 |
| F-number | 2.07 | 3.01 | 5.80 |
| Half angle of view | 31.71 | 4.13 | 0.38 |
| Total lens length | 486.98 | 486.98 | 486.98 |
| d10 | 5.00 | 102.87 | 140.93 |
| d17 | 197.47 | 68.91 | 2.10 |
| d23 | 3.94 | 14.12 | 3.64 |
| d28 | 2.61 | 23.13 | 62.37 |
| Entrance pupil position | 98.08 | 593.07 | 6,288.96 |
| Exit pupil position | 268.92 | 268.92 | 268.92 |
| Front principal point position | 107.29 | 691.95 | 9,738.40 |
| Rear principal point position | 5.11 | −62.13 | −804.86 |

Zoom lens unit data

| Unit | First surface | Focal length | Lens structure length | Front principal point position | Rear principal point position |
|---|---|---|---|---|---|
| 1 | 1 | 190.00 | 81.11 | 42.52 | −18.34 |
| 2 | 11 | −18.72 | 20.15 | 2.27 | −11.93 |
| 3 | 18 | 93.30 | 14.06 | −1.87 | −10.69 |
| 4 | 24 | 76.26 | 12.11 | 4.69 | −3.17 |
| 5 | 29 | 46.88 | 136.52 | 58.75 | 36.90 |

Single lens data

| Lens | First surface | Focal Length |
|---|---|---|
| 1 | 1 | −366.22 |
| 2 | 3 | 386.14 |
| 3 | 5 | 537.28 |
| 4 | 7 | 543.49 |
| 5 | 9 | 601.80 |
| 6 | 11 | −27.06 |
| 7 | 13 | −26.62 |
| 8 | 14 | 25.16 |
| 9 | 16 | −55.62 |
| 10 | 18 | 92.93 |
| 11 | 20 | 140.34 |
| 12 | 22 | −130.94 |
| 13 | 24 | 111.61 |
| 14 | 25 | −169.51 |
| 15 | 27 | 98.05 |
| 16 | 30 | −30.44 |
| 17 | 32 | 48.60 |
| 18 | 34 | −132.44 |
| 19 | 36 | −38.38 |
| 20 | 37 | 37.59 |
| 21 | 39 | −26.04 |
| 22 | 40 | 39.14 |
| 23 | 42 | 65.22 |
| 24 | 44 | −29.74 |
| 25 | 45 | 47.81 |

<Numerical Embodiment 1>
Unit: mm

| | | |
|---|---|---|
| 26 | 47 | 47.04 |
| 27 | 48 | −39.53 |
| 28 | 50 | 57.03 |
| 29 | 52 | 0.00 |
| 30 | 53 | 0.00 |

<Numerical Embodiment 2>
Unit: mm

Surface data

| Surface number | r | d | nd | vd | Effective diameter |
|---|---|---|---|---|---|
| 1 | −1,005.495 | 4.50 | 1.85150 | 40.8 | 150.08 |
| 2 | 299.155 | 4.17 | | | 141.36 |
| 3 | 433.816 | 13.39 | 1.43387 | 95.1 | 140.49 |
| 4 | −480.417 | 0.20 | | | 139.13 |
| 5 | 453.846 | 9.53 | 1.43387 | 95.1 | 129.58 |
| 6 | −880.050 | 12.51 | | | 127.68 |
| 7 | 237.178 | 9.38 | 1.43387 | 95.1 | 113.51 |
| 8 | ∞ | 0.20 | | | 111.19 |
| 9 | 175.584 | 10.55 | 1.43387 | 95.1 | 109.76 |
| 10 | 2,032.155 | 1.60 | | | 109.00 |
| 11 | 144.979 | 8.21 | 1.43875 | 94.7 | 104.35 |
| 12 | 342.383 | (Variable) | | | 103.09 |
| 13* | −171.475 | 1.78 | 2.00330 | 28.3 | 38.67 |
| 14 | 25.539 | 11.68 | | | 31.44 |
| 15 | −28.549 | 1.17 | 1.69250 | 43.6 | 30.57 |
| 16 | 65.108 | 8.68 | 1.89286 | 20.4 | 32.56 |
| 17 | −35.638 | 4.32 | | | 33.00 |
| 18 | −26.902 | 1.62 | 1.89346 | 38.7 | 30.38 |
| 19 | −44.611 | (Variable) | | | 31.49 |
| 20 | 71.647 | 5.16 | 1.69680 | 55.5 | 40.34 |
| 21* | 5,958.376 | 8.06 | | | 39.96 |
| 22 | 161.196 | 7.07 | 1.43875 | 94.7 | 38.31 |
| 23 | −76.819 | 0.40 | | | 37.59 |
| 24 | 108.997 | 2.11 | 1.85478 | 24.8 | 35.33 |
| 25 | 55.863 | (Variable) | | | 33.87 |
| 26 | −129.448 | 5.67 | 1.49700 | 81.5 | 32.91 |
| 27 | −52.562 | 2.27 | 1.85478 | 24.8 | 32.50 |
| 28 | −78.464 | 0.16 | | | 32.65 |
| 29* | 91.752 | 4.29 | 1.60311 | 60.6 | 31.73 |
| 30 | −301.284 | (Variable) | | | 30.95 |
| 31 (Stop) | ∞ | 4.27 | | | 28.59 |
| 32 | −373.484 | 1.13 | 1.89190 | 37.1 | 26.26 |
| 33 | 35.075 | 1.25 | | | 25.30 |
| 34 | 32.028 | 3.16 | 1.92286 | 18.9 | 25.61 |
| 35 | 63.316 | 7.25 | | | 25.06 |
| 36 | −25.150 | 1.22 | 1.88300 | 40.8 | 24.40 |
| 37 | −26.609 | 6.02 | | | 24.90 |
| 38 | −43.874 | 1.22 | 1.83481 | 42.7 | 23.51 |
| 39 | 56.503 | 6.02 | 1.84666 | 23.9 | 24.15 |
| 40 | −46.164 | 2.24 | | | 24.60 |
| 41 | −32.658 | 1.22 | 1.89190 | 37.1 | 24.29 |
| 42 | 87.431 | 13.57 | 1.51823 | 58.9 | 25.52 |
| 43 | −26.307 | 9.11 | | | 29.01 |
| 44 | 39.951 | 9.15 | 1.54814 | 45.8 | 28.74 |
| 45 | −216.074 | 2.00 | | | 27.04 |
| 46 | 338.294 | 1.22 | 1.89190 | 37.1 | 25.66 |
| 47 | 23.013 | 8.46 | 1.48749 | 70.2 | 24.31 |
| 48 | −229.650 | 0.16 | | | 24.03 |
| 49 | 57.078 | 6.35 | 1.51633 | 64.1 | 23.79 |
| 50 | −28.526 | 1.22 | 1.88300 | 40.8 | 23.17 |
| 51 | 137.759 | 0.16 | | | 23.13 |
| 52 | 50.146 | 5.29 | 1.53172 | 48.8 | 23.26 |
| 53 | −37.979 | 8.10 | | | 23.09 |
| 54 | ∞ | 26.73 | 1.60859 | 46.4 | 48.60 |
| 55 | ∞ | 10.69 | 1.51633 | 64.2 | 48.60 |
| 56 | ∞ | 13.28 | | | 48.60 |
| Image plane | ∞ | | | | |

<Numerical Embodiment 2>
Unit: mm

Aspherical surface data

Thirteenth surface

| K = −2.00250e+000 | A4 = 8.94815e−006 | A6 = 1.08486e−007 | A8 = 3.49578e−009 |
|---|---|---|---|
| A10 = 1.02585e−011 | A12 = −1.26140e−014 | A14 = 2.12250e−017 | A16 = 1.17093e−020 |
| A3 = −1.29887e−006 | A5 = −3.27767e−007 | A7 = −2.57583e−008 | A9 = −2.71754e−010 |
| A11 = −2.74689e−015 | A13 = 1.26469e−016 | A15 = −8.95368e−019 | |

Twenty-first surface

| K = 7.70500e+004 | A4 = 1.60666e−006 | A6 = 2.29874e−009 | A8 = −3.40574e−012 |
|---|---|---|---|
| A10 = −1.61735e−014 | A12 = 5.97201e−017 | A14 = 1.71923e−021 | A16 = 3.30173e−023 |
| A3 = −1.27582e−006 | A5 = −2.94589e−008 | A7 = −1.13512e−010 | A9 = 6.98936e−013 |
| A11 = −1.21021e−015 | A13 = −2.01654e−019 | A15 = −1.73045e−021 | |

Twenty-ninth surface

| K = −2.61062e+000 | A4 = 6.11665e−007 | A6 = 3.51772e−008 | A8 = 2.44721e−010 |
|---|---|---|---|
| A10 = 1.84757e−013 | Al2 = −4.09422e−017 | A14 = −3.08625e−018 | A16 = −1.23365e−021 |
| A3 = −4.67780e−007 | A5 = −1.54165e−007 | A7 = −4.01300e−009 | A9 = −8.90990e−012 |
| A11 = −3.28401e−015 | A13 = 2.96362e−017 | A15 = 1.15516e−019 | |

Various data
Zoom ratio 85.00

| | Wide angle | Intermediate | Telephoto |
|---|---|---|---|
| Focal length | 7.25 | 61.20 | 616.25 |
| F-number | 2.07 | 3.11 | 5.81 |
| Half angle of view | 37.18 | 5.14 | 0.51 |
| Total lens length | 511.72 | 511.72 | 511.72 |
| d12 | 2.70 | 98.36 | 135.56 |
| d19 | 209.01 | 73.59 | 3.98 |
| d25 | 7.11 | 19.42 | 6.78 |
| d30 | 3.72 | 31.17 | 76.21 |
| Entrance pupil position | 80.39 | 508.89 | 5,549.34 |
| Exit pupil position | 285.79 | 285.79 | 285.79 |
| Front principal point position | 87.83 | 583.83 | 7,559.14 |
| Rear principal point position | 6.03 | −47.92 | −602.97 |

Zoom lens unit data

| Unit | First surface | Focal length | Lens structure length | Front principal point position | Rear principal point position |
|---|---|---|---|---|---|
| 1 | 1 | 170.86 | 74.25 | 46.76 | −6.58 |
| 2 | 13 | −18.33 | 29.75 | 1.58 | −21.28 |
| 3 | 20 | 90.54 | 22.79 | −1.31 | −18.10 |
| 4 | 26 | 108.38 | 12.39 | 8.54 | 0.92 |
| 5 | 31 | 47.35 | 137.22 | 57.63 | 20.50 |

Single lens data

| Lens | First surface | Focal length |
|---|---|---|
| 1 | 1 | −268.77 |
| 2 | 3 | 526.44 |
| 3 | 5 | 689.90 |
| 4 | 7 | 545.55 |
| 5 | 9 | 441.10 |
| 6 | 11 | 564.50 |
| 7 | 13 | −21.87 |
| 8 | 15 | −28.36 |
| 9 | 16 | 26.59 |
| 10 | 18 | −78.80 |
| 11 | 20 | 103.59 |
| 12 | 22 | 119.36 |
| 13 | 24 | −135.29 |
| 14 | 26 | 173.29 |

-continued

| <Numerical Embodiment 2> Unit: mm | | |
|---|---|---|
| 15 | 27 | −192.32 |
| 16 | 29 | 116.64 |
| 17 | 32 | −35.68 |
| 18 | 34 | 66.14 |
| 19 | 36 | −848.70 |
| 20 | 38 | −29.26 |
| 21 | 39 | 30.54 |
| 22 | 41 | −26.36 |
| 23 | 42 | 40.52 |
| 24 | 44 | 61.98 |
| 25 | 46 | −27.56 |
| 26 | 47 | 43.24 |
| 27 | 49 | 37.65 |
| 28 | 50 | −26.52 |
| 29 | 52 | 41.31 |
| 30 | 54 | 0.00 |
| 31 | 55 | 0.00 |

<Numerical Embodiment 3>
Unit: min

Surface data

| Surface number | r | d | nd | vd | Effective diameter |
|---|---|---|---|---|---|
| 1 | 6,797.841 | 5.00 | 1.83400 | 37.2 | 193.90 |
| 2 | 277.470 | 1.72 | | | 182.14 |
| 3 | 292.550 | 25.00 | 1.43387 | 95.1 | 181.72 |
| 4 | −540.031 | 15.32 | | | 180.05 |
| 5 | 262.805 | 19.00 | 1.43387 | 95.1 | 170.34 |
| 6 | −2,068.845 | 0.30 | | | 168.92 |
| 7 | 215.857 | 18.00 | 1.43387 | 95.1 | 158.24 |
| 8 | 2,328.853 | 0.50 | | | 156.61 |
| 9 | 146.371 | 15.00 | 1.49700 | 81.5 | 146.72 |
| 10 | 319.116 | (Variable) | | | 144.17 |
| 11* | 2,429.429 | 1.50 | 2.00330 | 28.3 | 44.59 |
| 12 | 36.335 | 11.12 | | | 38.02 |
| 13 | −43.829 | 1.50 | 1.78800 | 47.4 | 36.64 |
| 14 | 83.605 | 7.80 | 1.92286 | 18.9 | 36.88 |
| 15 | −47.195 | 1.70 | | | 36.87 |
| 16 | −45.894 | 1.50 | 1.83400 | 37.2 | 34.88 |
| 17 | −1,306.933 | (Variable) | | | 34.58 |
| 18 | 76.477 | 7.19 | 1.59522 | 67.7 | 41.86 |
| 19* | −119.108 | 0.50 | | | 41.57 |
| 20 | 67.883 | 1.50 | 1.80518 | 25.4 | 39.53 |
| 21 | 40.858 | 5.99 | 1.43875 | 94.7 | 37.95 |
| 22 | 153.508 | (Variable) | | | 37.09 |
| 23 | 154.248 | 4.01 | 1.48749 | 70.2 | 35.92 |
| 24* | −303.558 | (Variable) | | | 35.05 |
| 25 (Stop) | ∞ | 4.87 | | | 33.07 |
| 26 | −110.661 | 1.30 | 1.88300 | 40.8 | 30.90 |
| 27 | 63.223 | 0.50 | | | 30.25 |
| 28 | 29.835 | 5.00 | 1.80810 | 22.8 | 30.67 |
| 29 | 161.925 | 3.50 | | | 30.03 |
| 30 | −86.593 | 1.30 | 1.88300 | 40.8 | 28.97 |
| 31 | 47.604 | 8.95 | | | 28.19 |
| 32 | 173.981 | 4.00 | 1.80518 | 25.4 | 29.97 |
| 33 | −345.510 | 3.00 | | | 30.12 |
| 34 | −86.069 | 1.30 | 1.77250 | 49.6 | 30.17 |
| 35 | 110.040 | 6.00 | 1.53172 | 48.8 | 30.80 |
| 36 | −54.165 | 7.00 | | | 31.42 |
| 37 | −99.477 | 4.00 | 1.53172 | 48.8 | 31.82 |
| 38 | −35.646 | 0.50 | | | 32.04 |
| 39 | −63.770 | 1.30 | 1.83400 | 37.2 | 31.26 |
| 40 | 41.283 | 8.64 | 1.51633 | 64.1 | 31.63 |
| 41 | −39.849 | 0.50 | | | 32.16 |
| 42 | 66.812 | 6.42 | 1.51633 | 64.1 | 31.78 |
| 43 | −51.543 | 1.30 | 1.88300 | 40.8 | 31.35 |
| 44 | −659.157 | 0.50 | | | 31.21 |
| 45 | 44.450 | 5.22 | 1.52249 | 59.8 | 30.81 |
| 46 | −250.000 | 10.00 | | | 30.15 |
| 47 | ∞ | 33.00 | 1.60859 | 46.4 | 60.00 |

-continued

<Numerical Embodiment 3>
Unit: min

| 48 | ∞ | 13.20 | 1.51633 | 64.2 | 60.00 |
| 49 | ∞ | 13.15 | | | 60.00 |
| Image plane | ∞ | | | | |

Aspherical surface data
Eleventh surface

K = -1.14361e-001   A4 = -2.46091e-007   A6 = -1.87562e-007   A8 = -3.15775e-009
A10 = -8.40104e-012  A12 = -1.23647e-015  A14 = 2.62468e-019   A16 = 3.74263e-022
A3 = 6.56024e-007   A5 = 6.77490e-007   A7 = 3.06745e-008   A9 = 2.07247e-010
A11 = 1.85802e-013  A13 = -2.19060e-017  A15 = -1.10231e-020

Nineteenth surface

K = 3.96200e-002   A4 = 4.04790e-007   A6 = -1.51210e-008   A8 = 2.10402e-010
A10 = 8.46186e-013  A12 = 1.57689e-016  A14 = -1.92204e-020  A16 = -4.30285e-023
A3 = -7.67454e-007  A5 = 1.12460e-007   A7 = -3.16211e-010   A9 = -1.92586e-011
A11 = -1.90182e-014  A13 = 1.23953e-018  A15 = 1.03449e-021

Twenty-fourth surface

K = -5.06287e-004   A4 = -6.13124e-007   A6 = -1.68182e-008   A8 = -1.81097e-010
A10 = -3.13241e-013  A12 = 3.70517e-017   A14 = -2.84242e-018  A16 = -5.24481e-021
A3 = 2.32395e-006   A5 = 1.66017e-007   A7 = 2.01099e-009   A9 = 9.33148e-012
A11 = 1.03152e-014  A13 = -1.09054e-017  A15 = 2.42024e-019

Various data

| | | | |
|---|---|---|---|
| Zoom ratio | 100.00 | | |
| Focal length | 8.00 | 49.17 | 800.00 |
| F-number | 1.80 | 2.34 | 5.10 |
| Half angle of view | 34.50 | 6.38 | 0.39 |
| Total lens length | 523.64 | 523.64 | 523.64 |
| d10 | 2.61 | 100.34 | 142.22 |
| d17 | 226.43 | 110.18 | 1.99 |
| d22 | 3.00 | 3.40 | 3.00 |
| d24 | 3.00 | 21.12 | 87.82 |
| Entrance pupil position | 111.17 | 572.78 | 8,327.92 |
| Exit pupil position | 696.41 | 696.41 | 696.41 |
| Front principal point position | 119.27 | 625.49 | 10,064.58 |
| Rear principal point position | 5.15 | -36.03 | -786.85 |

Zoom lens unit data

| Unit | First surface | Focal length | Lens structure length | Front principal point position | Rear principal point position |
|---|---|---|---|---|---|
| 1 | 1 | 194.62 | 99.84 | 53.94 | -17.06 |
| 2 | 11 | -21.79 | 25.12 | 4.43 | -13.35 |
| 3 | 18 | 76.59 | 15.19 | 0.14 | -9.67 |
| 4 | 23 | 209.70 | 4.01 | 0.91 | -1.79 |
| 5 | 25 | 55.33 | 131.30 | 60.20 | 13.16 |

Single lens data

| Lens | First surface | Focal length |
|---|---|---|
| 1 | 1 | -344.78 |
| 2 | 3 | 440.26 |
| 3 | 5 | 537.43 |
| 4 | 7 | 545.56 |
| 5 | 9 | 527.24 |
| 6 | 11 | -36.47 |
| 7 | 13 | -36.12 |
| 8 | 14 | 33.24 |
| 9 | 16 | -56.70 |
| 10 | 18 | 79.06 |
| 11 | 20 | -129.52 |
| 12 | 21 | 124.56 |
| 13 | 23 | 209.70 |

-continued

<Numerical Embodiment 3>
Unit: min

| | | |
|---|---|---|
| 14 | 26 | −45.14 |
| 15 | 28 | 44.05 |
| 16 | 30 | −34.43 |
| 17 | 32 | 142.89 |
| 18 | 34 | −62.04 |
| 19 | 35 | 68.81 |
| 20 | 37 | 101.75 |
| 21 | 39 | −29.69 |
| 22 | 40 | 40.60 |
| 23 | 42 | 57.20 |
| 24 | 43 | −63.02 |
| 25 | 45 | 72.38 |
| 26 | 47 | 0.00 |
| 27 | 48 | 0.00 |

<Numerical Embodiment 4>
Unit: mm

Surface data

| Surface number | r | d | nd | vd | Effective diameter |
|---|---|---|---|---|---|
| 1 | 6,797.841 | 5.00 | 1.83400 | 37.2 | 196.22 |
| 2 | 261.816 | 0.83 | | | 183.77 |
| 3 | 256.396 | 30.61 | 1.43387 | 95.1 | 183.25 |
| 4 | −507.119 | 16.14 | | | 180.12 |
| 5 | 339.675 | 19.00 | 1.43387 | 95.1 | 168.85 |
| 6 | −721.023 | 0.30 | | | 168.55 |
| 7 | 174.651 | 18.00 | 1.43387 | 95.1 | 162.69 |
| 8 | 652.254 | 0.50 | | | 161.32 |
| 9 | 151.351 | 15.00 | 1.49700 | 81.5 | 152.22 |
| 10 | 344.760 | (Variable) | | | 150.15 |
| 11* | −1,079.535 | 1.50 | 2.00330 | 28.3 | 42.53 |
| 12 | 37.244 | 9.62 | | | 36.50 |
| 13 | −43.069 | 1.30 | 1.78800 | 47.4 | 35.73 |
| 14 | 66.762 | 8.30 | 1.92286 | 18.9 | 35.91 |
| 15 | −43.853 | 1.50 | | | 35.87 |
| 16 | −42.878 | 1.30 | 1.83400 | 37.2 | 33.72 |
| 17 | 792.036 | (Variable) | | | 33.28 |
| 18 | 92.526 | 6.50 | 1.59522 | 67.7 | 40.49 |
| 19* | −112.627 | 0.50 | | | 40.30 |
| 20 | 67.851 | 1.50 | 1.80518 | 25.4 | 38.63 |
| 21 | 40.685 | 6.00 | 1.43875 | 94.7 | 37.20 |
| 22 | 127.814 | (Variable) | | | 36.35 |
| 23 | 127.690 | 4.19 | 1.48749 | 70.2 | 35.43 |
| 24* | −337.538 | (Variable) | | | 34.66 |
| 25 (Stop) | ∞ | 4.87 | | | 32.90 |
| 26 | −142.160 | 1.30 | 1.88300 | 40.8 | 30.84 |
| 27 | 94.657 | 0.50 | | | 30.31 |
| 28 | 27.693 | 5.00 | 1.80810 | 22.8 | 30.27 |
| 29 | 70.795 | 3.50 | | | 29.13 |
| 30 | −216.176 | 1.30 | 1.88300 | 40.8 | 28.08 |
| 31 | 46.745 | 8.95 | | | 27.02 |
| 32 | −472.485 | 4.00 | 1.80518 | 25.4 | 26.99 |
| 33 | −77.646 | 3.00 | | | 27.06 |
| 34 | −42.921 | 1.30 | 1.77250 | 49.6 | 26.54 |
| 35 | 97.379 | 6.00 | 1.53172 | 48.8 | 27.17 |
| 36 | −49.407 | (Variable) | | | 27.83 |
| 37 | −153.896 | 4.00 | 1.53172 | 48.8 | 27.99 |
| 38 | −33.240 | 0.50 | | | 28.10 |
| 39 | −61.807 | 1.30 | 1.83400 | 37.2 | 27.25 |
| 40 | 29.475 | 7.64 | 1.51633 | 64.1 | 27.21 |
| 41 | −44.731 | 0.50 | | | 27.68 |
| 42 | 213.273 | 4.39 | 1.51633 | 64.1 | 27.68 |
| 43 | −50.240 | 1.30 | 1.88300 | 40.8 | 27.59 |
| 44 | −144.622 | 0.50 | | | 27.79 |
| 45 | 36.627 | 5.10 | 1.52249 | 59.8 | 27.69 |
| 46 | −250.000 | (Variable) | | | 27.10 |
| 47 | ∞ | 33.00 | 1.60859 | 46.4 | 60.00 |

-continued

<Numerical Embodiment 4>
Unit: mm

| | | | | | |
|---|---|---|---|---|---|
| 48 | ∞ | 13.20 | 1.51633 | 64.2 | 60.00 |
| 49 | ∞ | (Variable) | | | 60.00 |
| Image plane | ∞ | | | | |

Aspherical surface data

Eleventh surface

| | | | |
|---|---|---|---|
| K = −1.14077e−001 | A4 = −7.53625e−007 | A6 = −2.33733e−007 | A8 = −3.39632e−009 |
| A10 = −8.62466e−012 | A12 = −1.01187e−015 | A14 = 5.04471e−019 | A16 = 1.31720e−021 |
| A3 = 1.18861e−006 | A5 = 9.33348e−007 | A7 = 3.51225e−008 | A9 = 2.15157e−010 |
| A11 = 1.88015e−013 | A13 = −2.52471e−017 | A15 = −4.85775e−020 | |

Nineteenth surface

| | | | |
|---|---|---|---|
| K = 3.86796e−002 | A4 = −6.02219e−008 | A6 = −2.26842e−008 | A8 = 4.17148e−010 |
| A10 = 1.71609e−012 | A12 = 2.40208e−016 | A14 = −1.53496e−019 | A16 = −2.89475e−022 |
| A3 = 2.71230e−007 | A5 = 2.14507e−007 | A7 = −1.13403e−009 | A9 = −3.76813e−011 |
| A11 = −3.85498e−014 | A13 = 2.7993e−018 | A15 = 1.38865e−020 | |

Twenty-fourth surface

| | | | |
|---|---|---|---|
| K = −3.63722e−004 | A4 = −8.71334e−007 | A6 = −5.39358e−009 | A8 = −1.19455e−010 |
| A10 = −1.08052e−012 | A12 = −6.68427e−016 | A14 = 3.73367e−017 | A16 = 3.73609e−020 |
| A3 = 1.56900e−006 | A5 = 1.00116e−007 | A7 = 7.35179e−010 | A9 = 1.46975e−011 |
| A11 = 4.07564e−014 | A13 = −2.28397e−016 | A15 = −2.03490e−018 | |

Various data

| | | | |
|---|---|---|---|
| Zoom ratio | 122.52 | | |
| Focal length | 8.00 | 50.00 | 980.00 |
| F-number | 2.00 | 2.60 | 6.00 |
| Angle of view | 34.51 | 6.28 | 0.32 |
| Total lens length | 533.71 | 533.71 | 533.71 |
| BF | 13.45 | 13.45 | 13.45 |
| d10 | 2.62 | 99.23 | 140.63 |
| d17 | 235.91 | 118.82 | 2.00 |
| d22 | 2.99 | 3.24 | 2.99 |
| d24 | 3.00 | 23.23 | 98.90 |
| d36 | 7.00 | 6.95 | 7.20 |
| d46 | 10.00 | 10.05 | 9.80 |
| Entrance Pupil position | 113.33 | 581.57 | 10,827.18 |
| Exit pupil position | 6,771.17 | 7,690.23 | 4,545.60 |
| Front principal point position | 121.34 | 631.89 | 12,019.09 |
| Rear principal point position | 5.45 | −36.55 | −966.55 |

Zoom lens unit data

| Unit | First surface | Focal length | Lens structure length | Front principal point position | Rear principal point position |
|---|---|---|---|---|---|
| 1 | 1 | 190.00 | 105.38 | 57.43 | −17.05 |
| 2 | 11 | −20.73 | 23.53 | 4.27 | −11.93 |
| 3 | 18 | 87.24 | 14.49 | −0.42 | −9.75 |
| 4 | 23 | 189.96 | 4.19 | 0.77 | −2.05 |
| 5 | 25 | −52.43 | 39.72 | 14.03 | −19.13 |
| 6 | 37 | 52.51 | 25.73 | 15.72 | −0.05 |
| 7 | 47 | ∞ | 46.20 | 14.58 | −14.58 |

Single lens data

| Lens | First surface | Focal length |
|---|---|---|
| 1 | 1 | −324.55 |
| 2 | 3 | 396.34 |
| 3 | 5 | 533.75 |
| 4 | 7 | 542.17 |
| 5 | 9 | 527.64 |
| 6 | 11 | −35.56 |
| 7 | 13 | −32.89 |
| 8 | 14 | 29.39 |
| 9 | 16 | −48.43 |

-continued

<Numerical Embodiment 4>
Unit: mm

| | | |
|---|---|---|
| 10 | 18 | 86.06 |
| 11 | 20 | −128.22 |
| 12 | 21 | 132.89 |
| 13 | 23 | 189.96 |
| 14 | 26 | −63.81 |
| 15 | 28 | 52.95 |
| 16 | 30 | −43.17 |
| 17 | 32 | 113.82 |
| 18 | 34 | −38.22 |
| 19 | 35 | 62.23 |
| 20 | 37 | 78.45 |
| 21 | 39 | −23.62 |
| 22 | 40 | 35.53 |
| 23 | 42 | 78.91 |
| 24 | 43 | −87.24 |
| 25 | 45 | 61.28 |
| 26 | 47 | 0.00 |
| 27 | 48 | 0.00 |

<Numerical Embodiment 5>
Unit: mm

Surface data

| Surface number | r | d | nd | vd | Effective diameter |
|---|---|---|---|---|---|
| 1 | 6,797.841 | 5.00 | 1.83400 | 37.2 | 189.51 |
| 2 | 263.174 | 2.28 | | | 183.04 |
| 3 | 265.508 | 25.38 | 1.43387 | 95.1 | 183.20 |
| 4 | −580.426 | 10.70 | | | 182.89 |
| 5 | 302.320 | 18.85 | 1.43387 | 95.1 | 174.62 |
| 6 | −1,272.746 | 0.30 | | | 173.25 |
| 7 | 197.655 | 17.98 | 1.43387 | 95.1 | 158.45 |
| 8 | 1,995.837 | 0.50 | | | 156.14 |
| 9 | 144.052 | 14.67 | 1.49700 | 81.5 | 144.63 |
| 10 | 326.505 | (Variable) | | | 142.43 |
| 11* | −17,879.086 | 1.50 | 2.00330 | 78.3 | 51.21 |
| 12 | 40.969 | 10.70 | | | 43.42 |
| 13 | −64.398 | 1.50 | 1.78800 | 47.4 | 42.66 |
| 14 | 52.698 | 9.71 | 1.92286 | 18.9 | 41.57 |
| 15 | −64.259 | (Variable) | | | 41.22 |
| 16 | −41.001 | 1.50 | 1.83400 | 37.2 | 35.53 |
| 17 | −1,106.599 | (Variable) | | | 35.21 |
| 18 | 62.015 | 10.42 | 1.59522 | 67.7 | 51.39 |
| 19* | −153.983 | 0.50 | | | 51.11 |
| 20 | 60.569 | 1.50 | 1.80518 | 25.4 | 48.55 |
| 21 | 37.619 | 6.85 | 1.43875 | 94.7 | 46.09 |
| 22 | 67.672 | (Variable) | | | 45.10 |
| 23 | 114.160 | 6.17 | 1.48749 | 70.2 | 44.84 |
| 24* | −318.291 | (Variable) | | | 43.92 |
| 25 (Stop) | ∞ | 4.87 | | | 27.47 |
| 26 | −110.190 | 1.30 | 1.88300 | 40.8 | 25.57 |
| 27 | 75.764 | 0.50 | | | 25.18 |
| 28 | 28.019 | 5.00 | 1.80810 | 22.8 | 25.34 |
| 29 | 133.967 | 3.50 | | | 24.30 |
| 30 | −66.830 | 1.30 | 1.88300 | 40.8 | 23.13 |
| 31 | 31.047 | 8.95 | | | 22.54 |
| 32 | −604.365 | 4.00 | 1.80518 | 25.4 | 25.68 |
| 33 | −77.644 | 3.00 | | | 26.50 |
| 34 | −111.552 | 1.30 | 1.77250 | 49.6 | 27.21 |
| 35 | 351.868 | 6.00 | 1.53172 | 48.8 | 27.76 |
| 36 | −39.370 | 7.00 | | | 28.60 |
| 37 | −78.721 | 4.00 | 1.53172 | 48.8 | 28.75 |
| 38 | −29.143 | 0.50 | | | 28.95 |
| 39 | −45.508 | 1.30 | 1.83400 | 37.2 | 28.04 |
| 40 | 50.277 | 7.41 | 1.51633 | 64.1 | 28.46 |
| 41 | −33.308 | 0.50 | | | 28.91 |
| 42 | 91.683 | 5.88 | 1.51633 | 64.1 | 28.12 |
| 43 | −36.474 | 1.30 | 1.88300 | 40.8 | 27.69 |
| 44 | −327.763 | 0.50 | | | 27.67 |
| 45 | 41.347 | 4.71 | 1.52249 | 59.8 | 27.40 |
| 46 | −250.000 | 10.00 | | | 26.81 |

-continued

<Numerical Embodiment 5>
Unit: mm

| | | | | | |
|---|---|---|---|---|---|
| 47 | ∞ | 33.00 | 1.60859 | 46.4 | 60.00 |
| 48 | ∞ | 13.20 | 1.51633 | 64.2 | 60.00 |
| 49 | ∞ | 12.88 | | | 60.00 |
| Image plane | ∞ | | | | |

Aspherical surface data

Eleventh surface

| | | | |
|---|---|---|---|
| K = −1.15314e−001 | A4 = −7.39325e−007 | A6 = −3.15527e−007 | A8 = −5.86282e−009 |
| A10 = −1.61855e−011 | A12 = −2.85959e−015 | A14 = 2.66559e−019 | A16 = 3.63436e−022 |
| A3 = 1.39137e−006 | A5 = 1.08665e−006 | A7 = 5.44911e−008 | A9 = 3.95487e−010 |
| A11 = −3.59926e−013 | A13 = −2.02079e−017 | A15 = −1.27900e−020 | |

Nineteenth surface

| | | | |
|---|---|---|---|
| K = 3.85829e−002 | A4 = 2.02109e−006 | A6 = 1.66238e−007 | A8 = 2.55416e−009 |
| A10 = 5.97484e−012 | A12 = 1.13259e−015 | A14 = −3.65920e−020 | A16 = −5.68292e−023 |
| A3 = −2.50403e−006 | A5 = −6.52965e−007 | A7 = −2.60587e−008 | A9 = −1.57651e−010 |
| A11 = −1.27165e−013 | A13 = 1.94373e−018 | A15 = 1.67439e−021 | |

Twenty-fourth surface

| | | | |
|---|---|---|---|
| K = −4.80453e−004 | A4 = −1.00714e−007 | A6 = −3.08603e−008 | A8 = −1.16342e−010 |
| A10 = −1.21206e−012 | A12 = −1.34343e−015 | A14 = −1.47472e−017 | A16 = −1.16620e−020 |
| A3 = 3.41136e−006 | A5 = 2.31842e−007 | A7 = 2.69055e−009 | A9 = 7.02067e−012 |
| A11 = 8.40076e−014 | A13 = 6.35863e−017 | A15 = 7.53047e−019 | |

Various data

| | | | |
|---|---|---|---|
| Zoom ratio | 100.00 | | |
| Focal length | 8.00 | 48.00 | 800.00 |
| F-number | 2.00 | 2.00 | 5.20 |
| Half angle of view | 34.49 | 6.54 | 0.39 |
| Total lens length | 530.53 | 530.53 | 530.53 |
| d10 | 2.61 | 97.60 | 138.31 |
| d15 | 5.22 | 1.99 | 5.17 |
| d17 | 226.43 | 116.04 | 2.00 |
| d22 | 5.35 | 3.36 | 4.43 |
| d24 | 3.00 | 23.61 | 92.70 |
| Entrance pupil position | 110.59 | 570.89 | 9,981.55 |
| Exit pupil position | 458.05 | 458.05 | 458.05 |
| Front principal point position | 118.74 | 624.04 | 12,219.14 |
| Rear principal point position | 4.88 | −35.09 | −787.10 |

Zoom lens unit data

| Unit | First surface | Focal length | Lens structure length | Front principal point position | Rear principal point position |
|---|---|---|---|---|---|
| 1 | 1 | 190.60 | 95.66 | 51.12 | −15.83 |
| 2 | 11 | −65.65 | 23.41 | −9.07 | −31.73 |
| 3 | 16 | −50.76 | 1.50 | −0.03 | −0.85 |
| 4 | 18 | 88.11 | 19.27 | −3.28 | −15.02 |
| 5 | 23 | 172.58 | 6.17 | 1.10 | −3.06 |
| 6 | 25 | 49.82 | 129.03 | 56.01 | 7.81 |

Single lens data

| Lens | First surface | Focal length |
|---|---|---|
| 1 | 1 | −326.30 |
| 2 | 3 | 422.67 |
| 3 | 5 | 563.69 |
| 4 | 7 | 502.85 |
| 5 | 9 | 503.70 |
| 6 | 11 | −40.40 |
| 7 | 13 | −36.39 |
| 8 | 14 | 32.28 |
| 9 | 16 | −50.76 |
| 10 | 18 | 75.37 |

-continued

<Numerical Embodiment 5>
Unit: mm

| | | |
|---|---|---|
| 11 | 20 | −125.86 |
| 12 | 21 | 180.05 |
| 13 | 23 | 172.58 |
| 14 | 26 | −50.38 |
| 15 | 28 | 42.49 |
| 16 | 30 | −23.72 |
| 17 | 32 | 109.26 |
| 18 | 34 | −108.99 |
| 19 | 35 | 66.63 |
| 20 | 37 | 84.24 |
| 21 | 39 | −28.28 |
| 22 | 40 | 39.87 |
| 23 | 42 | 51.15 |
| 24 | 43 | −46.31 |
| 25 | 45 | 68.01 |
| 26 | 47 | 0.00 |
| 27 | 48 | 0.00 |

<Numerical Embodiment6>
Unit: mm

Surface data

| Surface number | r | d | nd | vd | Effective diameter |
|---|---|---|---|---|---|
| 1* | 368.815 | 5.35 | 1.77250 | 49.6 | 177.00 |
| 2 | 97.952 | 47.49 | | | 145.81 |
| 3 | −204.053 | 4.40 | 1.69680 | 55.5 | 144.78 |
| 4 | 427.486 | 0.20 | | | 144.53 |
| 5 | 217.280 | 10.90 | 1.80810 | 22.8 | 146.04 |
| 6 | 716.989 | 6.57 | | | 145.65 |
| 7 | 2,364.476 | 19.53 | 1.43387 | 95.1 | 144.89 |
| 8 | −172.649 | 0.20 | | | 144.50 |
| 9 | −4,964.876 | 4.20 | 1.73800 | 32.3 | 133.46 |
| 10 | 251.058 | 17.43 | 1.49700 | 81.5 | 128.55 |
| 11 | −317.758 | 23.61 | | | 127.64 |
| 12 | 274.851 | 4.30 | 1.85478 | 24.8 | 121.61 |
| 13 | 138.023 | 22.64 | 1.49700 | 81.5 | 120.96 |
| 14 | −305.934 | 0.25 | | | 121.40 |
| 15 | 187.767 | 19.76 | 1.43387 | 95.1 | 122.30 |
| 16 | −419.141 | 0.15 | | | 121.44 |
| 17 | 123.726 | 12.21 | 1.76385 | 48.5 | 114.38 |
| 18 | 432.669 | (Variable) | | | 113.13 |
| 19* | −29,184.520 | 2.50 | 1.83481 | 42.7 | 43.57 |
| 20 | 39.492 | 10.44 | | | 36.94 |
| 21 | −39.303 | 1.50 | 1.75500 | 52.3 | 35.53 |
| 22 | 104.354 | 8.53 | 1.80810 | 22.8 | 36.16 |
| 23 | −41.029 | 0.65 | | | 36.91 |
| 24 | −45.265 | 1.50 | 1.88300 | 40.8 | 36.56 |
| 25 | −409.092 | (Variable) | | | 37.85 |
| 26 | 274.517 | 4.51 | 1.69680 | 55.5 | 47.64 |
| 27* | −255.677 | 0.15 | | | 47.93 |
| 28 | 321.311 | 4.09 | 1.48749 | 70.2 | 48.09 |
| 29 | −348.355 | 1.80 | 1.80610 | 40.9 | 48.09 |
| 30 | −1,304.434 | (Variable) | | | 48.16 |
| 31 | 58.437 | 9.16 | 1.49700 | 81.5 | 48.68 |
| 32 | −196.712 | 0.13 | | | 47.99 |
| 33 | 143.800 | 1.50 | 1.80518 | 25.4 | 46.00 |
| 34 | 57.616 | 2.22 | | | 44.14 |
| 35* | 97.854 | 4.51 | 1.60311 | 60.6 | 44.11 |
| 36 | −1,017.435 | (Variable) | | | 43.61 |
| 37 (Stop) | ∞ | 2.67 | | | 32.44 |
| 38 | −104.297 | 1.50 | 1.75500 | 57.3 | 31.80 |
| 39 | 30.376 | 6.34 | 1.80810 | 22.8 | 31.04 |
| 40 | 283.301 | 8.50 | | | 30.69 |
| 41 | −28.238 | 2.00 | 1.89190 | 37.1 | 30.05 |
| 42 | 265.218 | 12.00 | 1.60342 | 38.0 | 33.39 |
| 43 | −29.305 | (Variable) | | | 36.49 |
| 44 | −206.799 | 7.10 | 1.56732 | 42.8 | 38.15 |
| 45 | −63.781 | 0.59 | | | 38.74 |
| 46 | 156.656 | 2.00 | 1.88300 | 40.8 | 37.88 |
| 47 | 31.600 | 8.80 | 1.43875 | 94.7 | 36.48 |

<Numerical Embodiment6>
Unit: mm

| | | | | | |
|---|---|---|---|---|---|
| 48 | −486.949 | 0.81 | | | 36.90 |
| 49 | 245.461 | 8.85 | 1.48749 | 70.2 | 37.27 |
| 50 | −33.970 | 2.00 | 1.80000 | 29.8 | 37.48 |
| 51 | −76.224 | 0.20 | | | 38.96 |
| 52 | 69.875 | 11.95 | 1.48749 | 70.2 | 39.52 |
| 53 | −49.707 | (Variable) | | | 38.88 |
| 54 | ∞ | 33.00 | 1.60859 | 46.4 | 60.00 |
| 55 | ∞ | 13.20 | 1.51633 | 64.2 | 60.00 |
| 56 | ∞ | 11.86 | | | 60.00 |
| Image plane | ∞ | | | | |

Aspherical surface data

First surface

K = −4.83393e+000    A4 = −7.02750e−009    A6 = −3.33471e−011    A8 = −8.01899e−016
A3 = 2.90921e−007    A5 = 1.95229e−009    A7 = 2.50567e−013

Nineteenth surface

K = −4.43480e+008    A4 = 1.73567e−006    A6 = 9.46258e−009    A8 = 1.11949e−011
A10 = −1.04977e−014    A12 = 1.31125e−017
A3 = −4.76652e−006    A5 = −1.13180e−007    A7 = −5.23085e−010    A9 = 2.64752e−013
A11 = −3.66535e−016

Twenty-seventh surface

K = 2.23056e+001    A4 = 4.72724e−008    A6 = −6.40428e−009    A8 = −3.31773e−011
A10 = 3.76200e−014    A12 = 2.20831e−017
A3 = 6.37970e−008    A5 = 4.25746e−008    A7 = 6.37118e−010    A9 = 4.24307e−013
A11 = −1.72592e−015

Thirty-fifth surface

K = 5.96399e+000    A4 = −1.36818e−006    A6 = 7.18198e−009    A8 = 3.68460e−011
A10 = −1.07653e−013    A12 = −5.47734e−017
A3 = −8.16995e−007    A5 = −3.92676e−008    A7 = −8.05300e−010    A9 = 3.07282e−013
A11 = 4.21411e−015

Various data

| | | | |
|---|---|---|---|
| Zoom ratio | 35.00 | | |
| | Wide angle | Intermediate | Telephoto |
| Focal length | 6.00 | 35.00 | 209.98 |
| F-number | 1.55 | 1.92 | 3.00 |
| Angle of view | 42.51 | 8.93 | 1.50 |
| Total lens length | 592.05 | 592.05 | 592.05 |
| d18 | 3.01 | 50.81 | 79.19 |
| d25 | 170.13 | 63.19 | 1.50 |
| d30 | 1.48 | 14.77 | 1.47 |
| d36 | 2.98 | 48.83 | 95.45 |
| d43 | 15.64 | 15.69 | 15.64 |
| d53 | 13.04 | 13.00 | 13.04 |
| Entrance pupil position | 99.82 | 182.09 | 1,043.02 |
| Exit pupil position | 178.35 | 177.93 | 178.35 |
| Front principal point position | 106.04 | 224.48 | 1,517.84 |
| Rear principal point position | 5.86 | −23.15 | −198.13 |

Zoom lens unit data

| Unit | First surface | Focal length | Lens structure length | Front principal point position | Rear principal point position |
|---|---|---|---|---|---|
| 1 | 1 | 75.87 | 199.20 | 111.51 | 44.18 |
| 2 | 19 | −24.59 | 25.12 | 5.32 | −12.61 |
| 3 | 26 | 154.30 | 10.55 | 1.62 | −4.94 |
| 4 | 31 | 106.53 | 17.52 | 1.78 | −10.53 |
| 5 | 37 | −72.10 | 33.01 | −3.37 | −34.05 |
| 6 | 44 | 54.03 | 42.30 | 25.07 | −3.25 |
| 7 | 54 | ∞ | 46.20 | 14.58 | −14.58 |

<Numerical Embodiment6>
Unit: mm

Single lens data

| Lens | First surface | Focal length |
|---|---|---|
| 1 | 1 | −173.32 |
| 2 | 3 | −196.81 |
| 3 | 5 | 378.14 |
| 4 | 7 | 370.79 |
| 5 | 9 | −321.34 |
| 6 | 10 | 284.26 |
| 7 | 12 | −326.05 |
| 8 | 13 | 194.11 |
| 9 | 15 | 301.10 |
| 10 | 17 | 221.93 |
| 11 | 19 | −46.98 |
| 12 | 21 | −37.47 |
| 13 | 22 | 37.05 |
| 14 | 24 | −57.42 |
| 15 | 26 | 189.84 |
| 16 | 28 | 342.39 |
| 17 | 29 | −586.70 |
| 18 | 31 | 91.48 |
| 19 | 33 | −119.23 |
| 20 | 35 | 147.66 |
| 21 | 38 | −30.87 |
| 22 | 39 | 41.21 |
| 23 | 41 | −28.34 |
| 24 | 42 | 44.14 |
| 25 | 44 | 158.80 |
| 26 | 46 | −44.91 |
| 27 | 47 | 67.81 |
| 28 | 49 | 61.65 |
| 29 | 50 | −77.64 |
| 30 | 52 | 61.39 |
| 31 | 54 | 0.00 |
| 32 | 55 | 0.00 |

<Numerical Embodiment 7>
Unit: mm

Surface data

| Surface number | r | d | nd | vd | Effective diameter |
|---|---|---|---|---|---|
| 1* | 336.758 | 5.35 | 1.77250 | 49.6 | 180.00 |
| 2 | 89.252 | 55.27 | | | 143.82 |
| 3 | −157.177 | 4.40 | 1.77250 | 49.6 | 142.88 |
| 4 | 1,535.778 | 0.20 | | | 146.79 |
| 5 | 283.930 | 13.51 | 1.89286 | 20.4 | 150.01 |
| 6 | −1,779.350 | 5.68 | | | 149.66 |
| 7 | −26,329.88 | 26.09 | 1.43387 | 95.1 | 149.44 |
| 8 | −142.321 | 0.20 | | | 149.25 |
| 9 | −636.698 | 4.20 | 1.73800 | 32.3 | 136.96 |
| 10 | 316.711 | 20.21 | 1.49700 | 81.5 | 132.74 |
| 11 | −224.716 | 18.71 | | | 131.89 |
| 12 | 255.005 | 4.30 | 1.85478 | 24.8 | 132.86 |
| 13 | 138.024 | 26.97 | 1.49700 | 81.5 | 131.67 |
| 14 | −315.846 | 0.25 | | | 132.14 |
| 15 | 186.738 | 19.76 | 1.43387 | 95.1 | 132.22 |
| 16 | −645.647 | 0.15 | | | 131.26 |
| 17 | 122.707 | 13.20 | 1.76385 | 48.5 | 122.89 |
| 18 | 359.234 | (Variable) | | | 121.53 |
| 19* | ∞ | 2.50 | 1.83481 | 42.7 | 46.00 |
| 20 | 38.952 | 10.42 | | | 38.83 |
| 21 | −46.663 | 1.50 | 1.75500 | 52.3 | 37.84 |
| 22 | 66.210 | 8.85 | 1.80810 | 22.8 | 37.77 |
| 23 | −53.942 | 3.43 | | | 38.33 |
| 24 | −48.449 | 1.50 | 1.88300 | 40.8 | 37.70 |
| 25 | −210.973 | (Variable) | | | 38.98 |
| 26 | 158.681 | 4.84 | 1.59522 | 67.7 | 41.21 |
| 27* | −186.110 | (Variable) | | | 41.24 |
| 28 | 56.843 | 7.91 | 1.43875 | 94.7 | 41.33 |

<Numerical Embodiment 7>
Unit: mm

| | | | | | |
|---|---|---|---|---|---|
| 29 | −214.923 | 0.56 | | | 40.81 |
| 30 | 96.881 | 1.90 | 1.80518 | 25.4 | 39.61 |
| 31 | 50.937 | 1.97 | | | 38.27 |
| 32* | 91.919 | 3.41 | 1.60311 | 60.6 | 38.27 |
| 33 | 346.988 | (Variable) | | | 37.94 |
| 34 (Stop) | ∞ | 3.50 | | | 34.42 |
| 35 | −60.184 | 1.50 | 1.75500 | 52.3 | 33.98 |
| 36 | 42.035 | 6.72 | 1.80810 | 22.8 | 34.20 |
| 37 | −253.028 | 8.51 | | | 34.20 |
| 38 | −39.949 | 2.00 | 1.89190 | 37.1 | 33.61 |
| 39 | 83.128 | 13.39 | 1.60342 | 38.0 | 36.48 |
| 40 | −35.115 | 17.81 | | | 39.35 |
| 41 | −714.147 | 5.50 | 1.56732 | 42.8 | 41.38 |
| 42 | −67.117 | 0.59 | | | 41.57 |
| 43 | 83.245 | 2.00 | 1.88300 | 40.8 | 39.94 |
| 44 | 30.567 | 8.30 | 1.43875 | 94.7 | 37.70 |
| 45 | 252.446 | 0.81 | | | 37.64 |
| 46 | 301.219 | 9.02 | 1.48749 | 70.2 | 37.67 |
| 47 | −32.853 | 2.00 | 1.80000 | 29.8 | 37.62 |
| 48 | −101.751 | 0.20 | | | 38.97 |
| 49 | 81.635 | 9.22 | 1.48749 | 70.2 | 39.38 |
| 50 | −47.156 | 13.04 | | | 39.12 |
| 51 | ∞ | 33.00 | 1.60859 | 46.4 | 60.00 |
| 52 | ∞ | 13.20 | 1.51633 | 64.2 | 60.00 |
| 53 | ∞ | 11.90 | | | 60.00 |
| Image plane | ∞ | | | | |

Aspherical surface data

First surface

K = −9.20721e−001, A4 = 4.58673e−009, A6 = −1.64274e−011, A8 = −4.64570e−017
A3 = 1.35797e−007, A5 = 1.44977e−009, A7 = 4.18199e−014

Nineteenth surface

K = −8.79672e+007, A4 = 1.55682e−006, A6 = 1.0316e−008, A8 = 1.50615e−011
A10 = −1.70471e−014, A12 = 1.07881e−017
A3 = −1.32918e−006, A5 = −1.04091e−007, A7 = −6.26383e−010, A9 = 3.00959e−013
A11 = −1.73665e−016

Twenty-seventh surface

K = −1.12422e+001, A4 = −5.26832e−008, A6 = −5.94449e−009, A8 = −3.46673e−011
A10 = 3.95835e−014, A12 = 2.35099e−017
A3 = −5.03091e−007, A5 = 2.47688e−008, A7 = 6.57414e−010, A9 = 4.39187e−013
A11 = −1.82480e−015

Thirty-second surface

K = 4.15086e+000, A4 = −1.06669e−006, A6 = 6.21952e−009, A8 = 2.47785e−011
A10 = −6.85863e−014, A12 = −4.50709e−017
A3 = −3.01388e−007, A5 = −3.72814e−008, A7 = −5.95349e−010, A9 = 1.42315e−013
A11 = 3.00746e−015

Various data

| Zoom ratio | 40.00 | | |
|---|---|---|---|
| | Wide angle | Intermediate | Telephoto |
| Focal length | 5.50 | 35.00 | 219.97 |
| F-number | 1.55 | 2.39 | 3.20 |
| Half angle of view | 45.00 | 8.93 | 1.43 |
| Image height | 5.50 | 5.50 | 5.50 |
| Total lens length | 622.20 | 677.20 | 622.20 |
| BF | 11.90 | 11.90 | 11.90 |
| d18 | 2.93 | 53.86 | 82.39 |
| d25 | 185.39 | 71.66 | 1.50 |
| d27 | 1.47 | 10.76 | 1.47 |
| d33 | 3.00 | 56.50 | 107.42 |
| Entrance pupil position | 96.02 | 173.53 | 1,083.44 |
| Exit pupil position | 277.09 | 277.09 | 277.09 |
| Front principal point position | 101.63 | 213.15 | 1,485.88 |

<Numerical Embodiment 7>
Unit: mm

| | Rear principal point position | 6.40 | −23.10 | −208.08 | |

Zoom lens unit data

| Unit | First surface | Focal length | Lens structure length | Front principal point position | Rear principal point position |
|---|---|---|---|---|---|
| 1 | 1 | 71.25 | 218.43 | 112.04 | 52.21 |
| 2 | 19 | −25.24 | 28.20 | 5.94 | −14.04 |
| 3 | 26 | 144.15 | 4.84 | 1.40 | −1.64 |
| 4 | 28 | 136.67 | 15.75 | −1.33 | −12.41 |
| 5 | 34 | 47.57 | 150.30 | 57.20 | −5.57 |

<Numerical Embodiment 8>
Unit: mm

Surface data

| Surface number | r | d | nd | vd | Effective diameter |
|---|---|---|---|---|---|
| 1* | 1,010.444 | 3.21 | 1.77250 | 49.6 | 119.88 |
| 2 | 87.708 | 25.37 | | | 103.61 |
| 3 | −195.841 | 2.64 | 1.77250 | 49.6 | 102.80 |
| 4 | 306.709 | 0.12 | | | 102.34 |
| 5 | 158.084 | 7.19 | 1.92286 | 18.9 | 103.27 |
| 6 | 387.504 | 4.28 | | | 102.83 |
| 7 | 429.744 | 16.03 | 1.43387 | 95.1 | 102.09 |
| 8 | −128.989 | 0.12 | | | 101.57 |
| 9 | 674.554 | 2.52 | 1.85478 | 24.8 | 92.31 |
| 10 | 179.460 | 12.20 | 1.43875 | 94.7 | 89.29 |
| 11 | −245.313 | 10.96 | | | 88.15 |
| 12 | 150.826 | 2.58 | 1.85478 | 24.8 | 86.82 |
| 13 | 84.191 | 16.36 | 1.49700 | 81.5 | 85.67 |
| 14 | −439.907 | 0.15 | | | 85.94 |
| 15 | 122.687 | 11.85 | 1.59522 | 67.7 | 86.57 |
| 16 | −818.748 | 0.15 | | | 85.89 |
| 17 | 79.856 | 9.20 | 1.76385 | 48.5 | 80.36 |
| 18 | 224.080 | (Variable) | | | 78.97 |
| 19* | 869.423 | 1.50 | 188300 | 40.8 | 31.05 |
| 20 | 24.388 | 7.92 | | | 25.91 |
| 21 | −27.881 | 0.90 | 1.69680 | 55.5 | 24.77 |
| 22 | 45.990 | 6.95 | 1.80810 | 22.8 | 24.84 |
| 23 | −31.809 | 1.96 | | | 25.45 |
| 24 | −28.061 | 0.90 | 1.88300 | 40.8 | 24.95 |
| 25 | −165.592 | (Variable) | | | 25.99 |
| 26 | 85.335 | 5.12 | 1.49700 | 81.5 | 30.50 |
| 27* | −80.679 | (Variable) | | | 30.57 |
| 28 | 34.465 | 8.07 | 1.43875 | 94.7 | 29.74 |
| 29 | −153.572 | 0.17 | | | 28.22 |
| 30 | 61.500 | 1.14 | 1 85478 | 24.8 | 26.85 |
| 31 | 32.606 | 1.44 | | | 25.90 |
| 32* | 58.152 | 3.28 | 1.60311 | 60.6 | 25.90 |
| 33 | 1,616.946 | (Variable) | | | 25.57 |
| 34 (Stop) | ∞ | 1.60 | | | 23.11 |
| 35 | −47.988 | 0.90 | 1.75500 | 52.3 | 23.00 |
| 36 | 31.411 | 5.75 | 1.80810 | 22.8 | 22.65 |
| 37 | −459.849 | 5.48 | | | 22.29 |
| 38 | −40.996 | 0.90 | 1.77250 | 49.6 | 21.33 |
| 39 | 90.794 | 1.85 | 1.60342 | 38.0 | 21.66 |
| 40 | 192.331 | 2.00 | | | 21.88 |
| 41 | −68.672 | 0.96 | 1.81600 | 46.6 | 22.12 |
| 42 | 46.850 | 5.88 | 1.60342 | 38.0 | 23.17 |
| 43 | −26.525 | 5.16 | | | 23.87 |
| 44 | −242.279 | 3.97 | 1.56732 | 42.8 | 24.71 |
| 45 | −38.246 | 0.35 | | | 24.95 |
| 46 | 103.930 | 1.20 | 1.88300 | 40.8 | 24.22 |
| 47 | 22.803 | 4.60 | 1.43875 | 94.7 | 23.36 |
| 48 | 105.090 | 0.49 | | | 23.48 |
| 49 | 94.063 | 7.14 | 1.48749 | 70.2 | 23.58 |

-continued

<Numerical Embodiment 8>
Unit: mm

| | | | | | |
|---|---|---|---|---|---|
| 50 | −19.967 | 1.20 | 1.80000 | 29.8 | 23.69 |
| 51 | −52.735 | 0.12 | | | 24.70 |
| 52 | 105.028 | 6.26 | 1.48749 | 70.2 | 24.99 |
| 53 | −27.415 | 5.00 | | | 24.99 |
| 54 | ∞ | 33.00 | 1.60859 | 46.4 | 60.00 |
| 55 | ∞ | 13.20 | 1.51633 | 64.2 | 60.00 |
| 56 | ∞ | 8.50 | | | 60.00 |
| Image plane | ∞ | | | | |

Aspherical surface data

First surface

K = −2.02579e+003   A4 = 3.23746e−007   A6 = 3.31327e−011   A8 = −3.02111e−015
A3 = −2.75915e−007  A5 = −5.92943e−009  A7 = 1.85497e−013

Nineteenth surface

K = −4.59715e+003   A4 = 6.16976e−006   A6 = 1.06696e−007   A8 = 1.01454e−009
A10 = 3.45757e−012  A12 = 3.50593e−015
A3 = −1.05667e−007  A5 = −5.02466e−007  A7 = −1.37961e−008  A9 = −5.65462e−011
A11 = −1.68141e−013

Twenty-seventh surface

K = 1.68367e+001    A4 = 2.51924e−006   A6 = −1.45782e−007  A8 = −1.08895e−009
A10 = 4.04568e−012  A12 = 6.80875e−015
A3 = 4.65132e−006   A5 = 8.53097e−007   A7 = 1.67012e−008   A9 = 1.48288e−011
A11 = −3.00983e−013

Thirty-second surface

K = 3.80545e−001    A4 = −2.97336e−006  A6 = 9.94059e−008   A8 = 1.33447e−009
A10 = −8.38358e−012 A12 = −9.73891e−015
A3 = 3.06109e−006   A5 = −1.84526e−007  A7 = −1.86965e−008  A9 = 1.55004e−011
A11 = 4.91217e−013

Various data

| Zoom ratio | 33.90 | | |
|---|---|---|---|
| | Wide angle | Intermediate | Telephoto |
| Focal length | 6.40 | 37.00 | 216.98 |
| F-number | 1.87 | 2.90 | 3.90 |
| Half angle of view | 40.67 | 8.45 | 1.45 |
| Image height | 5.50 | 5.50 | 5.50 |
| Total lens length | 390.02 | 390.02 | 390.02 |
| BF | 8.50 | 8.50 | 8.50 |
| d18 | 2.23 | 33.67 | 51.61 |
| d25 | 103.55 | 39.90 | 1.49 |
| d27 | 1.50 | 7.07 | 1.47 |
| d33 | 2.98 | 29.61 | 55.68 |
| Entrance pupil position | 69.54 | 143.28 | 885.32 |
| Exit pupil position | −6,597.75 | −6,597.75 | −6,597.75 |
| Front principal point position | 75.94 | 180.07 | 1,095.16 |
| Rear principal point position | 2.10 | −28.50 | −208.48 |

Zoom lens unit data

| Unit | First surface | Focal length | Lens structure length | Front principal point position | Rear principal point position |
|---|---|---|---|---|---|
| 1 | 1 | 56.04 | 124.92 | 71.10 | 21.68 |
| 2 | 19 | −15.12 | 20.13 | 4.21 | −9.72 |
| 3 | 26 | 84.06 | 5.12 | 1.78 | −1.68 |
| 4 | 28 | 74.42 | 14.10 | 0.59 | −9.37 |
| 5 | 34 | 43.88 | 107.00 | 43.59 | 8.75 |

<Numerical Embodiment 9>

Unit: mm
Surface data

| Surface number | r | d | nd | vd | Effective diameter |
|---|---|---|---|---|---|
| 1 | 499.599 | 3.21 | 1.77250 | 49.6 | 120.00 |
| 2 | 83.816 | 22.40 | | | 103.26 |
| 3 | −427.016 | 2.64 | 1.77250 | 49.6 | 102.39 |
| 4 | 237.944 | 0.12 | | | 100.20 |
| 5 | 121.946 | 6.48 | 1.92286 | 18.9 | 100.10 |
| 6 | 203.607 | 9.43 | | | 99.28 |
| 7 | 1,760.009 | 11.02 | 1.43387 | 95.1 | 97.81 |
| 8 | −156.166 | 0.12 | | | 97.10 |
| 9 | −3,851.292 | 2.52 | 1.85478 | 24.8 | 91.36 |
| 10 | 281.175 | 11.46 | 1.43875 | 94.7 | 88.99 |
| 11 | −185.013 | 11.78 | | | 87.97 |
| 12 | 143.610 | 2.58 | 1.85478 | 24.8 | 81.78 |
| 13 | 82.410 | 16.19 | 1.49700 | 81.5 | 80.85 |
| 14 | −425.002 | 1.82 | | | 81.26 |
| 15 | 128.000 | 11.85 | 1.53775 | 74.7 | 82.02 |
| 16 | −381.443 | 0.15 | | | 81.47 |
| 17 | 85.230 | 8.48 | 1.76385 | 48.5 | 76.71 |
| 18 | 286.845 | (Variable) | | | 75.49 |
| 19* | −31,829.530 | 1.50 | 1.88300 | 40.8 | 30.22 |
| 20 | 26.256 | 7.62 | | | 25.64 |
| 21 | −26.883 | 0.90 | 1.77250 | 49.6 | 24.52 |
| 22 | 227.401 | 5.70 | 1.89286 | 20.4 | 24.74 |
| 23 | −28.429 | 0.73 | | | 24.84 |
| 24 | −30.085 | 0.90 | 1.88300 | 40.8 | 23.68 |
| 25 | −345.377 | (Variable) | | | 24.42 |
| 26 | 106.690 | 4.67 | 1.49700 | 81.5 | 79.55 |
| 27* | −83.555 | (Variable) | | | 29.65 |
| 28 | 585.559 | 3.77 | 1.43875 | 94.7 | 28.26 |
| 29 | −85.095 | 0.17 | | | 28.04 |
| 30 | 64.653 | 1.14 | 1.85478 | 24.8 | 27.27 |
| 31 | 35.451 | 4.81 | 1.60311 | 60.6 | 26.48 |
| 32 | 1,910.750 | (Variable) | | | 25.84 |
| 33 (Stop) | ∞ | 2.36 | | | 24.53 |
| 34 | −41.381 | 0.90 | 1.75500 | 57.3 | 74.29 |
| 35 | 45.830 | 5.49 | 1.80810 | 22.8 | 24.41 |
| 36 | −225.393 | 9.99 | | | 24.43 |
| 37 | −97.353 | 0.90 | 1.77250 | 49.6 | 23.71 |
| 38 | −133.302 | 2.00 | | | 23.78 |
| 39 | −57.151 | 0.96 | 1.81600 | 46.6 | 23.75 |
| 40 | 67.514 | 4.94 | 1.60342 | 38.0 | 24.34 |
| 41 | −34.402 | 5.00 | | | 74.73 |
| 42 | −494.335 | 3.60 | 1.56732 | 42.8 | 24.33 |
| 43 | −48.534 | 0.35 | | | 24.29 |
| 44 | 67.561 | 1.20 | 1.88300 | 40.8 | 23.31 |
| 45 | 26.411 | 2.44 | 1.43875 | 94.7 | 22.40 |
| 46 | 31.647 | 1.50 | | | 22.08 |
| 47 | 74.827 | 7.27 | 1.48749 | 70.2 | 22.10 |
| 48 | −17.440 | 1.20 | 1.80000 | 29.8 | 22.00 |
| 49 | −52.244 | 0.12 | | | 22.93 |
| 50 | 151.540 | 5.58 | 1.48749 | 70.2 | 23.08 |
| 51 | −26.535 | 5.00 | | | 23.08 |
| 52 | ∞ | 33.00 | 1.60859 | 46.4 | 60.00 |
| 53 | ∞ | 13.20 | 1.51633 | 64.2 | 60.00 |
| 54 | ∞ | 8.50 | | | 60.00 |
| Image plane | ∞ | | | | |

Aspherical surface data

Nineteenth surface

| | | | |
|---|---|---|---|
| K = −4.70809e+007 | A4 = 2.91704e−006 | A6 = 6.37592e−008 | A8 = 1.78042e−009 |
| A10 = 8.74984e−012 | A12 = 4.55878e−015 | | |
| A3 = 9.48651.e−007 | A5 = −1.08338e−007 | A7= −1.40875e−008 | A9 = −1.52212e−010 |
| A11 = −3.01118e−013 | | | |

Twenty-seventh surface

| | | | |
|---|---|---|---|
| K = 1.94359e+001 | A4 = 3.26831e−006 | A6 = −8.07262e−008 | A8 = −4.00242e−010 |
| A10 = 5.02319e−013 | A12 = 2.47114e−015 | | |

-continued

<Numerical Embodiment 9>

| A3 = 2.07314e−006 | A5 = 5.55908e−007 | A7 = 7.62470e−009 | A9 = 1.24282e−011 |
|---|---|---|---|
| A11 = −7.54769e−014 | | | |

Various data

Zoom ratio  36.92

| | Wide angle | Intermediate | Telephoto |
|---|---|---|---|
| Focal length | 6.50 | 40.00 | 239.99 |
| F-number | 2.00 | 3.17 | 4.50 |
| Half angle of view | 40.24 | 7.83 | 1.31 |
| Image height | 5.50 | 5.50 | 5.50 |
| Total lens length | 400.01 | 400.01 | 400.01 |
| BF | 8.50 | 8.50 | 8.50 |
| d18 | 1.84 | 36.16 | 52.76 |
| d25 | 113.69 | 44.66 | 1.49 |
| d27 | 11.83 | 12.39 | 1.46 |
| d32 | 7.99 | 37.14 | 74.65 |
| Entrance pupil position | 70.99 | 156.73 | 1,019.57 |
| Exit pupil position | −369.85 | −369.85 | −369.85 |
| Front principal point position | 77.38 | 192.50 | 1,107.33 |
| Rear principal point position | 2.00 | −31.51 | −231.49 |

Zoom lens unit data

| Unit | First surface | Focal length | Lens structure length | Front principal point position | Rear principal point position |
|---|---|---|---|---|---|
| 1 | 1 | 57.20 | 122.25 | 72.78 | 21.74 |
| 2 | 19 | −15.98 | 17.34 | 3.56 | −8.77 |
| 3 | 26 | 94.78 | 4.67 | 1.76 | −1.38 |
| 4 | 28 | 85.02 | 9.90 | 2.07 | −4.33 |
| 5 | 33 | 55.89 | 107.00 | 48.58 | 1.38 |

<Numerical Embodiment 10>

Unit: mm
Surface data

| Surface number | r | d | nd | vd | Effective diameter |
|---|---|---|---|---|---|
| 1* | 209.268 | 5.35 | 1.77250 | 49.6 | 180.01 |
| 2 | 79.909 | 64.32 | | | 141.24 |
| 3 | −152.727 | 4.40 | 1.69680 | 55.5 | 138.08 |
| 4 | −1,990.730 | 0.20 | | | 140.15 |
| 5 | 240.228 | 13.72 | 1.80810 | 22.8 | 141.72 |
| 6 | 1,269.312 | 10.02 | | | 140.69 |
| 7 | −800.470 | 15.46 | 1.43387 | 95.1 | 139.27 |
| 8 | −186.737 | 0.20 | | | 138.54 |
| 9 | 2,489.929 | 4.20 | 1.73800 | 32.3 | 129.80 |
| 10 | 370.773 | 18.76 | 1.49700 | 81.5 | 126.61 |
| 11 | −245.463 | 22.52 | | | 124.69 |
| 12 | 207.498 | 4.30 | 1.85478 | 24.8 | 127.85 |
| 13 | 109.750 | 26.00 | 1.49700 | 81.5 | 124.71 |
| 14 | −484.184 | 0.25 | | | 124.81 |
| 15 | 183.668 | 19.76 | 1.43387 | 95.1 | 123.79 |
| 16 | −383.134 | 0.15 | | | 122.73 |
| 17 | 107.494 | 9.86 | 1.76385 | 48.5 | 111.58 |
| 18 | 205.219 | (Variable) | | | 110.14 |
| 19* | −12,752.66 | 2.50 | 1.88300 | 40.8 | 38.42 |
| 20 | 30.797 | 10.13 | | | 32.29 |
| 21 | −35.296 | 1.50 | 1.77250 | 49.6 | 32.33 |
| 22 | 81.430 | 3.31 | 1.89286 | 20.4 | 35.77 |

-continued

| <Numerical Embodiment 10> | | | | | |
|---|---|---|---|---|---|
| 23 | 131.686 | 0.80 | | | 36.81 |
| 24 | 122.103 | 6.00 | 1.80810 | 22.8 | 38.00 |
| 25 | −64.449 | 1.50 | 1.88300 | 40.8 | 38.64 |
| 26 | −94.157 | (Variable) | | | 39.63 |
| 27 | 96.849 | 4.34 | 1.69680 | 55.5 | 42.08 |
| 28* | 976.587 | 0.15 | | | 42.20 |
| 29 | 81.248 | 7.12 | 1.49700 | 81.5 | 42.60 |
| 30 | −120.882 | 0.18 | | | 42.42 |
| 31 | 135.644 | 1.50 | 1.80518 | 25.4 | 41.32 |
| 32 | 52.631 | 1.67 | | | 40.14 |
| 33* | 82.926 | 4.84 | 1.60311 | 60.6 | 40.15 |
| 34 | −526.172 | (Variable) | | | 39.91 |
| 35 (Stop) | ∞ | 2.67 | | | 33.72 |
| 36 | −69.827 | 1.50 | 1.75500 | 52.3 | 33.45 |
| 37 | 39.523 | 6.28 | 1.80810 | 22.8 | 33.31 |
| 38 | −1,402.904 | 8.50 | | | 33.18 |
| 39 | −39.763 | 2.00 | 1.89190 | 37.1 | 32.64 |
| 40 | 140.075 | 11.55 | 1.60342 | 38.0 | 35.02 |
| 41 | −35.901 | 20.00 | | | 37.50 |
| 42 | −556.426 | 7.22 | 1.56732 | 42.8 | 39.04 |
| 43 | −76.691 | 0.59 | | | 39.36 |
| 44 | 261.071 | 2.00 | 1.88300 | 40.8 | 38.5 |
| 45 | 36.924 | 8.46 | 1.43875 | 94.7 | 37.43 |
| 46 | −238.859 | 0.81 | | | 37.77 |
| 47 | 136.685 | 8.52 | −1.48749 | 70.2 | 38.11 |
| 48 | −41.104 | 7.00 | 1.80000 | 29.8 | 38.08 |
| 49 | −105.237 | 0.20 | | | 38.90 |
| 50 | 70.506 | 8.67 | 1.48749 | 70.2 | 38.92 |
| 51 | −58.736 | 13.04 | | | 38.42 |
| 52 | ∞ | 33.00 | 1.60859 | 46.4 | 60.00 |
| 53 | ∞ | 13.20 | 1.51633 | 64.2 | 60.00 |
| 54 | ∞ | 11.89 | | | 60.00 |
| Image plane | ∞ | | | | |

| Aspherical surface data |
|---|
| First surface |

K = −1.1844e+000   A4 = 1.46741e−009   A6 = −5.62012e−011   A8 = −2.00383e−015
A3 = 3.20989e−007   A5 = 2.74884e−009   A7 = 5.47111e−013

Nineteenth surface

K = −8.20210e+007   A4 = 2.80019e−006   A6 = 8.9773e−009   A8 = 1.75787e−011
A10 = −2.65817e−014   A12 = 4.22246e−017
A3 = −8.29860e−006   A5 = −1.27238e−007   A7 = −5.89489e−010   A9 = 4.30237e−013
A11 = −8.84039e−016

Twenty-eighth surface

K = 7.28780e+002   A4 = 2.64984e−007   A6 = −7.09379e−009   A8 = −3.76905e−011
A10 = 4.50541e−014   A12 = 3.04183e−017
A3 = 8.06969e−007   A5 = 4.52209e−008   A7 = 7.37424e−010   A9 = 4.58237e−013
A11 = −2.17481e−015

Thirty-third surface

K = 4.21532e+000   A4 = −8.94411e−007   A6 = 1.03309e−008   A8 = 3.86242e−011
A10 = −1.08957e−015   A12 = −5.71339e−017
A3 = 4.49159e−008   A5 = −6.33644e−008   A7 = −9.12937e−010   A9 = 2.84181e−013
A11 = 4.34444e−015

| Various data | |
|---|---|
| Zoom ratio | 31.67 |

| | Wide angle | Intermediate | Telephoto |
|---|---|---|---|
| Focal length | 6.00 | 34.00 | 189.99 |
| F-number | 1.55 | 1.89 | 2.70 |
| Half angle of view | 42.51 | 9.19 | 1.66 |
| Image height | 5.50 | 5.50 | 5.50 |
| Total lens length | 591.83 | 591.83 | 591.83 |
| BF | 11.89 | 11.89 | 11.89 |
| d18 | 1.95 | 59.25 | 79.24 |

-continued

<Numerical Embodiment 10>

| | | | |
|---|---|---|---|
| d26 | 159.79 | 74.53 | 1.50 |
| d34 | 3.00 | 30.96 | 84.00 |
| Entrance pupil position | 104.69 | 210.79 | 847.04 |
| Exit pupil position | 218.70 | 218.70 | 218.70 |
| Front principal point position | 110.86 | 250.39 | 1,211.58 |
| Rear principal point position | 5.89 | −22.11 | −178.10 |

Zoom lens unit data

| Unit | First surface | Focal length | Lens structure length | Front principal point position | Rear principal point position |
|---|---|---|---|---|---|
| 1 | 1 | 74.53 | 219.46 | 117.90 | 42.10 |
| 2 | 19 | −24.50 | 25.75 | 2.29 | −17.57 |
| 3 | 27 | 65.00 | 19.79 | 3.28 | −10.18 |
| 4 | 35 | 45.11 | 150.20 | 56.59 | −3.76 |

<Numerical Embodiment 11>

Unit: mm
Surface data

| Surface number | r | d | nd | vd | Effective diameter |
|---|---|---|---|---|---|
| 1* | 792.308 | 3.21 | 1.77250 | 49.6 | 120.00 |
| 2 | 83.213 | 26.60 | | | 102.94 |
| 3 | −184.002 | 2.64 | 1.77750 | 49.6 | 102.18 |
| 4 | 338.780 | 0.12 | | | 102.08 |
| 5 | 162.760 | 7.18 | 1.92286 | 18.9 | 103.13 |
| 6 | 422.885 | 6.38 | | | 102.73 |
| 7 | 1,879.242 | 14.14 | 1.43387 | 95.1 | 102.06 |
| 8 | −123.932 | 0.12 | | | 101.72 |
| 9 | 580.185 | 2.52 | 1.85478 | 24.8 | 93.19 |
| 10 | 196.180 | 13.20 | 1.43875 | 94.7 | 90.68 |
| 11 | −191.001 | 10.12 | | | 89.65 |
| 12 | 130.281 | 2.58 | 1.85478 | 24.8 | 89.73 |
| 13 | 81.424 | 19.69 | 1.49700 | 81.5 | 88.10 |
| 14 | −228.023 | 0.15 | | | 88.20 |
| 15 | 91.621 | 11.85 | 1.59522 | 67.7 | 86.06 |
| 16 | 1,212.136 | (Variable) | | | 85.19 |
| 17 | 87.037 | 5.42 | 1.76385 | 48.5 | 74.89 |
| 18 | 145.639 | (Variable) | | | 73.51 |
| 19* | −2,644.195 | 1.50 | 1.88300 | 40.8 | 29.51 |
| 20 | 26.372 | 7.25 | | | 25.00 |
| 21 | −26.762 | 0.90 | 1.69680 | 55.5 | 23.81 |
| 22 | 61.561 | 7.06 | 1.80810 | 22.8 | 25.21 |
| 23 | −27.833 | 0.38 | | | 25.88 |
| 24 | −28.795 | 0.90 | 1.88300 | 40.8 | 25.65 |
| 25 | −926.162 | (Variable) | | | 26.66 |
| 26 | 79.062 | 5.15 | 1.49700 | 81.5 | 30.65 |
| 27* | −84.748 | (Variable) | | | 30.69 |
| 28 | 35.265 | 6.52 | 1.43875 | 94.7 | 29.79 |
| 29 | −130.908 | 0.12 | | | 28.88 |
| 30 | 67.815 | 1.14 | 1.85478 | 24.8 | 27.89 |
| 31 | 34.667 | 1.28 | | | 26.93 |
| 32* | 57.300 | 3.37 | 1.60311 | 60.6 | 26.93 |
| 33 | 2,526.999 | (Variable) | | | 26.60 |
| 34 (Stop) | ∞ | 2.00 | | | 23.61 |
| 35 | −45.497 | 0.90 | 1.75500 | 52.3 | 23.34 |
| 36 | 30.187 | 5.81 | 1.80810 | 22.8 | 22.97 |
| 37 | −1,550.196 | 7.00 | | | 22.62 |
| 38 | −99.651 | 0.90 | 1.77250 | 49.6 | 21.35 |
| 39 | 41.601 | 1.86 | 1.60342 | 38.0 | 21.30 |
| 40 | 55.863 | 2.00 | | | 21.36 |
| 41 | −73.671 | 0.96 | 1.81600 | 46.6 | 21.42 |
| 42 | 70.291 | 4.74 | 1.60342 | 38.0 | 22.21 |

-continued

<Numerical Embodiment 11>

| | | | | | |
|---|---|---|---|---|---|
| 43 | −29.332 | 5.00 | | | 22.81 |
| 44 | −96.984 | 3.52 | 1.56732 | 42.8 | 23.63 |
| 45 | −35.900 | 0.35 | | | 24.00 |
| 46 | 111.151 | 1.20 | 1.88300 | 40.8 | 23.57 |
| 47 | 23.805 | 4.74 | 1.43875 | 94.7 | 22.96 |
| 48 | 246.049 | 0.49 | | | 23.19 |
| 49 | 232.967 | 6.74 | 1.48749 | 70.2 | 23.29 |
| 50 | −19.563 | 1.20 | 1.80000 | 29.8 | 23.55 |
| 51 | −42.563 | 0.12 | | | 24.66 |
| 52 | 103.759 | 6.27 | 1.48749 | 70.2 | 24.99 |
| 53 | −27.417 | 5.00 | | | 24.99 |
| 54 | ∞ | 33.00 | 1.60859 | 46.4 | 60.00 |
| 55 | ∞ | 13.20 | 1.51633 | 64.2 | 60.00 |
| 56 | ∞ | 8.50 | | | 60.00 |
| Image plane | ∞ | | | | |

Aspherical surface data

First surface

K = −1.22705e+003  A4 = 3.89196e−007  A6 = 1.38729e−011  A8 = −5.68752e−015
A3 = −2.47266e−007  A5 = −6.52017e−009  A7 = 6.330360e−013

Nineteenth surface

K = 1.91509e+004  A4 = 4.71189e−006  A6 = 1.01920e−007  A8 = 1.17857e−009
A10 = 3.97239e−012  A12 = 3.69163e−015
A3 = −4.67491e−007  A5 = −4.56765e−007  A7 = −1.41975e−008  A9 = −7.08607e−011
A11 = −1.78268e−013

Twenty-seventh surface

K = 1.74864e+001  A4 = 2.20052e−006  A6 = −1.32957e−007  A8 = 8.66659e−010
A10 = 5.24343e−012  A12 = 7.01646e−015
A3 = 6.07485e−006  A5 = 7.72809e−007  A7 = 1.49025e−008  A9 = −6.45702e−012
A11 = −3.33189e−013

Thirty-second surface

K = 5.41397e+000  A4 = −6.42265e−006  A6 = 1.07309e−007  A8 = 1.45839e−009
A10 = −7.17664e−012  A12 = −8.99641e−015
A3 = 4.08909e−006  A5 = −2.70413e−007  A7 = −1.97551e−008  A9 = −6.74113e−013
A11 = 4.44441e−013

Various data

Zoom ratio    33.90

| | Wide angle | Intermediate | Telephoto |
|---|---|---|---|
| Focal length | 6.40 | 36.99 | 216.96 |
| F-number | 1.87 | 2.85 | 3.90 |
| Half angle of view | 40.67 | 8.46 | 1.45 |
| Image height | 5.50 | 5.50 | 5.50 |
| Total lens length | 390.03 | 390.03 | 390.03 |
| BF | 8.50 | 8.50 | 8.50 |
| d16 | 1.31 | 4.47 | 6.30 |
| d18 | 1.77 | 30.96 | 47.96 |
| d25 | 105.25 | 39.40 | 1.49 |
| d27 | 1.73 | 9.89 | 1.40 |
| d33 | 2.96 | 28.32 | 55.88 |
| Entrance pupil position | 69.05 | 139.66 | 830.79 |
| Exit pupil position | 1,105.02 | 1,105.02 | 1,105.02 |
| Front principal point position | 75.49 | 177.90 | 1,090.68 |
| Rear principal point position | 2.10 | 28.50 | −208.46 |

-continued

<Numerical Embodiment 11>

Zoom lens unit data

| Unit | First surface | Focal length | Lens structure length | Front principal point position | Rear principal point position |
|---|---|---|---|---|---|
| 1 | 1 | 80.02 | 120.50 | 79.70 | 38.70 |
| 2 | 17 | 270.92 | 5.42 | −4.38 | −7.32 |
| 3 | 19 | −15.33 | 17.99 | 3.70 | −8.75 |
| 4 | 26 | 82.93 | 5.15 | 1.68 | −1.80 |
| 5 | 28 | 70.90 | 12.44 | 0.84 | −7.89 |
| 6 | 34 | 42.69 | 107.00 | 44.43 | 10.89 |

<Numerical Embodiment 12>

Unit: mm
Surface data

| Surface number | r | d | nd | vd | Effective diameter |
|---|---|---|---|---|---|
| 1 | 228.747 | 5.35 | 1.77250 | 49.6 | 171.89 |
| 2 | 87.133 | 50.50 | | | 140.06 |
| 3 | −245.675 | 4.40 | 1.69680 | 55.5 | 136.06 |
| 4 | 117.178 | 21.69 | 1.84666 | 23.8 | 131.30 |
| 5 | 628.527 | 13.89 | | | 130.13 |
| 6 | −472.386 | 13.95 | 1.43387 | 95.1 | 128.53 |
| 7 | −161.662 | 0.20 | | | 128.04 |
| 8 | −1,248.687 | 4.20 | 1.73800 | 32.3 | 121.31 |
| 9 | 211.287 | 22.09 | 1.49700 | 81.5 | 117.51 |
| 10 | −202.058 | 23.96 | | | 116.36 |
| 11 | −1,524.180 | 4.30 | 1.85478 | 24.8 | 99.85 |
| 12 | 173.157 | 18.09 | 1.49700 | 81.5 | 102.19 |
| 13 | −272.113 | 0.25 | | | 104.28 |
| 14 | 213.121 | 19.77 | 1.59522 | 67.7 | 109.13 |
| 15 | −195.256 | 0.15 | | | 109.31 |
| 16 | 108.814 | 14.55 | 1.76385 | 48.5 | 103.04 |
| 17 | 390.345 | (Variable) | | | 100.06 |
| 18* | −825.702 | 2.50 | 1.76385 | 48.5 | 51.01 |
| 19 | 56.478 | 9.82 | | | 44.35 |
| 20 | −59.575 | 1.50 | 1.75500 | 52.3 | 44.05 |
| 21 | 72.000 | (Variable) | | | 45.77 |
| 22 | 103.532 | 10.50 | 1.85478 | 24.8 | 47.73 |
| 23 | −59.484 | 0.91 | | | 48.35 |
| 24 | −55.450 | 1.50 | 1.88300 | 40.8 | 48.17 |
| 25 | −545.153 | (Variable) | | | 49.97 |
| 26 | 192.193 | 5.91 | 1.59522 | 67.7 | 51.71 |
| 27* | −189.308 | (Variable) | | | 52.13 |
| 28 | 73.486 | 10.83 | 1.43875 | 94.7 | 53.32 |
| 29 | −105.524 | 0.20 | | | 52.95 |
| 30 | −808.897 | 1.90 | 1.80518 | 25.4 | 51.47 |
| 31 | 163.393 | 2.89 | | | 50.52 |
| 32* | 1,730.643 | 3.24 | 1.60311 | 60.6 | 50.39 |
| 33 | −236.379 | (Variable) | | | 50.25 |
| 34 (Stop) | ∞ | 2.67 | | | 27.46 |
| 35 | −232.356 | 1.50 | 1.75500 | 52.3 | 26.81 |
| 36 | 43.734 | 5.27 | 1.80810 | 22.8 | 26.39 |
| 37 | 163.219 | 15.00 | | | 25.92 |
| 38 | −24.929 | 2.00 | 1.89190 | 37.1 | 24.83 |
| 39 | −65.321 | 7.57 | 1.60342 | 38.0 | 26.70 |
| 40 | −27.161 | 20.00 | | | 29.00 |
| 41 | 168.119 | 6.02 | 1.56732 | 42.8 | 30.19 |
| 42 | −68.631 | 0.59 | | | 30.06 |
| 43 | 40.134 | 2.00 | 1.88300 | 40.8 | 28.50 |
| 44 | 27.308 | 3.64 | 1.43875 | 94.7 | 26.96 |
| 45 | 38.748 | 5.82 | | | 26.15 |
| 46 | −91.430 | 7.59 | 1.43875 | 94.7 | 26.38 |
| 47 | −27.036 | 2.00 | 2.00100 | 29.1 | 27.12 |
| 48 | −51.303 | 0.20 | | | 28.64 |
| 49 | 148.210 | 5.69 | 1.48749 | 70.2 | 29.44 |
| 50 | −46.500 | 9.50 | | | 29.72 |
| 51 | ∞ | 63.04 | 1.60859 | 46.4 | 60.00 |

-continued

| <Numerical Embodiment 12> | | | | | |
|---|---|---|---|---|---|
| 52 | ∞ | 8.70 | 1.51633 | 64.2 | 60.00 |
| 53 | ∞ | 10.98 | | | 60.00 |
| Image plane | ∞ | | | | |

Aspherical surface data

First surface

| K = − 8.51212e−001 | A4 = −5.34574e−008 | A6 = −8.12309e−011 | A8= −2.07148e−015 |
|---|---|---|---|
| A3 = 9.58558e−007 | A5 = 4.23387e−009 | A7 = 6.69598e−013 | |

Eighteenth surface

| K = 0.00000e+000 | A4 = 1.59426e−006 | A6 = 5.10081e−009 | A8 = 5.99686e−012 |
|---|---|---|---|
| A10 = −3.65653e−015 | A12 = 1.29257e−018 | | |
| A3 = −2.50577e−006 | A5 = −6.33943e−008 | A7 = −2.55421e−0.10 | A9 = 3.80515e−014 |
| A11 = −3.69229e−018 | | | |

Twenty-seventh surface

| K = −7.70857e+000 | A4 = −5.96902e−007 | A6 = −1.09640e−008 | A8 = −3.39340e−011 |
|---|---|---|---|
| A10 = 3.21795e−014 | A12 = 1.45317e−017 | | |
| A3 = 2.80424e−006 | A5 = 9.40215e−008 | A7 = 825977e−010 | A9 = 3.07950e−013 |
| A11 = −1.26668e−015 | | | |

Thirty-second surface

| K = −9.56207e+001 | A4 = −9.94007e−007 | A6 = 2.93950e−009 | A8 = 1.13731e−011 |
|---|---|---|---|
| A10 = −3.27707e−014 | A12 = −8.48613e−018 | | |
| A3 = 2.94416e−006 | A5 = 5.56204 −009 | A7= −3.37879e−010 | A9 = 2. 92546e−013 |
| A11 = 8.96306e−016 | | | |

Various data

| Zoom ratio | 16.00 | | |
|---|---|---|---|
| | Wide angle | Intermediate | Telephoto |
| Focal length | 10.00 | 40.00 | 159.99 |
| F-number | 2.60 | 2.60 | 3.00 |
| Half angle of view | 42.77 | 13.02 | 3.31 |
| Image height | 9.25 | 9.25 | 9.25 |
| Total lens length | 622.12 | 622.12 | 622.12 |
| BF | 10.98 | 10.98 | 10.98 |
| d17 | 2.64 | 36.16 | 58.92 |
| d21 | 3.00 | 2.23 | 2.90 |
| d25 | 163.19 | 67.54 | 1.50 |
| d27 | 1.49 | 17.73 | 2.80 |
| d33 | 3.00 | 49.66 | 107.20 |
| Entrance pupil position | 100.84 | 144.50 | 430.38 |
| Exit pupil position | −1,743.68 | −1,743.68 | −1,743.68 |
| Front principal point position | 110.78 | 183.59 | 575.79 |
| Rear principal point position | 0.98 | −29.02 | −149.01 |

Zoom lens unit data

| Unit | First surface | Focal length | Lens structure length | Front principal point position | Rear principal point position |
|---|---|---|---|---|---|
| 1 | 1 | 61.81 | 217.34 | 113.46 | 52.22 |
| 2 | 18 | −24.14 | 13.82 | 7.13 | −4.08 |
| 3 | 22 | 114.56 | 12.91 | −1.15 | −8.35 |
| 4 | 26 | 160.59 | 5.91 | 1.88 | −1.85 |
| 5 | 28 | 142.80 | 19.04 | 2.77 | −11.17 |
| 6 | 34 | 73.73 | 168.79 | 70.73 | −9.16 |

<Numerical Embodiment 13>

Unit: mm
Surface data

| Surface number | r | d | nd | vd | Effective diameter |
|---|---|---|---|---|---|
| 1* | 209.268 | 5.35 | 1.77250 | 49.6 | 180.44 |
| 2 | 79.909 | 64.32 | | | 141.48 |
| 3 | −152.727 | 4.40 | 1.69680 | 55.5 | 138.54 |
| 4 | −1,990.730 | 0.20 | | | 140.70 |
| 5 | 240.228 | 13.72 | 1.80810 | 22.8 | 142.36 |
| 6 | 1,269.312 | 10.02 | | | 141.36 |
| 7 | −800.470 | 15.46 | 1.43387 | 95.1 | 139.98 |
| 8 | −186.737 | 0.20 | | | 139.28 |
| 9 | 2,489.929 | 4.20 | 1.73800 | 32.3 | 130.48 |
| 10 | 370.773 | 18.76 | 1.49700 | 81.5 | 127.29 |
| 11 | −245.463 | 72.5 | | | 125.43 |
| 12 | 207.498 | 4.30 | 1.85478 | 24.8 | 127.85 |
| 13 | 109.750 | 26.00 | 1.49700 | 81.5 | 124.71 |
| 14 | −484.184 | 0.25 | | | 124.81 |
| 15 | 183.668 | 19.76 | 1.43387 | 95.1 | 123.79 |
| 16 | −383.134 | 0.15 | | | 122.73 |
| 17 | 107.494 | 9.86 | 1.76385 | 48.5 | 111.58 |
| 18 | 205.219 | (Variable) | | | 110.14 |
| 19* | −12,752.655 | 7.50 | 1.88300 | 40.8 | 38.89 |
| 20 | 30.797 | 10.13 | | | 32.63 |
| 21 | −35.296 | 1.50 | 1.77250 | 49.6 | 32.33 |
| 22. | 81.430 | 3.31 | 1.89286 | 20.4 | 35.77 |
| 23 | −131.686 | 0.80 | | | 36.81 |
| 24 | 122.103 | 6.00 | 1.80810 | 22.8 | 38.00 |
| 25 | −64.449 | 1.50 | 1.88300 | 40.8 | 38.64 |
| 26 | −94.157 | (Variable) | | | 39.63 |
| 27 | 96.849 | 4.34 | 1.69680 | 55.5 | 42.08 |
| 28* | 976.587 | 0.15 | | | 42.20 |
| 29 | 81.248 | 7.12 | 1.49700 | 81.5 | 42.60 |
| 30 | −120.882 | 0.18 | | | 42.42 |
| 31 | 135.644 | 1.50 | 1.80518 | 25.4 | 41.32 |
| 32 | 57.631 | 1.67 | | | 40.14 |
| 33* | 82.926 | 4.84 | 1.60311 | 60.6 | 40.15 |
| 34 | −526.172 | (Variable) | | | 39.91 |
| 35 | −69.827 | 1.50 | 1.75500 | 52.3 | 33.45 |
| 36 | 39.523 | 6.28 | 1.80810 | 77.8 | 33.31 |
| 37 | −1,402.904 | 3.50 | | | 33.18 |
| 38 (Stop) | ∞ | 5.00 | | | 32.80 |
| 39 | −39.763 | 2.00 | 1.89190 | 37.1 | 32.64 |
| 40 | 140.075 | 11.55 | 1.60342 | 38.0 | 35.02 |
| 41 | −35.901 | 20.00 | | | 37.50 |
| 42 | −556.426 | 7.22 | 1.56732 | 42.8 | 39.04 |
| 43 | −76.691 | 0.59 | | | 39.36 |
| 44 | 261.071 | 2.00 | 1.88300 | 40.8 | 38.57 |
| 45 | 36.924 | 8.46 | 1.43875 | 94.7 | 37.43 |
| 46 | −238.859 | 0.81 | | | 37.77 |
| 47 | 136.685 | 8.52 | 1.48749 | 70.2 | 38.11 |
| 48 | −41.104 | 2.00 | 1.80000 | 29.8 | 38.08 |
| 49 | −105.237 | 0.20 | | | 38.90 |
| 50 | 70.506 | 8.67 | 1.48749 | 70.2 | 38.92 |
| 51 | −58.735 | 13.04 | | | 38.42 |
| 52 | ∞ | 33.00 | 1.60859 | 46.4 | 60.00 |
| 53 | ∞ | 13.20 | 1.51633 | 64.2 | 60.00 |
| 54 | ∞ | (Variable) | | | 60.00 |
| Image plane | ∞ | | | | |

Aspherical surface data

First surface

K = −1.18447e+000    A4 = 1.46741e−009    A6 = −5.62012e−011    A8 = −2.00383e−015
A3 = 3.20989e−007    A5 = 2.74884e−009    A7 = 5.47111e−013

Nineteenth surface

K = −8.20210e+007    A4 = 2.80019e−006    A6 = 8.97736e−009    A8 = 1.75787e−011
A10 = −2.6581e −014  A12 = 4.22246e−017
A3 = −8.29860e−006   A5 = −1.27238e−007   A7 = −5.89489e−010   A9 = 4.30237e−013
A11 = −8.84039e−016

-continued

<Numerical Embodiment 13>

Twenty-eighth surface

| | | | |
|---|---|---|---|
| K = 7.28780e+002 | A4 = 2.64984e −007 | A6 = −7.09379e−009 | A8 = −3.76905e−011 |
| A10 = 4.50541e−014 | A12 = 3.041830−017 | | |
| A3 = 8.06969e−007 | A5 = 4.522090−008 | A7 = 7.374240−010 | A9 = 4.582370−013 |
| A11 = −2.17481e−015 | | | |

Thirty-third surface

| | | | |
|---|---|---|---|
| K = 4.21532e+000 | A4 = −8.944110−007 | A6 = 1.03309e−008 | A8 = 3.86242e−011 |
| A10 = −1.08957e−013 | A12 = −5.71339e−017 | | |
| A3 = 4.491590−008 | A5=−6.336440−008 | A7 = −9.129370−010 | A9 = 2.841810−013 |
| A11 = 4.34444e−015 | | | |

Various data

Zoom ratio  31.67

| | Wide angle | Intermediate | Telephoto |
|---|---|---|---|
| Focal length | 6.00 | 34.00 | 189.99 |
| F-number | 1.55 | 1.89 | 2.70 |
| Half angle of view | 42.51 | 9.19 | 1.66 |
| Image height | 5.50 | 5.50 | 5.50 |
| Total lens length | 591.83 | 591.83 | 591.83 |
| BF | 11.89 | 11.89 | 11.89 |
| d18 | 1.95 | 59.75 | 79.24 |
| d26 | 159.79 | 74.54 | 1.50 |
| d34 | 5.67 | 33.63 | 86.67 |
| d54 | 11.89 | 11.89 | 11.89 |
| Entrance pupil position | 104.83 | 215.57 | 994.87 |
| Exit pupil position | 1,362.93 | 1,362.93 | 1,362.93 |
| Front principal point position | 110.86 | 250.37 | 1,211.58 |
| Rear principal point position | 5.89 | −22.11 | −178.10 |

Zoom lens unit data

| Unit | First surface | Focal length | Lens structure length | Front principal point position | Rear principal point position |
|---|---|---|---|---|---|
| 1 | 1 | 74.53 | 219.46 | 117.90 | 42.10 |
| 2 | 19 | −24.50 | 25.75 | 2.29 | −17.57 |
| 3 | 27 | 65.00 | 19.79 | 3.28 | −10.18 |
| 4 | 35 | 45.11 | 147.53 | 53.97 | −3.76 |

TABLE 1

| Conditional Expression | | Numerical Embodiment | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| (1)(15) | Ea/Ep | 1.1 | 1.08 | 1.06 | 1.05 | 1.6 | 1.34 | 1.10 | 1.11 | 1.05 | 1.18 | 1.13 | 1.83 | 1.22 |
| (2)(10) | β | 1.49 | 1.15 | 1.00 | 1.00 | 0.9 | 0.67 | 0.63 | 1.01 | 0.87 | 0.65 | 1.06 | 0.73 | 0.65 |
| (3)(11) | fw/f1 | 0.047 | 0.042 | 0.041 | 0.042 | 0.042 | 0.079 | 0.08 | 0.11 | 0.11 | 0.08 | 0.08 | 0.16 | 0.08 |
| (4)(8) | ft/f1 | 4.31 | 3.61 | 4.11 | 5.16 | 4.2 | 2.77 | 3.09 | 3.87 | 4.20 | 2.55 | 2.71 | 2.59 | 2.55 |
| (5) | fp/f1 | 0.401 | 0.634 | 1.077 | 1.00 | 0.905 | 1.404 | 1.92 | 1.33 | 1.49 | 0.87 | 0.89 | 2.31 | 0.87 |
| (6) | f1/f11 | −0.020 | −0.040 | −0.11 | −0.09 | −0.12 | −0.67 | −0.71 | −0.66 | −0.58 | −0.58 | −0.96 | −0.57 | −0.58 |
| (7) | f1/f12 | 1.00 | 0.99 | 1.07 | 1.05 | 1.07 | 0.24 | 0.23 | 0.28 | 0.21 | 0.26 | 0.42 | 0.15 | 0.26 |
| (9) | f1/fn | −10.15 | −9.32 | −8.93 | −9.17 | −2.90 | −3.09 | −2.82 | −3.71 | −3.58 | −3.04 | −5.22 | −2.56 | −3.04 |
| (12) | f1/f3 | 2.04 | 1.89 | 2.54 | 2.18 | 2.16 | 0.49 | 0.49 | 0.67 | 0.60 | 1.15 | 0.96 | 0.38 | 1.15 |
| (13) | f11/f1 | −50.75 | −24.54 | −8.89 | −10.61 | −8.17 | −1.48 | −1.40 | −1.52 | −1.73 | −1.71 | −1.04 | −1.76 | −1.71 |
| (14) | f12/f11 | −0.02 | −0.04 | −0.11 | −0.09 | −0.11 | −2.86 | −3.05 | −2.34 | −2.77 | −2.28 | −2.27 | −3.66 | −2.28 |
| (16) | |mrr/drr| | — | — | — | — | — | 0.0012 | — | — | — | — | — | — | — |
| fw | | 8.90 | 7.25 | 8.00 | 8.00 | 8.00 | 6.00 | 5.5 | 6.4 | 6.5 | 6.0 | 6.4 | 10.0 | 6.0 |
| ft | | 818.87 | 616.25 | 800.00 | 980.00 | 800.00 | 209.98 | 219.97 | 216.98 | 239.99 | 189.99 | 216.96 | 159.99 | 189.99 |
| f1 | | 190.00 | 170.86 | 194.62 | 190.00 | 190.60 | 75.87 | 71.25 | 56.04 | 57.20 | 74.53 | 80.02 | 61.81 | 74.53 |
| f3 | | 93.30 | 90.54 | 76.59 | 87.24 | 88.11 | 154.30 | 144.15 | 84.06 | 94.78 | 65.00 | 82.93 | 160.59 | 65.00 |

TABLE 1-continued

| | | | | | | | | | | | | | |
|---|---|---|---|---|---|---|---|---|---|---|---|---|---|
| fp | 76.26 | 108.38 | 209.70 | 189.96 | 172.58 | 106.53 | 136.67 | 74.42 | 85.02 | 65.00 | 70.90 | 142.80 | 65.00 |
| fn | −18.72 | −18.33 | −21.79 | −20.73 | −65.65 | −24.59 | −25.24 | −15.12 | −15.98 | −24.50 | −15.33 | −24.14 | −24.50 |
| f11 | −9,642.87 | −4,193.16 | −1,730.64 | −2,015.60 | −1,556.50 | −112.48 | −99.91 | −85.28 | −99.05 | −127.50 | −83.27 | −108.87 | −127.50 |
| f12 | 189.62 | 172.80 | 182.70 | 181.46 | 177.62 | 32.1.92 | 305.06 | 199.73 | 274.24 | 291.23 | 188.81 | 398.82 | 291.23 |
| Ea | 33.61 | 30.95 | 35.05 | 34.66 | 43.92 | 43.61 | 37.94 | 25.57 | 25.84 | 39.91 | 26.60 | 50.25 | 39.91 |
| Ep | 30.68 | 28.59 | 33.07 | 32.90 | 27.47 | 32.44 | 34.42 | 23.11 | 24.53 | 33.72 | 23.61 | 27.46 | 32.80 |
| mrr | | | | | | 0.05 | — | — | — | — | — | — | — |
| drr | | | | | | 42.30 | — | — | — | — | — | — | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-187554, filed Oct. 11, 2019, and Japanese Patent Application No. 2019-192836, filed Oct. 23, 2019, which are hereby incorporated by reference herein in their entirety.

What is claimed is:

1. A zoom lens consisting of in order from an object side to an image side:
   a first lens unit having a positive refractive power and configured not to move for zooming;
   three or four moving lens units configured to move in zooming;
   an aperture stop; and
   one or two rear lens units including a rear lens unit closest to the object side and configured not to move for zooming,
   wherein an interval between each pair of adjacent lens units is changed in zooming,
   wherein the three or four moving lens units include a moving lens unit having a negative refractive power,
   wherein the three or four moving lens units include a rear positive lens unit closest to the image side and having a positive refractive power,
   wherein the first lens unit includes three positive lenses, and
   wherein following conditional expressions are satisfied:

$1.0 < Ea/Ep \leq 1.83$;

$0.4 < \beta < 1.5$; and $2.5 < ft/f1 < 5.2$, where $\beta$ represents a lateral magnification of the one or two rear lens units at a wide-angle end in a case where an axial beam enters from infinity under a state in which the zoom lens is in focus at infinity, Ea represents a smallest effective diameter of effective diameters of lenses included in the rear positive lens unit, Ep represents a full open aperture diameter of the aperture stop, f1 represents a focal length of the first lens unit, and ft represents a focal length of the zoom lens at a telephoto end.

2. The zoom lens according to claim 1, wherein a following conditional expression is satisfied:

$0.040 < fw/f1 < 0.080$, where fw represents a focal length of the zoom lens at the wide-angle end.

3. The zoom lens according to claim 1, wherein a following conditional expression is satisfied:

$0.29 < fp/f1 < 1.50$, where fp represents a focal length of the rear positive lens unit.

4. The zoom lens according to claim 1, wherein the three or four moving lens units consist of three lens units.

5. The zoom lens according to claim 1, wherein the three or four moving lens units include a lens unit closest to the object side and having a negative refractive power.

6. The zoom lens according to claim 1, wherein the first lens unit consists of:
   a first lens sub-unit configured not to move for focusing; and
   a second lens sub-unit having a positive refractive power and configured to move for focusing.

7. The zoom lens according to claim 6, wherein following conditional expressions are satisfied:

$-0.3 < f1/f11 < 0.3$; and $0.8 < f1/f12 < 1.2$, where f11 represents a focal length of the first lens sub-unit, and f12 represents a focal length of the second lens sub-unit.

8. An image pickup apparatus comprising:
   a zoom lens consisting of in order from an object side to an image side:
   a first lens unit having a positive refractive power, which and configured not to move for zooming;
   three or four moving lens units configured to move in zooming;
   an aperture stop; and
   one or two rear lens units including a rear lens unit closest to the object side and configured not to move for zooming,
   wherein an interval between each pair of adjacent lens units is changed in zooming,
   wherein the three or four moving lens units include a moving lens unit having a negative refractive power,
   wherein the three or four moving lens units include a rear positive lens unit closest to the image side and having a positive refractive power,
   wherein the first lens unit includes three positive lenses, and
   wherein following conditional expressions are satisfied:

$1.0 < Ea/Ep \leq 1.83$;

$0.4 < \beta < 1.5$; and $2.5 < ft/f1 < 5.2$ where $\beta$ represents a lateral magnification of the one or two rear lens units at a wide-angle end in a case where an axial beam enters from infinity under a state in which the zoom lens is in focus at infinity, Ea represents a smallest effective diameter of effective diameters of lenses included in the rear positive lens unit, Ep represents a full open aperture diameter of the aperture stop, f1 represents a focal length of the first lens unit, and ft represents a focal length of the zoom lens at a telephoto end; and an image pickup element configured to pick up an image formed by the zoom lens.

* * * * *